United States Patent
Kohn et al.

(10) Patent No.: US 10,133,250 B2
(45) Date of Patent: Nov. 20, 2018

(54) MANAGING CONSTRUCTION OF DECISION MODULES TO CONTROL TARGET SYSTEMS

(71) Applicant: Veritone Alpha, Inc., Costa Mesa, CA (US)

(72) Inventors: Wolf Kohn, Seattle, WA (US); Michael Luis Sandoval, Bellevue, WA (US); Vishnu Vettrivel, Bothell, WA (US); Jonathan Cross, Bellevue, WA (US); Jason Knox, Kenmore, WA (US); David Talby, Mercer Island, WA (US); Mike Lazarus, San Diego, CA (US)

(73) Assignee: Veritone Alpha, Inc., Costa Mesa, CA (US)

( * ) Notice: Subject to any disclaimer, the term of this patent is extended or adjusted under 35 U.S.C. 154(b) by 449 days.

(21) Appl. No.: 14/746,777

(22) Filed: Jun. 22, 2015

(65) Prior Publication Data

US 2016/0018806 A1    Jan. 21, 2016

Related U.S. Application Data

(60) Provisional application No. 62/015,018, filed on Jun. 20, 2014.

(51) Int. Cl.
  *G06E 1/00*    (2006.01)
  *G06E 3/00*    (2006.01)
  (Continued)

(52) U.S. Cl.
  CPC ............ *G05B 19/042* (2013.01); *B60L 11/18* (2013.01); *B60W 10/06* (2013.01); *B60W 10/08* (2013.01);
  (Continued)

(58) Field of Classification Search
  USPC .......................................................... 706/10
  See application file for complete search history.

(56) References Cited

U.S. PATENT DOCUMENTS

| 5,727,128 A | 3/1998 | Morrison |
| 5,963,447 A * | 10/1999 | Kohn ............... G05B 19/41865 |
| | | 700/181 |

(Continued)

OTHER PUBLICATIONS

Journal of Cleaner Production 11 (2003) 397-409, A strategic decision framework for green supply chain Management, Joseph Sarkis Clark University, Graduate School of Management, 950 Main Street, Worcester, MA 01610, USA Accepted May 10, 2002.*

(Continued)

*Primary Examiner* — Michael B Holmes
(74) *Attorney, Agent, or Firm* — Seed IP Law Group LLP

(57) ABSTRACT

Techniques are described for implementing automated control systems that manipulate operations of specified target systems, such as by modifying or otherwise manipulating inputs or other control elements of the target system that affect its operation (e.g., affect output of the target system). An automated control system may in some situations have a distributed architecture with multiple decision modules that each controls a portion of a target system, and may further have one or more components that interacts with one or more users to obtain a description of the target system, including restrictions related to the various elements of the target system, and one or more goals to be achieved during control of the target system. The component(s) then perform various automated actions to generate, test and deploy one or more executable decision modules to use in performing the control of the target system based on the user-specified information.

34 Claims, 38 Drawing Sheets

(51) Int. Cl.

| | | |
|---|---|---|
| *G06F 15/00* | (2006.01) | |
| *G06G 7/00* | (2006.01) | |
| *G06N 99/00* | (2010.01) | |
| *G05B 19/042* | (2006.01) | |
| *G05B 13/04* | (2006.01) | |
| *G06Q 10/06* | (2012.01) | |
| *B60L 11/18* | (2006.01) | |
| *G05B 17/02* | (2006.01) | |
| *B60W 10/06* | (2006.01) | |
| *B60W 10/08* | (2006.01) | |
| *G05B 19/048* | (2006.01) | |
| *G06Q 50/06* | (2012.01) | |

(52) U.S. Cl.
CPC ........... *G05B 13/04* (2013.01); *G05B 13/041* (2013.01); *G05B 17/02* (2013.01); *G05B 19/048* (2013.01); *G06Q 10/06315* (2013.01); *G06Q 50/06* (2013.01); *B60W 2510/0666* (2013.01); *B60W 2510/086* (2013.01); *G05B 2219/2639* (2013.01); *Y10S 903/93* (2013.01)

(56) References Cited

U.S. PATENT DOCUMENTS

| | | | | |
|---|---|---|---|---|
| 6,088,689 | A * | 7/2000 | Kohn | G05B 13/0265 706/10 |
| 7,072,723 | B2 * | 7/2006 | Kohn | G05B 13/024 700/28 |
| 7,216,004 | B2 * | 5/2007 | Kohn | G05B 13/024 700/28 |
| 8,261,283 | B2 * | 9/2012 | Tsafrir | G06F 9/5066 718/107 |
| 8,606,788 | B2 * | 12/2013 | Chen | G06F 17/30616 707/740 |
| 8,949,772 | B1 * | 2/2015 | Talby | G06F 8/35 717/104 |
| 9,946,517 | B2 * | 4/2018 | Talby | G06F 8/35 |
| 2003/0069868 | A1 | 4/2003 | Vos | |
| 2003/0234812 | A1 * | 12/2003 | Drucker | G06Q 10/10 715/751 |
| 2006/0229769 | A1 | 10/2006 | Grichnik et al. | |
| 2011/0178622 | A1 | 7/2011 | Tuszynski | |
| 2013/0080530 | A1 | 3/2013 | Frees et al. | |
| 2013/0253942 | A1 | 9/2013 | Liu et al. | |
| 2014/0250377 | A1 | 9/2014 | Bisca et al. | |
| 2015/0058078 | A1 | 2/2015 | Ehrenberg et al. | |
| 2015/0370228 | A1 * | 12/2015 | Kohn | G06Q 50/06 700/31 |
| 2015/0370232 | A1 * | 12/2015 | Kohn | G06Q 50/06 700/29 |
| 2016/0004228 | A1 * | 1/2016 | Kohn | G06Q 50/06 700/29 |
| 2016/0018806 | A1 * | 1/2016 | Kohn | G06Q 50/06 700/295 |
| 2016/0216708 | A1 * | 7/2016 | Krivoshein | A63H 30/04 |
| 2017/0271984 | A1 * | 9/2017 | Kohn | H02M 3/156 |

OTHER PUBLICATIONS

Future Energy Systems, Marco Liserre, Thilo Sauter, and John Y. Hung Integrating Renewable Energy Sources into the Smart Power Grid Through Industrial Electronics, Digital Object Identifier 10.1109/MIE.2010.935861, IEEE Industrial Electronics Magazine n Mar. 2010.*

Decision Support Systems 33 (2002) 111-126 Past, present, and future of decision support technology, J.P. Shim, Merrill Warkentin, James F. Courtney, Daniel J. Power, Ramesh Sharda, Christer Carlsson, 2002 Published by Elsevier Science B.V.*

Sensor Networks: Evolution, Opportunities, and Challenges, Chee-Yee Chong, Member, IEEE and Srikanta P. Kumar, Senior Member, IEEE, Proceedings of the IEEE, vol. 91, No. 8, Aug. 2003, pp. 1247-1256.*

Ge et al., "Hybrid Systems: Chattering Approximation to Relaxed Controls," *Lecture Notes in Computer Science vol. 1066: Hybrid Systems III*, 1996, 25 pages.

Kohn et al., "Multiple Agent Hybrid Control: Carrier Manifolds and Chattering Approximations to Optimal Control," 33$^{rd}$ Conference on Decision and Control Lake Buena Vista, FL, Dec. 1994, 7 pages.

Kohn et al., "A Hybrid Systems Approach to Computer-Aided Control Engineering," *IEEE Control Systems 15*(2), 1995, 30 pages.

Kohn et al., "Hybrid Systems as Finsler Manifolds: Finite State Control as Approximation to Connections," *Lecture Notes in Computer Science vol. 999: Hybrid Systems II*, 1995, 28 pages.

Kohn et al., "Viability in Hybrid Systems," *Theoretical Computer Science 138*, 1995, 28 pages.

Kohn et al., "Digital to Hybrid Program Transformations," IEEE International Symposium on Intelligent Control, Dearborn, MI, Sep. 15-18, 1996, 6 pages.

Kohn et al., "Hybrid Dynamic Programming," *Lecture Notes in Computer Science vol. 1201: Hybrid and Real-Time Systems*, 1997, 7 pages.

Kohn et al., "Implementing Sensor Fusion Using a Cost-Based Approach," American Control Conference, Albuquerque, NM, Jun. 1997, 5 pages.

Kohn et al., "Control Synthesis in Hybrid Systems with Finsler Dynamics," *Houston Journal of Mathematics 28*(2), 2002, 23 pages.

Kohn et al., "A Micro-Grid Distributed Intelligent Control and Management System," *IEEE Transactions on Smart Grid 6*(6), Nov. 2015, 11 pages.

* cited by examiner

FIG. 14 ← 1400

FIG. 17
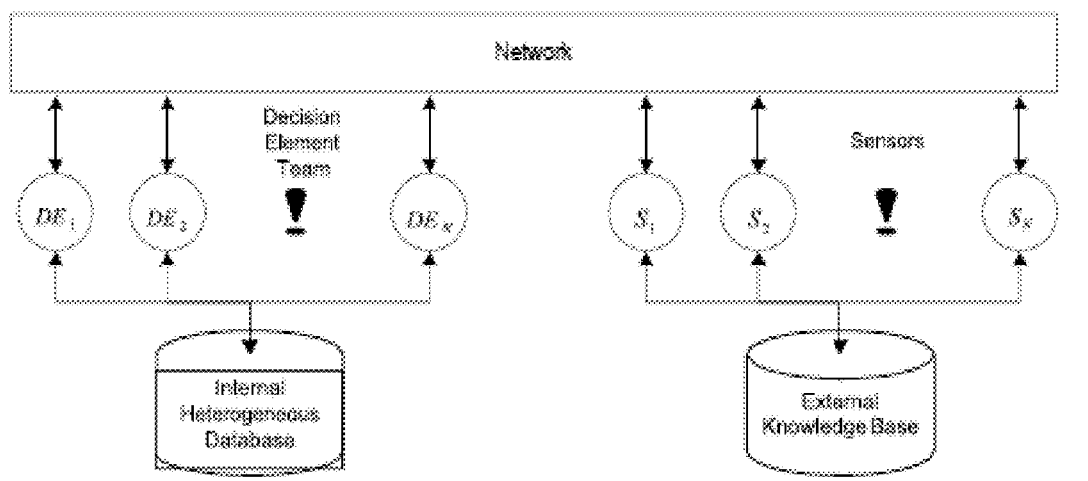
FIG. 18
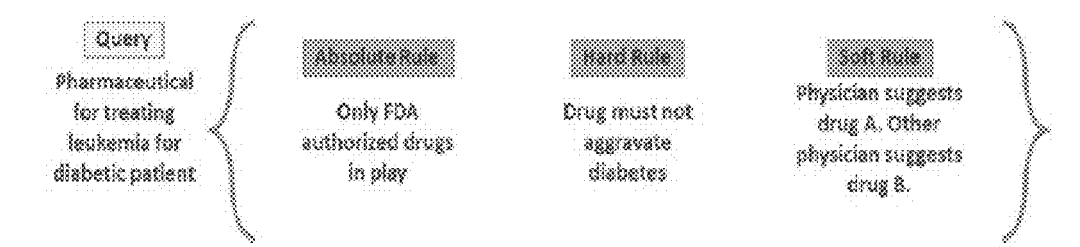
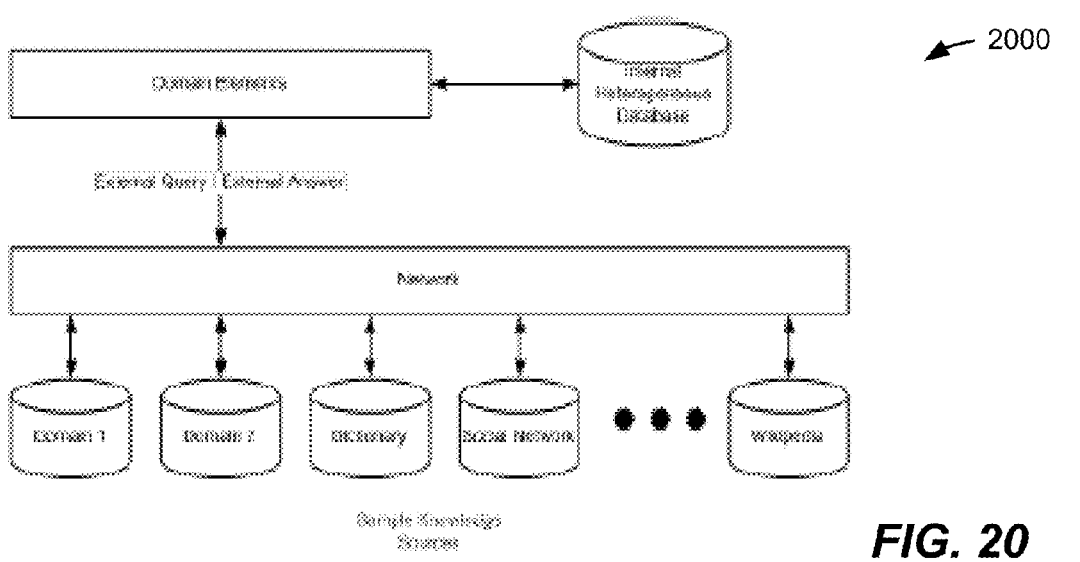
FIG. 20

FIG. 23  CDI Offline Workflows  ← 2300
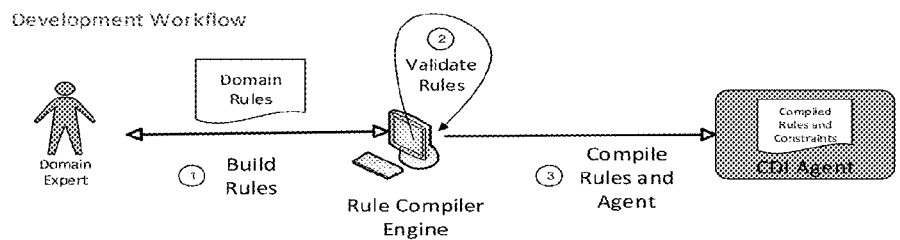
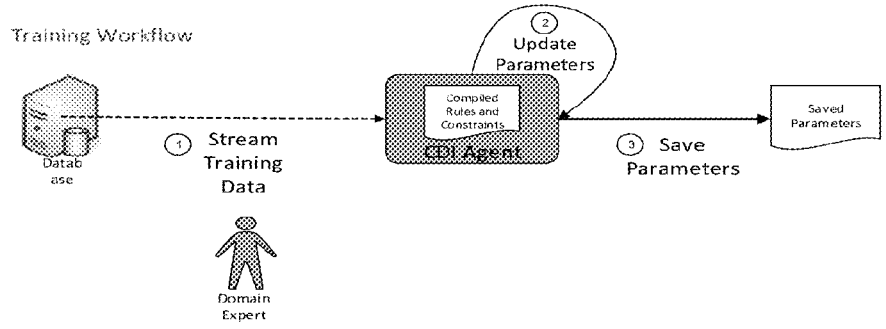
FIG. 24  ← 2400
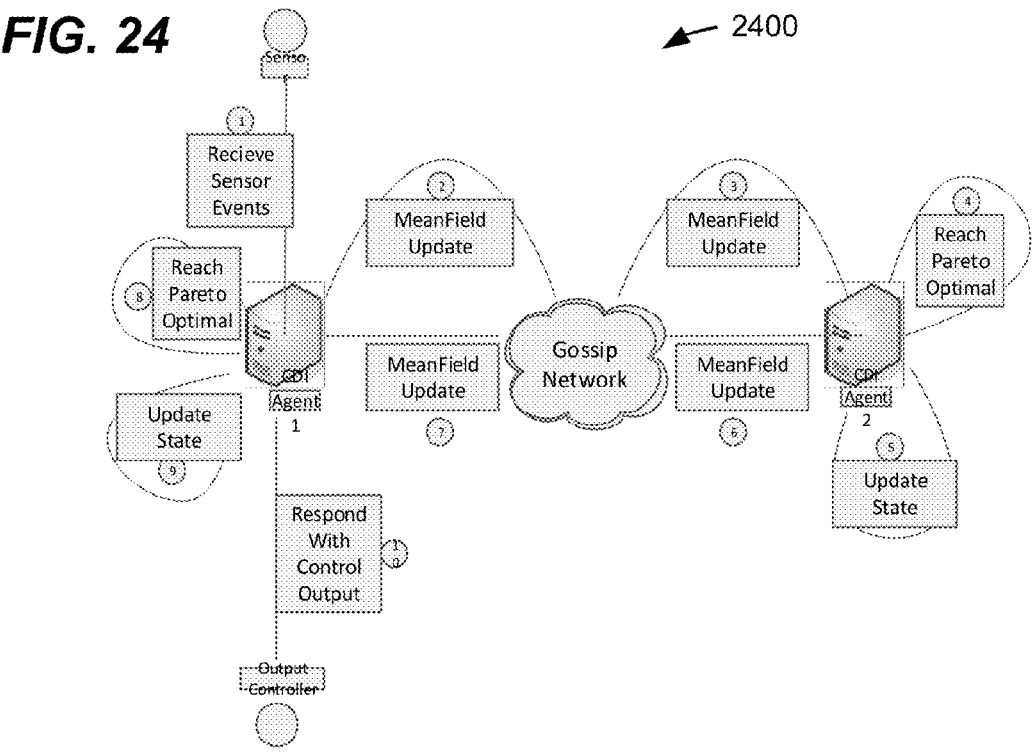

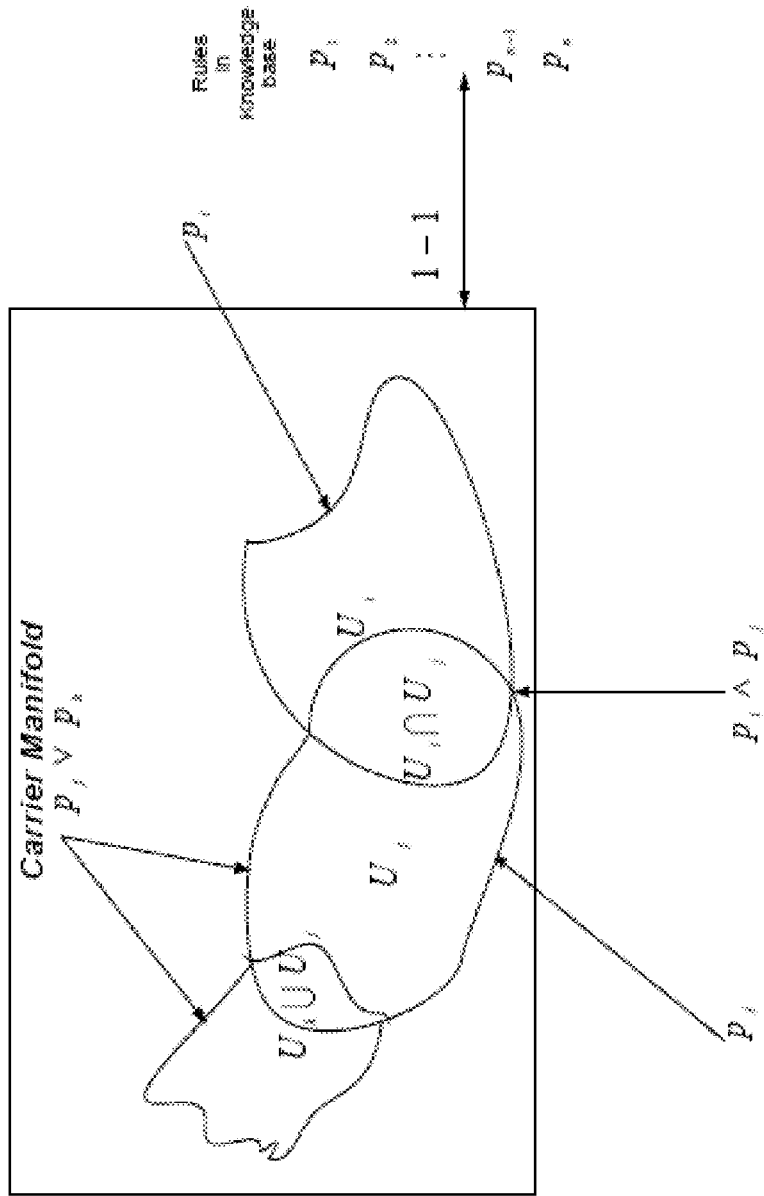

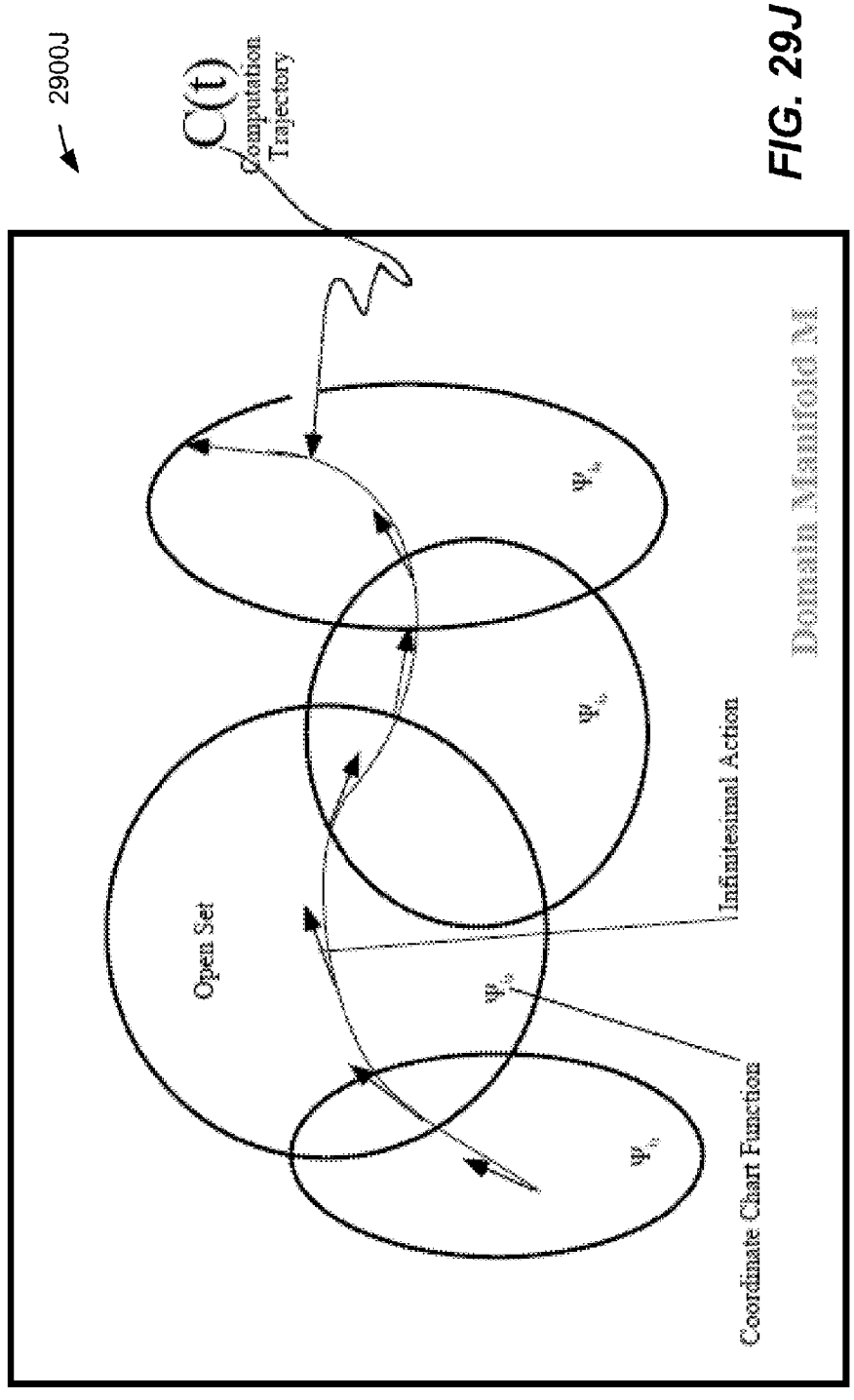

MANAGING CONSTRUCTION OF DECISION MODULES TO CONTROL TARGET SYSTEMS

BACKGROUND

Various attempts have been made to implement automated control systems for various types of physical systems that have inputs or other control elements that the control system can manipulate to attempt to provide desired output or other behavior of the physical systems being controlled. Such automated control systems have used various types of architectures and underlying computing technologies to attempt to implement such functionality, including to attempt to deal with issues related to uncertainty in the state of the physical system being controlled, the need to make control decisions in very short amounts of time to provide real-time or near-real-time control and with only partial information, etc.

However, various difficulties exist with existing automated control systems and their underlying architectures and computing technologies, including with respect to managing large numbers of constraints (sometimes conflicting), operating in a coordinated manner with other systems, etc.

BRIEF DESCRIPTION OF THE DRAWINGS

FIG. 17 illustrates a diagram of various interactions of different portions of a CDI system.

FIG. 18 illustrates a diagram of example different types of rules.

FIG. 20 illustrates a diagram of some components of a CDI system.

FIG. 23 illustrates a network diagram of an example of offline workflows for knowledge capture.

FIG. 24 illustrates a network diagram of an example of workflows for mean field computation and Pareto Optimal.

FIGS. 29A-29L illustrate examples of using a CDI system to iteratively determine near-optimal solutions over time for controlling a target system.

DETAILED DESCRIPTION

Figure 1:
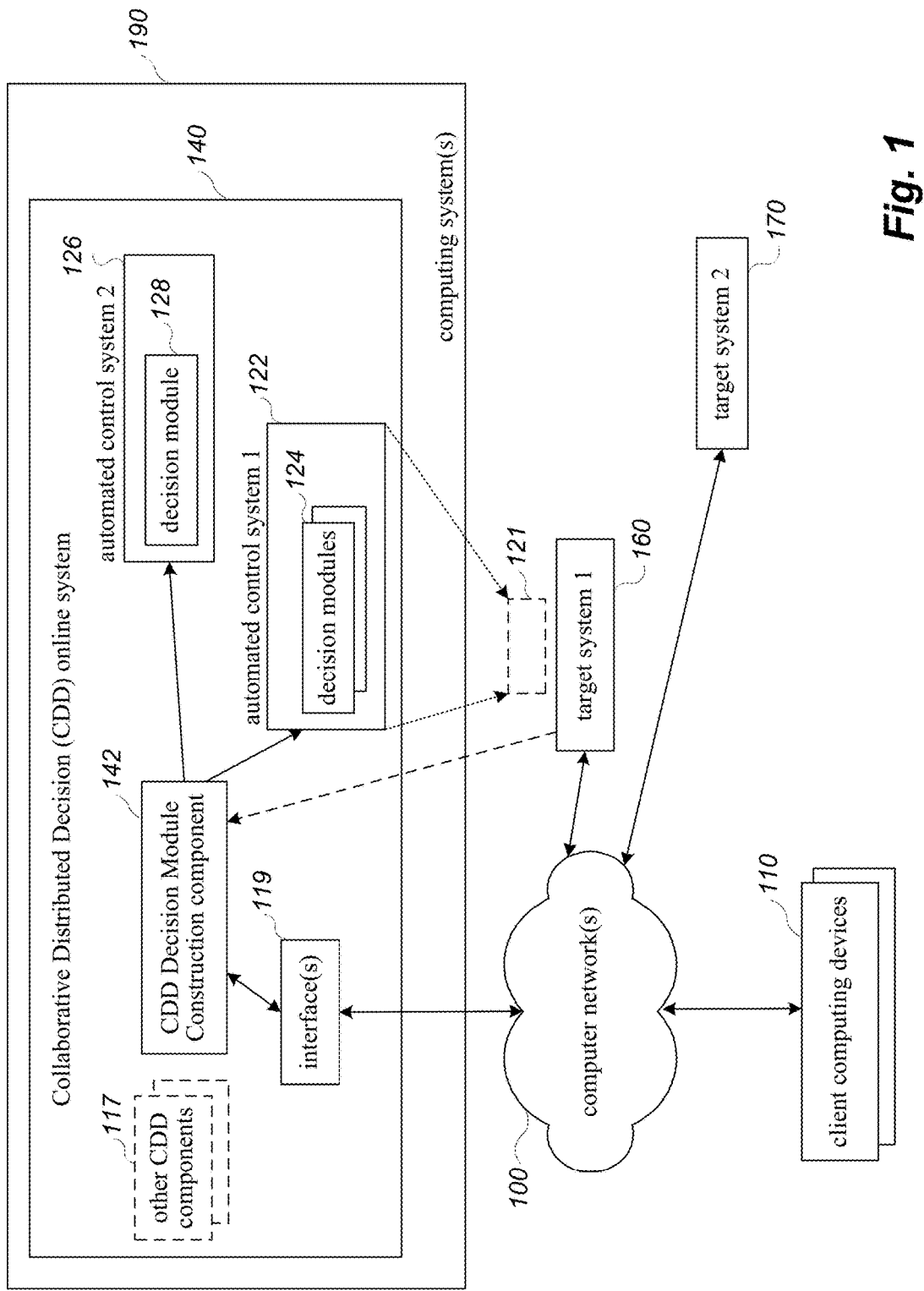
FIG. 1 is a network diagram illustrating an example environment in which a system for performing cooperative distributed control of target systems may be configured and initiated.

Techniques are described for implementing automated control systems to control or otherwise manipulate at least some operations of specified physical systems or other target systems. A target system to be controlled or otherwise manipulated may have numerous elements that are interconnected in various manners, with a subset of those elements being inputs or other control elements that a corresponding automated control system may modify or otherwise manipulate in order to affect the operation of the target system. In at least some embodiments and situations, a target system may further have one or more outputs that the manipulations of the control elements affect, such as if the target system is producing or modifying physical goods or otherwise producing physical effects.

As part of implementing such an automated control system for a particular target system, an embodiment of a Collaborative Distributed Decision (CDD) system may use the described techniques to perform various automated activities involved in constructing and implementing the automated control system—a brief introduction to some aspects of the activities of the CDD system is provided here, with additional details included below. In particular, the CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules (also referred to at times as "decision elements" and/or "agents") to use in performing the control of the target system. When the one or more executable decision modules are deployed and executed, the CDD system may further provide various components within or external to the decision modules being executed to manage their control of the target system, such as a Control Action Determination component of each decision module to optimize or otherwise enhance the control actions that the decision module generates, and/or one or more Coordinated Control Management components to coordinate the control actions of multiple decision modules that are collectively performing the control of the target system. Additional details related to such components of the CDD system and their automated operations are included below.

As noted above, the described techniques may be used to provide automated control systems for various types of physical systems or other target systems. In one or more embodiments, an automated control system is generated and provided and used to control a micro-grid electricity facility, such as at a residential location that includes one or more electricity sources (e.g., one or more solar panel grids, one or more wind turbines, etc.) and one or more electricity storage and source mechanisms (e.g., one or more batteries). The automated control system may, for example, operate at the micro-grid electricity facility (e.g., as part of a home automation system), such as to receive requests from the operator of a local electrical grid to provide particular amounts of electricity at particular times, and to control operation of the micro-grid electricity facility by determining whether to accept each such request. If a request is accepted, the control actions may further include selecting which electricity source (e.g., solar panel, battery, etc.) to use to provide the requested electricity, and otherwise the control actions may further include determine to provide electricity being generated to at least one energy storage mechanism (e.g., to charge a battery). Outputs of such a physical system include the electricity being provided to the local electrical grid, and a goal that the automated control system implements may be, for example, is to maximize profits for the micro-grid electricity facility from providing of the electricity. It will be appreciated that such a physical system being controlled and a corresponding automated control system may include a variety of elements and use various types of information and perform various types of activities, with additional details regarding such an automated control system being included below.

In one or more embodiments, an automated control system is generated and provided and used to control a vehicle with a motor and in some cases an engine, such as an electrical bicycle in which power may come from a user who is pedaling and/or from a motor powered by a battery and/or an engine. The automated control system may, for example, operate on the vehicle or on the user, such as to control operation of the vehicle by determining whether at a current time to remove energy from the battery to power the motor (and if so to further determine how much energy to remove from the battery) or to instead add excess energy to the battery (e.g., as generated by the engine, and if so to further determine how much energy to generate from the engine; and/or as captured from braking or downhill coasting). Outputs of such a physical system include the effects of the motor to move the vehicle, and a goal that the automated control system implements may be, for example, to move the vehicle at one or more specified speeds with a minimum of energy produced from the battery, and/or to minimize use of fuel by the engine. It will be appreciated that such a physical system being controlled and a corresponding automated control system may include a variety of elements and use various types of information and perform various types of activities, with additional details regarding such an automated control system being included below.

In one or more embodiments, an automated control system is generated and provided and used to manage product inventory for one or more products at one or more locations, such as a retail location that receives products from one or more product sources (e.g., when ordered or requested by the retail location) and that provides products to one or more product recipients (e.g., when ordered or requested by the recipients). The automated control system may, for example, operate at the retail location and/or at a remote network-accessible location, such as to receive requests from product recipients for products, and to control operation of the product inventory at the one or more locations by selecting at a current time one or more first amounts of one or more products to request from the one or more product sources, and by selecting at the current time one or more second amounts of at least one product to provide to the one or more product recipients. Outputs of such a physical system include products being provided from the one or more locations to the one or more product recipients, and a goal that the automated control system implements may be, for example, to maximize profit of an entity operating the one or more locations while maintaining the inventory at one or more specified levels. It will be appreciated that such a physical system being controlled and a corresponding automated control system may include a variety of elements and use various types of information and perform various types of activities, with additional details regarding such an automated control system being included below.

In one or more embodiments, an automated control system is generated and provided and used to manage cyber-security for physical computing resources being protected from unauthorized operations and/or to determine a risk level from information provided by or available from one or more information sources. The automated control system may, for example, operate at the location of the computing resources or information sources and/or at a remote network-accessible location, such as to receive information about attempts (whether current or past) to perform operations on computing resources being protected or about information being provided by or available from the one or more information sources, and to control operation of the cyber-security system by determine whether a change in authorization to a specified type of operation is needed and to select one or more actions to take to implement the change in authorization if so determined, and/or to determine whether a risk level exceeds a specified threshold and to select one or more actions to take to mitigate the risk level. A goal that the automated control system implements may be, for example, to minimize unauthorized operations that are performed and/or to minimize the risk level. It will be appreciated that such a target system being controlled and a corresponding automated control system may include a variety of elements and use various types of information and perform various types of activities, with additional details regarding such an automated control system being included below.

In one or more embodiments, an automated control system is generated and provided and used to manage transactions being performed in one or more financial markets, such as to buy and/or sell physical items or other financial items. The automated control system may, for example, operate at the one or more final markets or at a network-accessible location that is remote from the one or more financial markets, such as to control operation of the transactions performed by determining whether to purchase or sell particular items at particular times and to select one or more actions to initiate transactions to purchase or sell the particular items at the particular times. A goal that the automated control system implements may be, for example, to maximize profit while maintaining risk below a specified threshold. It will be appreciated that such a target system being controlled and a corresponding automated control system may include a variety of elements and use various types of information and perform various types of activities, with additional details regarding such an automated control system being included below.

In one or more embodiments, an automated control system is generated and provided and used to perform coding for medical procedures, such as to allow billing to occur for medical procedures performed on humans. The automated control system may, for example, operate at a location at which the medical procedures are performed or at a network-accessible location that is remote from such a medical location, such as to control operation of the coding that is performed by selecting particular medical codes to associate with particular medical procedures in specified circumstances. A goal that the automated control system implements may be, for example, to minimize errors in selected medical codes that cause revenue leakage. It will be appreciated that such a target system being controlled and a corresponding automated control system may include a variety of elements and use various types of information and perform various types of activities, with additional details regarding such an automated control system being included below.

It will also be appreciated that the described techniques may be used with a wide variety of other types of target systems, some of which are further discussed below, and that the invention is not limited to the techniques discussed for particular target systems and corresponding automated control systems.

As noted above, a Collaborative Distributed Decision (CDD) system may in some embodiments use at least some of the described techniques to perform various automated activities involved in constructing and implementing a automated control system for a specified target system, such as to modify or otherwise manipulate inputs or other control elements of the target system that affect its operation (e.g., affect one or more outputs of the target system). An automated control system for such a target system may in some situations have a distributed architecture that provides cooperative distributed control of the target system, such as with multiple decision modules that each control a portion of the target system and that operate in a partially decoupled manner with respect to each other. If so, the various decision modules' operations for the automated control system may be at least partially synchronized, such as by each reaching a consensus with one or more other decision modules at one or more times, even if a fully synchronized convergence of all decision modules at all times is not guaranteed or achieved.

The CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules to use in performing the control of the target system. The Decision Module Construction component may thus operate as part of a configuration or setup phase that occurs before a later run-time phase in which the generated decision modules are executed to perform control of the target system, although in some embodiments and situations the Decision Module Construction component may be further used after an initial deployment to improve or extend or otherwise modify an automated control system that has one or more decision modules (e.g., while the automated control system continues to be used to control the target system), such as to add, remove or modify decision modules for the automated control system.

In some embodiments, some or all automated control systems that are generated and deployed may further provide various components within them for execution during the runtime operation of the automated control system, such as by including such components within decision modules in some embodiments and situations. Such components may include, for example, a Control Action Determination component of each decision module (or of some decision modules) to optimize or otherwise determine and improve the control actions that the decision module generates. For example, such a Control Action Determination component in a decision module may in some embodiments attempt to automatically determine the decision module's control actions for a particular time to reflect a near-optimal solution with respect to or one more goals and in light of a model of the decision module for the target system that has multiple inter-related constraints—if so, such a near-optimal solution may be based at least in part on a partially optimized solution that is within a threshold amount of a fully optimized solution. Such determination of one or more control actions to perform may occur for a particular time and for each of one or more decision modules, as well as be repeated over multiple times for ongoing control by at least some decision modules in some situations. In some embodiments, the model for a decision module is implemented as a Hamiltonian function that reflects a set of coupled differential equations based in part on constraints representing at least part of the target system, such as to allow the model and its Hamiltonian function implementation to be updated over multiple time periods by adding additional expressions within the evolving Hamiltonian function.

In some embodiments, the components included within a generated and deployed automated control system for execution during the automated control system's runtime operation may further include one or more Coordinated Control Management components to coordinate the control actions of multiple decision modules that are collectively performing the control of a target system for the automated control system. For example, some or all decision modules may each include such a Control Action Determination component in some embodiments to attempt to synchronize that decision module's local solutions and proposed control actions with those of one or more other decision modules in the automated control system, such as by determining a consensus shared model with those other decision modules that simultaneously provides solutions from the decision module's local model and the models of the one or more other decision modules. Such inter-module synchronizations may occur repeatedly to determine one or more control actions for each decision module at a particular time, as well as to be repeated over multiple times for ongoing control. In addition, each decision module's model is implemented in some embodiments as a Hamiltonian function that reflects a set of coupled differential equations based in part on constraints representing at least part of the target system, such as to allow each decision module's model and its Hamiltonian function implementation to be combined with the models of one or more other decision modules by adding additional expressions for those other decision modules' models within the initial Hamiltonian function for the local model of the decision module.

Use of the described techniques may also provide various types of benefits in particular embodiments, including non-exclusive examples of beneficial attributes or operations as follows:

- Infer interests/desired content in a cold start environment where textual (or other unstructured) data is available and with minimal user history;
- Improve inference in a continuous way that can incorporate increasingly rich user histories;
- Improve inference performance with the addition of feedback, explicit/implicit, positive/negative and preferably in a real-time or near-real-time manner;
- Derive information from domain experts that provide business value, and embed them in inference framework;
- Dynamically add new unstructured data that may represent new states, and update existing model in a calibrated way;
- Renormalize inference system to accommodate conflicts;
- Immediately do inferencing in a new environment based on a natural language model;
- Add new information as a statistical model, and integrate with a natural language model to significantly improve inference/prediction;
- Integrate new data and disintegrate old data in a way that only improves performance;
- Perform inferencing in a data secure way;
- Integrate distinct inferencing elements in a distributed network and improve overall performance;
- Easily program rules and information into the system from a lay-user perspective;
- Inexpensively perform computer inferences in a way that is suitable for bandwidth of mobile devices; and
- Incorporate constraint information.

It will be appreciated that some embodiments may not include all some illustrative benefits, and that some embodiments may include some benefits that are not listed.

For illustrative purposes, some embodiments are described below in which specific types of operations are performed, including with respect to using the described techniques with particular types of target systems and to perform particular types of control activities that are determined in particular manners. These examples are provided for illustrative purposes and are simplified for the sake of brevity, and the inventive techniques may be used in a wide variety of other situations, including in other environments and with other types of automated control action determination techniques, some of which are discussed below.

FIG. 1 is a network diagram illustrating an example environment in which a system for performing cooperative distributed control of one or more target systems may be configured and initiated. In particular, an embodiment of a CDD system 140 is executing on one or more computing systems 190, including in the illustrated embodiment to operate in an online manner and provide a graphical user interface (GUI) (not shown) and/or other interfaces 119 to enable one or more remote users of client computing systems 110 to interact over one or more intervening computer networks 100 with the CDD system 140 to configure and create one or more decision modules to include as part of an automated control system to use with each of one or more target systems to be controlled.

In particular, target system 1 160 and target system 2 170 are example target systems illustrated in this example, although it will be appreciated that only one target system or numerous target systems may be available in particular embodiments and situations, and that each such target system may include a variety of mechanical, electronic, chemical, biological, and/or other types of components to implement operations of the target system in a manner specific to the target system. In this example, the one or more users (not shown) may interact with the CDD system 140 to generate an example automated control system 122 for target system 1, with the automated control system including multiple decision modules 124 in this example that will cooperatively interact to control portions of the target system 1 160 when later deployed and implemented. The process of the users interacting with the CDD system 140 to create the automated control system 122 may involve a variety of interactions over time, including in some cases independent actions of different groups of users, as discussed in greater detail elsewhere. In addition, as part of the process of creating and/or training or testing automated control system 122, it may perform one or more interactions with the target system 1 as illustrated, such as to obtain partial initial state information, although some or all training activities may in at least some embodiments include simulating effects of control actions in the target system 1 without actually implementing those control actions at that time.

After the automated control system 122 is created, the automated control system may be deployed and implemented to begin performing operations involving controlling the target system 1 160, such as by optionally executing the automated control system 122 on the one or more computing systems 190 of the CDD system 140, so as to interact over the computer networks 100 with the target system 1. In other embodiments and situations, the automated control system 122 may instead be deployed by executing local copies of some or all of the automated control system 122 (e.g., one or more of the multiple decision modules 124) in a manner local to the target system 1, as illustrated with respect to a deployed copy 121 of some or all of automated control system 1, such as on one or more computing systems (not shown) that are part of the target system 1.

In a similar manner to that discussed with respect to automated control system 122, one or more users (whether the same users, overlapping users, or completely unrelated users to those that were involved in creating the automated control system 122) may similarly interact over the computer network 100 with the CDD system 140 to create a separate automated control system 126 for use in controlling some or all of the target system 2 170. In this example, the automated control system 126 for target system 2 includes only a single decision module 128 that will perform all of the control actions for the automated control system 126. The automated control system 126 may similarly be deployed and implemented for target system 2 in a manner similar to that discussed with respect to automated control system 122, such as to execute locally on the one or more computing systems 190 and/or on one or more computing systems (not shown) that are part of the target system 2, although a deployed copy of automated control system 2 is not illustrated in this example. It will be further appreciated that the automated control systems 122 and/or 126 may further include other components and/or functionality that are separate from the particular decision modules 124 and 128, respectively, although such other components and/or functionality are not illustrated in FIG. 1.

The network 100 may, for example, be a publicly accessible network of linked networks, possibly operated by various distinct parties, such as the Internet, with the CDD system 140 available to any users or only certain users over the network 100. In other embodiments, the network 100 may be a private network, such as, for example, a corporate or university network that is wholly or partially inaccessible to non-privileged users. In still other embodiments, the network 100 may include one or more private networks with access to and/or from the Internet. Thus, while the CDD system 140 in the illustrated embodiment is implemented in an online manner to support various users over the one or more computer networks 100, in other embodiments a copy of the CDD system 140 may instead be implemented in other manners, such as to support a single user or a group of related users (e.g., a company or other organization), such as if the one or more computer networks 100 are instead an internal computer network of the company or other organization, and with such a copy of the CDD system optionally not being available to other users external to the company or other organizations. The online version of the CDD system 140 and/or local copy version of the CDD system 140 may in some embodiments and situations operate in a fee-based manner, such that the one or more users provide various fees to use various operations of the CDD system, such as to perform interactions to generate decision modules and corresponding automated control systems, and/or to deploy or implement such decision modules and corresponding automated control systems in various manners. In addition, the CDD system 140, each of its components (including component 142 and optional other components 117, such as one or more CDD Control Action Determination components and/or one or more CDD Coordinated Control Management components), each of the decision modules, and/or each of the automated control systems may include software instructions that execute on one or more computing systems (not shown) by one or more processors (not shown), such as to configure those processors and computing systems to operate as specialized machines with respect to performing their programmed functionality.

Figure 2:
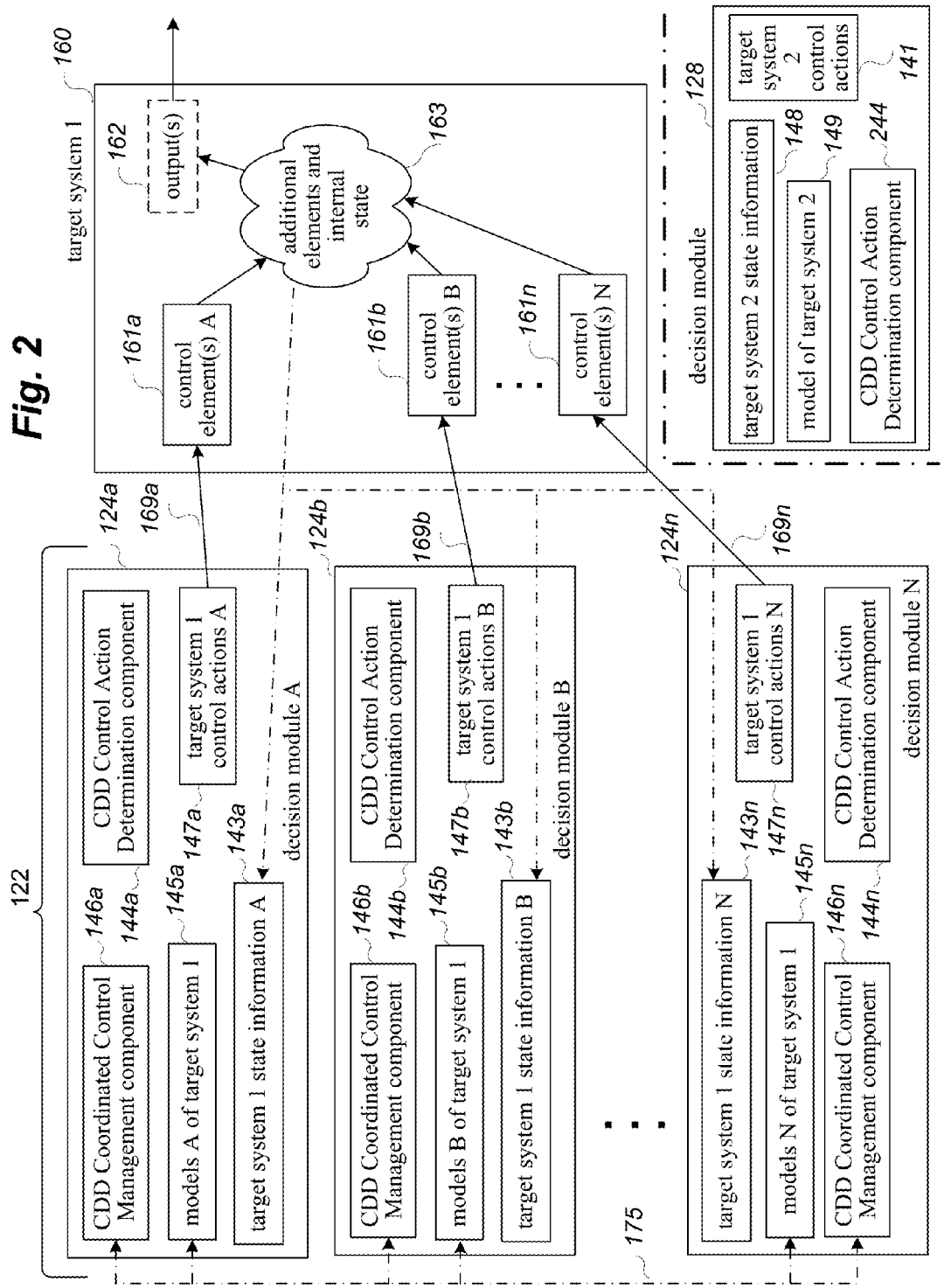
FIG. 2 is a network diagram illustrating an example environment in which a system for performing cooperative distributed control of target systems may be implemented.

FIG. 2 is a network diagram illustrating an example environment in which a system for performing cooperative distributed control of target systems may be implemented, and in particular continues the examples discussed with respect to FIG. 1. In the example environment of FIG. 2, target system 1 160 is again illustrated, with the automated control system 122 now being deployed and implemented to use in actively controlling the target system 1 160. In the example of FIG. 2, the decision modules 124 are represented as individual decision modules 124a, 124b, etc., to 124n, and may be executing locally to the target system 1 160 and/or in a remote manner over one or more intervening computer networks (not shown). In the illustrated example, each of the decision modules 124 includes a local copy of a CDD Control Action Determination component 144, such as with component 144a supporting its local decision module 124a, component 144b supporting its local decision module 124b, and component 144n supporting its local decision module 124n. Similarly, the actions of the various decision modules 124 are coordinated and synchronized in a peer-to-peer manner in the illustrated embodiment, with each of the decision modules 124 including a copy of a CDD Coordinated Control Management component 146 to perform such synchronization, with component 146a supporting its local decision module 124a, component 146b supporting its local decision module 124b, and component 146n supporting its local decision module 124n.

As the decision modules 124 and automated control system 122 execute, various interactions 175 between the decision modules 124 are performed, such as to share information about current models and other state of the decision modules to enable cooperation and coordination between various decision modules, such as for a particular decision module to operate in a partially synchronized consensus manner with respect to one or more other decision modules (and in some situations in a fully synchronized manner in which the consensus actions of all of the decision modules 124 converge). During operation of the decision modules 124 and automated control system 122, various state information 143 may be obtained by the automated control system 122 from the target system 160, such as initial state information and changing state information over time, and including outputs or other results in the target system 1 from control actions performed by the decision modules 124.

The target system 1 in this example includes various control elements 161 that the automated control system 122 may manipulate, and in this example each decision module 124 may have a separate group of one or more control elements 161 that it manipulates (such that decision module A 124a performs interactions 169a to perform control actions A 147a on control elements A 161a, decision module B 124b performs interactions 169b to perform control actions B 147b on control elements B 161b, and decision module N 124n performs interactions 169n to perform control actions N 147n on control elements N 161n). Such control actions affect the internal state 163 of other elements of the target system 1, including optionally to cause or influence one or more outputs 162. As operation of the target system 1 is ongoing, at least some of the internal state information 163 is provided to some or all of the decision modules to influence their ongoing control actions, with each of the decision modules 124a-124n possibly having a distinct set of state information 143a-143n, respectively, in this example.

As discussed in greater detail elsewhere, each decision module 124 may use such state information 143 and a local model 145 of the decision module for the target system to determine particular control actions 147 to next perform, such as for each of multiple time periods, although in other embodiments and situations, a particular automated control system may perform interactions with a particular target system for only one time period or only for some time periods. For example, the local CDD Control Action Determination component 144 for a decision module 124 may determine a near-optimal location solution for that decision module's local model 145, and with the local CDD Coordinated Control Management component 146 determining a synchronized consensus solution to reflect other of the decision modules 124, including to update the decision module's local model 145 based on such local and/or synchronized solutions that are determined. Thus, during execution of the automated control system 122, the automated control system performs various interactions with the target system 160, including to request state information, and to provide instructions to modify values of or otherwise manipulate control elements 161 of the target system 160. For example, for each of multiple time periods, decision module 124a may perform one or more interactions 169a with one or more control elements 161a of the target system, while decision module 124b may similarly perform one or more interactions 169b with one or more separate control elements B 161b, and decision module 124n may perform one or more interactions 169n with one or more control elements N 161*n* of the target system 160. In other embodiments and situations, at least some control elements may not perform control actions during each time period.

While example target system 2 170 is not illustrated in FIG. 2, further details are illustrated for decision module 128 of automated control system 126 for reference purposes, although such a decision module 128 would not typically be implemented together with the decision modules 124 controlling target system 1. In particular, the deployed copy of automated control system 126 includes only the single executing decision module 128 in this example, although in other embodiments the automated control system 126 may include other components and functionality. In addition, since only a single decision module 128 is implemented for the automated control system 126, the decision module 128 includes a local CDD Control Action Determination component 244, but does not in the illustrated embodiment include any local CDD Coordinated Control Management component, since there are not other decision modules with which to synchronize and interact.

While not illustrated in FIGS. 1 and 2, the distributed nature of operations of automated control systems such as those of 122 allow partially decoupled operations of the various decision modules, include to allow modifications to the group of decision modules 124 to be modified over time while the automated control system 122 is in use, such as to add new decision modules 124 and/or to remove existing decision modules 124. In a similar manner, changes may be made to particular decision modules 124 and/or 128, such as to change rules or other restrictions specific to a particular decision module and/or to change goals specific to a particular decision module over time, with a new corresponding model being generated and deployed within such a decision module, including in some embodiments and situations while the corresponding automated control system continues control operations of a corresponding target system. In addition, while each automated control system is described as controlling a single target system in the examples of FIGS. 1 and 2, in other embodiments and situations, other configurations may be used, such as for a single automated control system to control multiple target systems (e.g., multiple inter-related target systems, multiple target systems of the same type, etc.), and/or multiple automated control systems may operate to control a single target system, such as by each operating independently to control different portions of that target control system. It will be appreciated that other configurations may similarly be used in other embodiments and situations.

Figure 3:
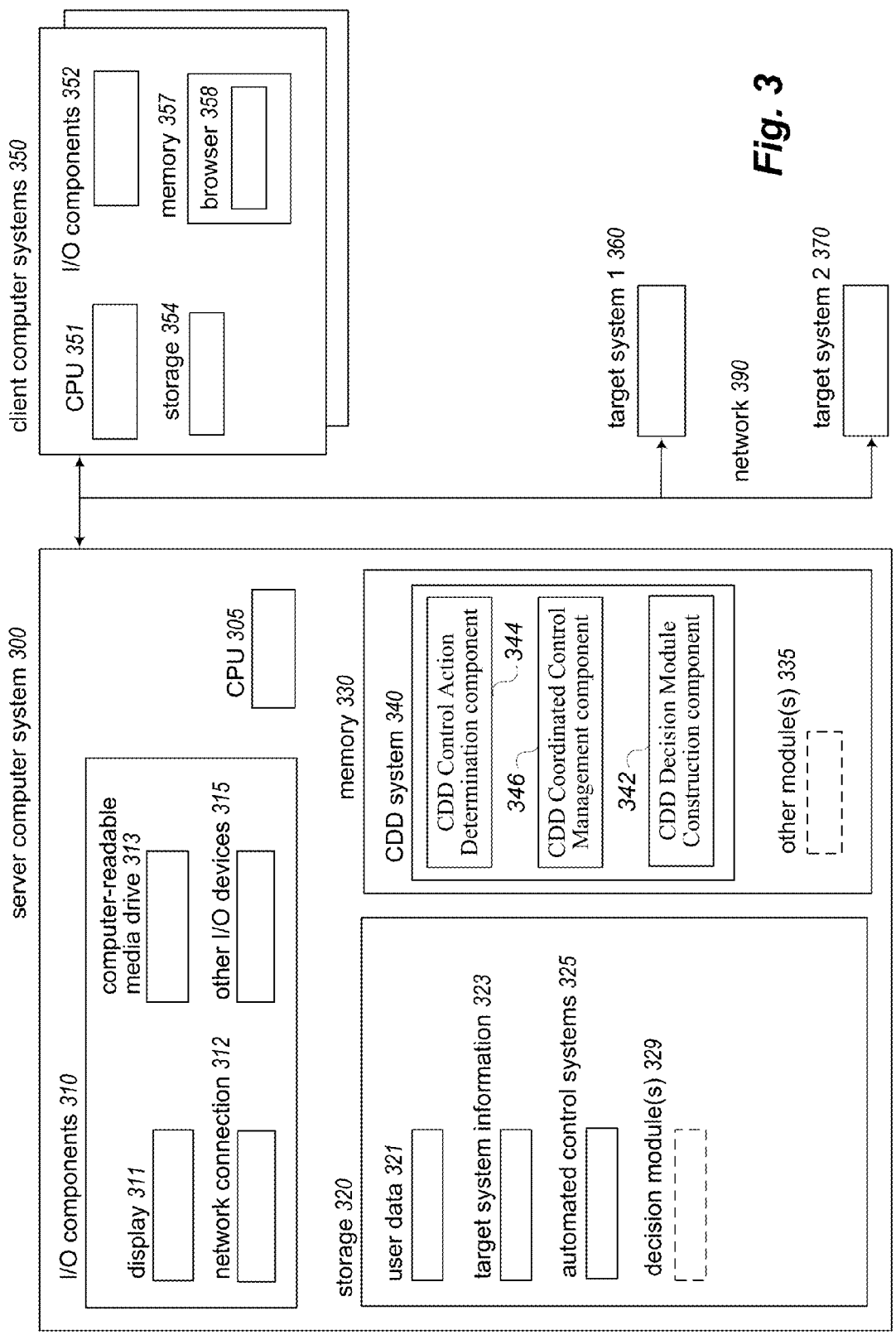
FIG. 3 is a block diagram illustrating example computing systems suitable for executing an embodiment of a system for performing cooperative distributed control of target systems in configured manners.

FIG. 3 is a block diagram illustrating example computing systems suitable for performing techniques for implementing automated control systems to control or otherwise manipulate at least some operations of specified physical systems or other target systems in configured manners. In particular, FIG. 3 illustrates a server computing system 300 suitable for providing at least some functionality of a CDD system, although in other embodiments multiple computing systems may be used for the execution (e.g., to have distinct computing systems executing the CDD Decision Module Construction component for initial configuration and setup before run-time control occurs, and one or more copies of the CDD Control Action Determination component 344 and/or the CDD Coordinated Control Managements component 346 for the actual run-time control). FIG. 3 also illustrates various client computer systems 350 that may be used by customers or other users of the CDD system 340, as well as one or more target systems (in this example, target system 1 360 and target system 2 370, which are accessible to the CDD system 340 over one or more computer networks 390).

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computer systems 350 may each have components similar to those of server computing system 300, including one or more CPUs 351, I/O components 352, storage 354, and memory 357, although some details are not illustrated for the computing systems 350 for the sake of brevity. The target systems 360 and 370 may also each include one or more computing systems (not shown) having components that are similar to some or all of the components illustrated with respect to server computing system 300, but such computing systems and components are not illustrated in this example for the sake of brevity.

The CDD system 340 is executing in memory 330 and includes components 342-346, and in some embodiments the system and/or components each includes various software instructions that when executed program one or more of the CPU processors 305 to provide an embodiment of a CDD system as described elsewhere herein. The CDD system 340 may interact with computing systems 350 over the network 390 (e.g., via the Internet and/or the World Wide Web, via a private cellular network, etc.), as well as the target systems 360 and 370 in this example. In this example embodiment, the CDD system includes functionality related to generating and deploying decision modules in configured manners for customers or other users, as discussed in greater detail elsewhere herein. The other computing systems 350 may also be executing various software as part of interactions with the CDD system 340 and/or its components. For example, client computing systems 350 may be executing software in memory 357 to interact with CDD system 340 (e.g., as part of a Web browser, a specialized client-side application program, etc.), such as to interact with one or more interfaces (not shown) of the CDD system 340 to configure and deploy automated control systems (e.g., stored automated control systems 325 that were previously created by the CDD system 340) or other decision modules 329, as well as to perform various other types of actions, as discussed in greater detail elsewhere. Various information related to the functionality of the CDD system 340 may be stored in storage 320, such as information 321 related to users of the CDD system (e.g., account information), and information 323 related to one or more target systems.

It will be appreciated that computing systems 300 and 350 and target systems 360 and 370 are merely illustrative and are not intended to limit the scope of the present invention. The computing systems may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CDD system 340 and its components may in some embodiments be distributed in additional components. Similarly, in some embodiments some of the functionality of the CDD system 340 and/or CDD components 342-346 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the CDD system 340 and/or the CDD components 342-346) and/or data structures, such as by execution of software instructions of the one or more software programs and/or by storage of such software instructions and/or data structures. Furthermore, in some embodiments, some or all of the systems and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
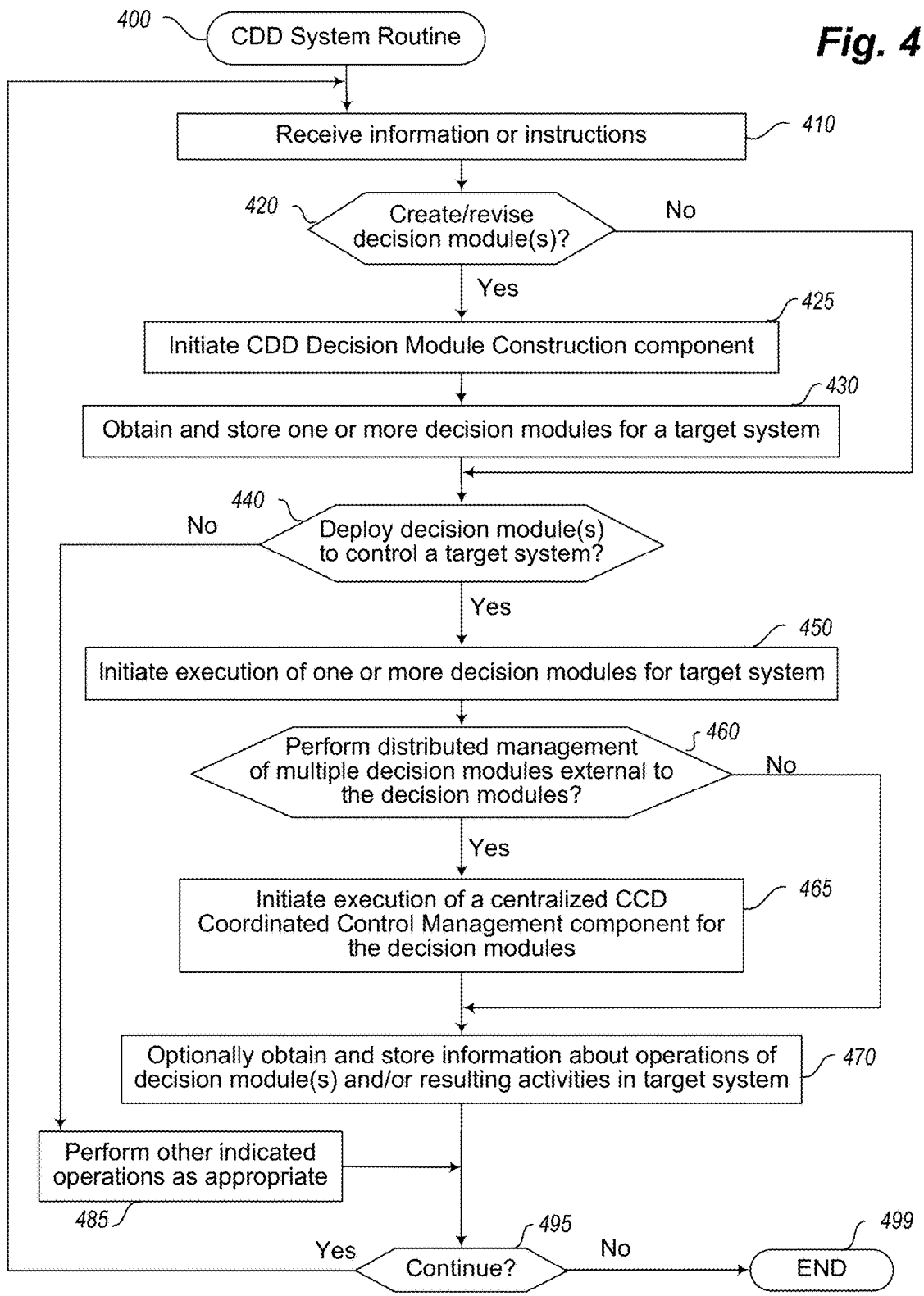
FIG. 4 illustrates a flow diagram of an example embodiment of a Collaborative Distributed Decision (CDD) System routine.

FIG. 4 is a flow diagram of an example embodiment of a Collaborative Distributed Decision (CDD) system routine 400. The routine may, for example, be provided by execution of the CDD system 340 of FIG. 3 and/or the CDD system 140 of FIG. 1, such as to provide functionality to construct and implement automated control systems for specified target systems.

The illustrated embodiment of the routine begins at block 410, where information or instructions are received. If it is determined in block 420 that the information or instructions of block 410 include an indication to create or revise one or more decision modules for use as part of an automated control system for a particular target system, the routine continues to block 425 to initiate execution of a Decision Module Construction component, and in block 430 obtains and stores one or more resulting decision modules for the target system that are created in block 425. One example of a routine for such a Decision Module Construction component is discussed in greater detail with respect to FIGS. 5A-5B.

After block 430, or if it is instead determined in block 420 that the information or instructions received in block 410 are not to create or revise one or more decision modules, the routine continues to block 440 to determine whether the information or instructions received in block 410 indicate to deploy one or more created decision modules to control a specified target system, such as for one or more decision modules that are part of an automated control system for that target system. The one or more decision modules to deploy may have been created immediately prior with respect to block 425, such that the deployment occurs in a manner that is substantially simultaneous with the creation, or in other situations may include one or more decision modules that were created at a previous time and stored for later use. If it is determined to deploy one or more such decision modules for such a target system, the routine continues to block 450 to initiate the execution of those one or more decision modules for that target system, such as on one or more computing systems local to an environment of the target system, or instead on one or more remote computing systems that communicate with the target system over one or more intermediary computer networks (e.g., one or more computing systems under control of a provider of the CDD system).

After block 450, the routine continues to block 460 to determine whether to perform distributed management of multiple decision modules being deployed in a manner external to those decision modules, such as via one or more centralized Coordinated Control Management components. If so, the routine continues to block 465 to initiate execution of one or more such centralized CDD Coordinated Control Management components for use with those decision modules. After block 465, or if it is instead determined in block 460 to not perform such distributed management in an external manner (e.g., if only one decision module is executed, if multiple decision modules are executed but coordinate their operations in a distributed peer-to-peer manner, etc.), the routine continues to block 470 to optionally obtain and store information about the operations of the one or more decision modules and/or resulting activities that occur in the target system, such as for later analysis and/or reporting.

If it is instead determined in block 440 that the information or instructions received in block 410 are not to deploy one or more decision modules, the routine continues instead to block 485 to perform one or more other indicated operations if appropriate. For example, such other authorized operations may include obtaining results information about the operation of a target system in other manners (e.g., by monitoring outputs or other state information for the target system), analyzing results of operations of decision modules and/or activities of corresponding target systems, generating reports or otherwise providing information to users regarding such operations and/or activities, etc. In addition, in some embodiments the analysis of activities of a particular target system over time may allow patterns to be identified in operation of the target system, such as to allow a model of that target system to be modified accordingly (whether manually or in an automated learning manner) to reflect those patterns and to respond based on them. In addition, as discussed in greater detail elsewhere, distributed operation of multiple decision modules for an automated control system in a partially decoupled manner allows various changes to be made while the automated control system is in operation, such as to add one or more new decision modules, to remove one or more existing decision modules, to modify the operation of a particular decision module (e.g., by changing rules or other information describing the target system that is part of a model for the decision module), etc. In addition, the partially decoupled nature of multiple such decision modules in an automated control system allows one or more such decision modules to operate individually at times, such as if network communication issues or other problems prevent communication between multiple decision modules that would otherwise allow their individualized control actions to be coordinated—in such situations, some or all such decision modules may continue to operate in an individualized manner, such as to provide useful ongoing control operations for a target system even if optimal or near-optimal solutions cannot be identified from coordination and synchronization between a group of multiple decision modules that collectively provide the automated control system for the target system.

After blocks 470 or 485, the routine continues to block 495 to determine whether to continue, such as until an explicit indication to terminate is received. If it is determined to continue, the routine returns to block 410, and otherwise continues to block 499 and ends.

Figure 5A:
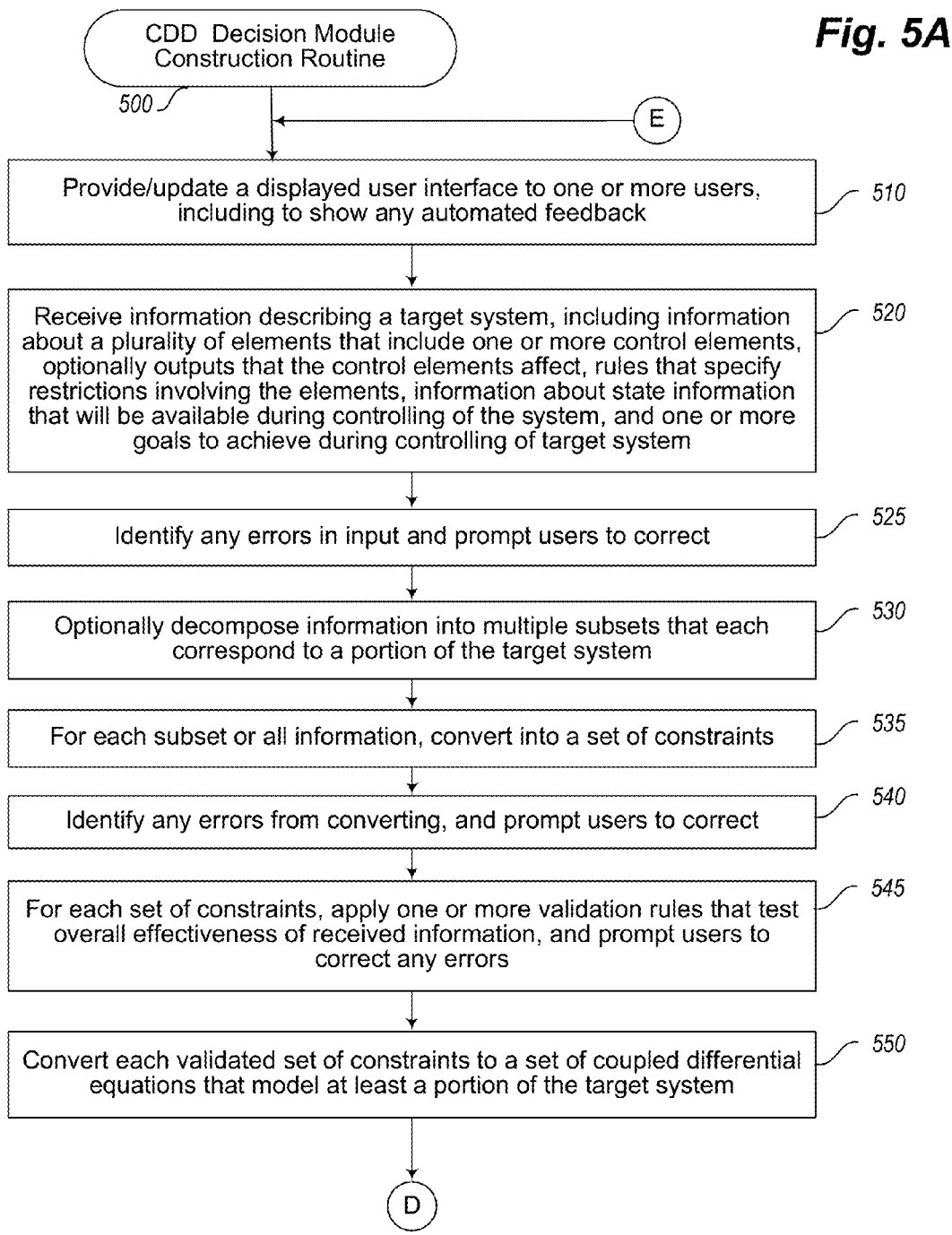
FIGS. 5A-5B illustrate a flow diagram of an example embodiment of a CDD Decision Module Construction routine.
Figure 5B:
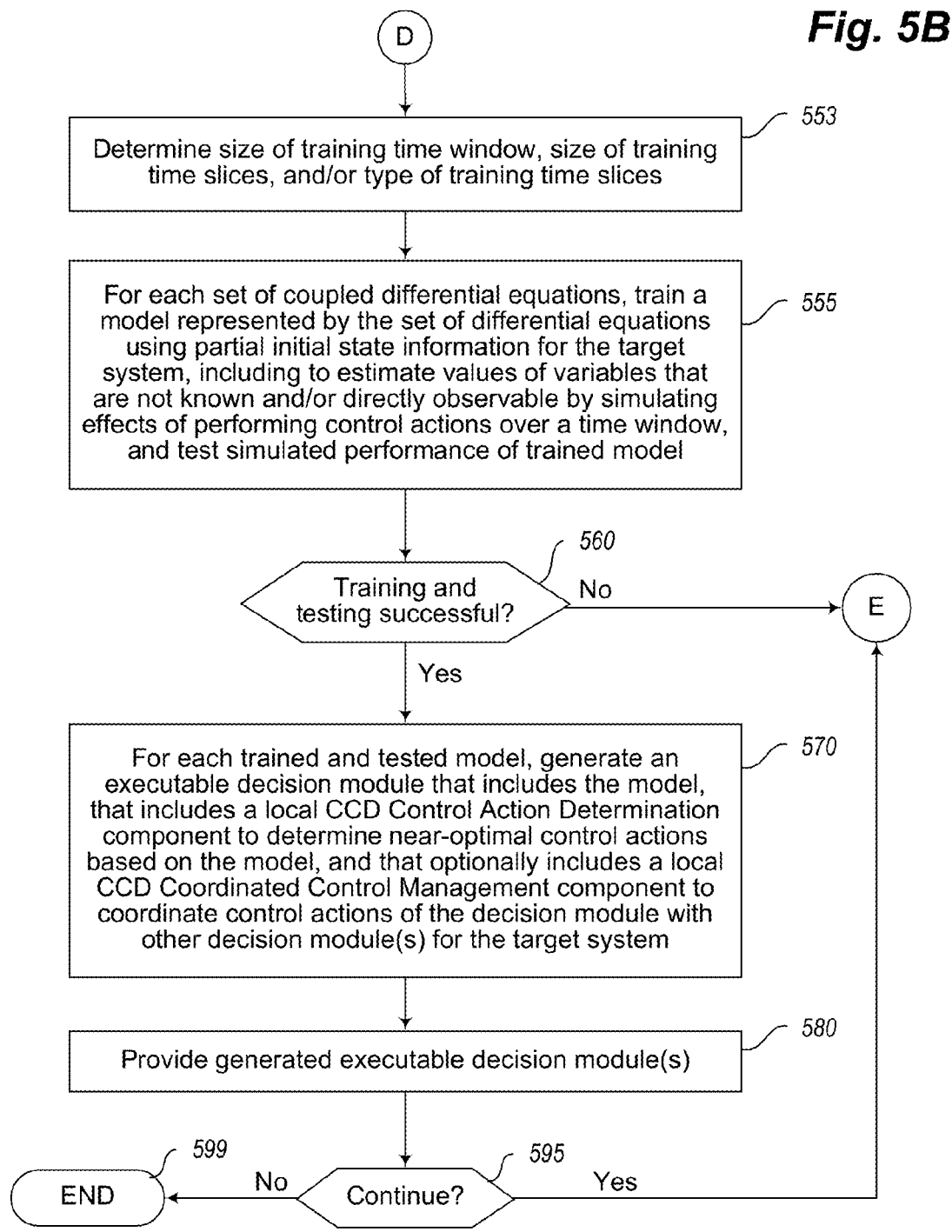

FIGS. 5A-5B illustrate a flow diagram of an example embodiment of a CDD Decision Module Construction routine 500. The routine may, for example, be provided by execution of the component 342 of FIG. 3 and/or the component 142 of FIG. 1, such as to provide functionality to allow users to provide information describing a target system of interest, and to perform corresponding automated operations to construct one or more decision modules to use to control the target system in specified manners. While the illustrated embodiment of the routine interacts with users in particular manners, such as via a displayed GUI (graphical user interface), it will be appreciated that other embodiments of the routine may interact with users in other manners, such as via a defined API (application programming interface) that an executing program invokes on behalf of a user. In some embodiments, the routine may further be implemented as part of an integrated development environment or other software tool that is available for one or more users to use, such as by implementing an online interface that is available to a variety of remote users over a public network such as the Internet, while in other embodiments a copy of the CDD system and/or particular CDD components may be used to support a single organization or other group of one or more users, such as by being executed on computing systems under the control of the organization or group. In addition, the CDD Decision Module Construction component may in some embodiments and situations be separated into multiple sub-components, such as a rules editor component that users interact with to specify rules and other description information for a target system, and a rules compiler engine that processes the user-specified rules and other information to create one or more corresponding decision modules.

The illustrated embodiment of the routine 500 begins at block 510, where the routine provides or updates a displayed user interface to one or more users, such as via a request received at an online version of component that is implementing the routine, or instead based on the routine being executed by one or more such users on computing systems that they control. While various operations are shown in the illustrated embodiment of the routine as occurring in a serial manner for the purpose of illustration, it will be appreciated that user interactions with such a user interface may occur in an iterative manner and/or over multiple periods of time and/or user sessions, including to update a user interface previously displayed to a user in various manners (e.g., to reflect a user action, to reflect user feedback generated by operation of the routine or from another component, etc.), as discussed further below.

After block 510, the routine continues to block 520 to receive information from one or more such users describing a target system to be controlled, including information about a plurality of elements of the target system that include one or more manipulatable control elements and optionally one or more outputs that the control elements affect, information about rules that specify restrictions involving the elements, information about state information that will be available during controlling of the system (e.g., values of particular elements or other state variables), and one or more goals to achieve during the controlling of the target system. It will be appreciated that such information may be obtained over a period of time from one or more users, including in some embodiments for a first group of one or more users to supply some information related to a target system and for one or more other second groups of users to independently provide other information about the target system, such as to reflect different areas of expertise of the different users and/or different parts of the target system.

After block 520, the routine continues to block 525 to identify any errors that have been received in the user input, and to prompt the user(s) to correct those errors, such as by updating the display in a corresponding manner as discussed with respect to block 510. While the identification of such errors is illustrated as occurring after the receiving of the information in block 520, it will be appreciated that some or all such errors may instead be identified as the users are inputting information into the user interface, such as to identify syntax errors in rules or other information that the users specify. After block 525, the illustrated embodiment of the routine continues to block 530 to optionally decompose the information about the target system into multiple subsets that each correspond to a portion of the target system, such as with each subset having one or more different control elements that are manipulatable by the automated control system being created by the routine, and optionally have overlapping or completely distinct goals and/or sets of rules and other information describing the respective portions of the target system. As discussed in greater detail elsewhere, such decomposition, if performed, may in some situations be performed manually by the users indicating different subgroups of information that they enter, and/or in an automated manner by the routine based on an analysis of the information that has been specified (e.g., based on the size of rules and other descriptive information supplied for a target system, based on inter-relationships between different rules or goals or other information, etc.). In other embodiments, no such decomposition may be performed.

After block 530, the routine continues to block 535 to, for each subset of target system description information (or for all the received information if no such subsets are identified), convert that subset (or all the information) into a set of constraints that encapsulate the restrictions, goals, and other specified information for that subset (or for all the information). In block 540, the routine then identifies any errors that occur from the converting process, and if any are identified, may prompt the user to correct those errors, such as in a manner similar to that described with respect to blocks 525 and 510. While not illustrated in this example, the routine may in some situations in blocks 525 and/or 540 return to block 510 when such errors are identified, to display corresponding feedback to the user(s) and to allow the user(s) to make corrections and re-perform following operations such as those of blocks 520-540. The errors identified in the converting process in block 540 may include, for example, errors related to inconsistent restrictions, such as if the restrictions as a group are impossible to satisfy.

After block 540, the routine continues to block 545 to, for each set of constraints (or a single constraint set if no subsets were identified in block 530), apply one or more validation rules to the set of constraints to test overall effectiveness of the corresponding information that the constraints represent, and to prompt the one or more users to correct any errors that are identified in a manner similar to that with respect to blocks 525, 540 and 510. Such validation rules may test one or more of controllability, observability, stability, and goal completeness, as well as any user-added validation rules, as discussed in greater detail elsewhere. In block 550, the routine then converts each validated set of constraints to a set of coupled differential equations that model at least a portion of the target system to which the underlying information corresponds.

After block 550, the routine continues to block 553 to perform activities related to training a model for each set of coupled differential equations, including to determine one or more of a size of a training time window to use, size of multiple training time slices within the time window, and/or a type of training time slice within the time window. In some embodiments and situations, the determination of one or more such sizes or types of information is performed by using default or pre-specified information, while in other embodiments and situations the users may specify such information, or an automated determination of such information may be performed in one or more manners (e.g., by testing different sizes and evaluating results to find sizes with the best performance). Different types of time slices may include, for example, successions of time slices that overlap or do not overlap, such that the training for a second time slice may be dependent only on results of a first time slice (if they do not overlap) or instead may be based at least in part on updating information already determined for at least some of the first time slice (if they do overlap in part or in whole). After block 553, the routine continues to block 555 to, for each set of coupled differential equations representing a model, train the model for that set of coupled differential equations using partial initial state information for the target system, including to estimate values of variable that are not known and/or directly observable for the target system by simulating effects of performing control actions over the time window, such as for successive time slices throughout the time window, and to test the simulated performance of the trained model. Additional details related to training and testing are included elsewhere herein.

After block 555, the routine continues to block 560 to determine whether the training and testing was successful, and if not returns to block 510 to display corresponding feedback information to the users to allow them to correct errors that caused the lack of success. If it is instead determined in block 560 that the testing and training were successful, however, the routine continues instead to block 570 to generate an executable decision module for each trained and tested model that includes that model, as well as a local CCD Control Action Determination component that the decision module will use when executed to determine optimal or near-optimal control actions to perform for the target system based on the information included in the model, and in light of the one or more goals for that decision module. The generated executable decision module may in some embodiments and situations further include a local CCD Coordinated Control Management component to coordinate control actions of multiple decision modules that collectively will provide an automated control system for the target system, such as by synchronizing respective models of the various decision modules over time. After block 570, the routine continues to block 580 to provide the generated executable decision modules for use, including to optionally store them for later execution and/or deployment.

After block 580, the routine continues to block 595 to determine whether to continue, such as until an explicit indication to terminate is received. If it is determined to continue, the routine returns to block 510, and otherwise continues to block 599 and ends.

Figure 6A:
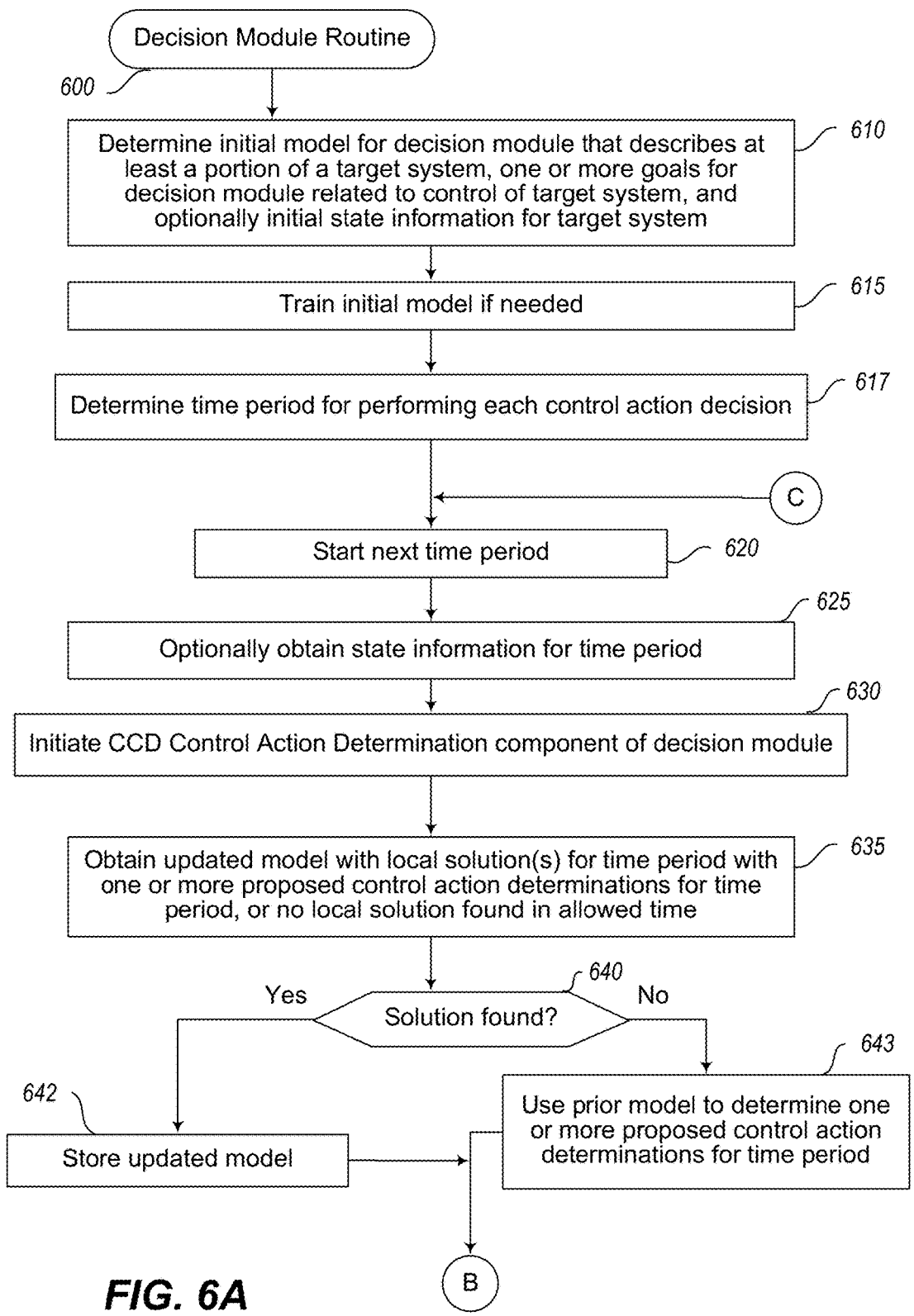
FIGS. 6A-6B illustrate a flow diagram of an example embodiment of a decision module routine.
Figure 6B:
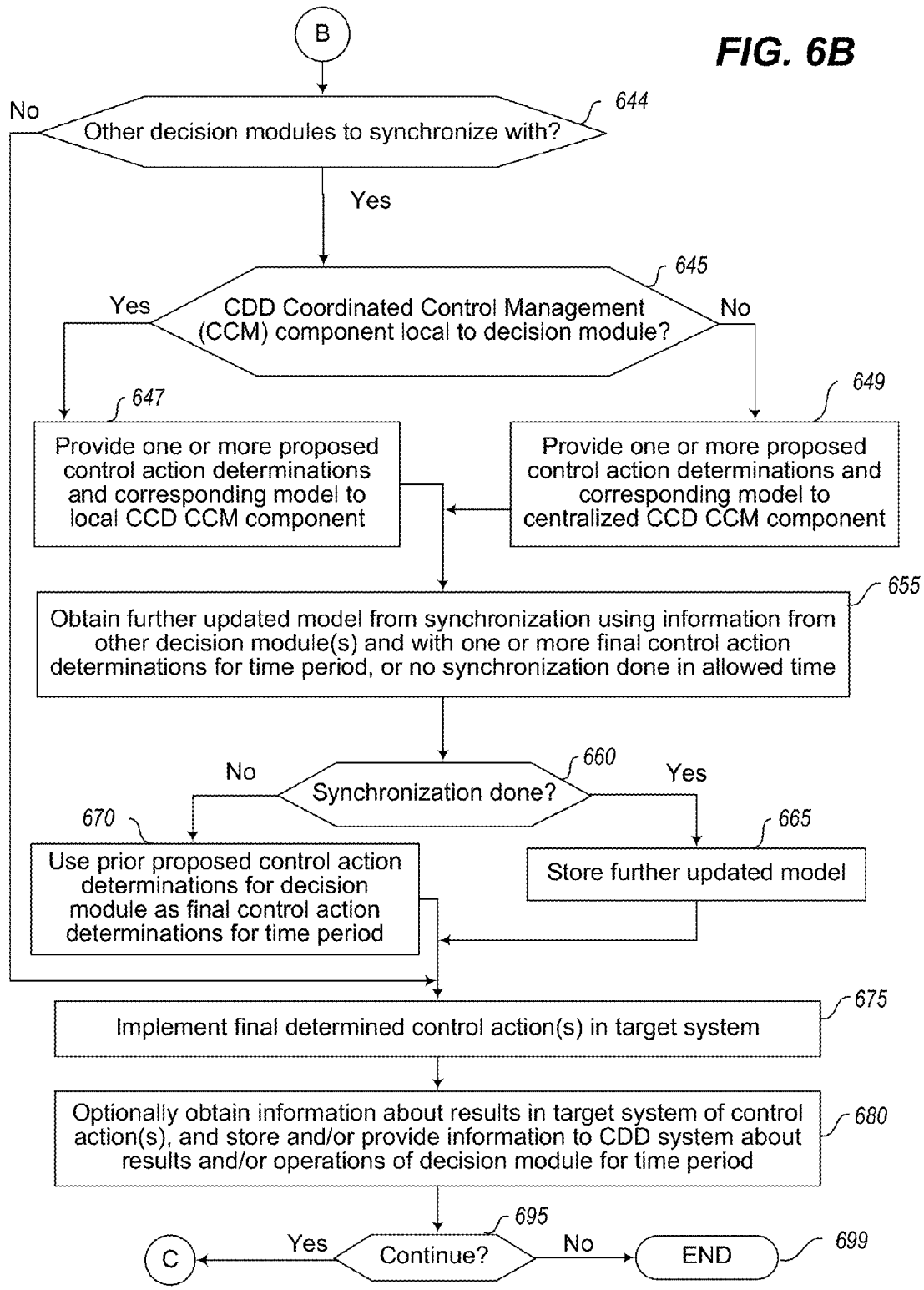

FIGS. 6A-6B illustrate a flow diagram of an example embodiment of a routine 600 corresponding to a generic representation of a decision module that is being executed. The routine may, for example, be provided by execution of a decision module 329 or as part of an automated control system 325 of FIG. 3 and/or a decision module 124 or 128 of FIG. 1 or 2, such as to provide functionality for controlling at least a portion of a target system in a manner specific to information and a model encoded for the decision module, including to reflect one or more goals to be achieved by the decision module during its controlling activities. As discussed in greater detail elsewhere, in some embodiments and situations, multiple decision modules may collectively and cooperatively act to control a particular target system, such as with each decision module controlling one or more distinct control elements for the target system or otherwise representing or interacting with a portion of the target system, while in other embodiments and situations a single decision module may act alone to control a target system. The routine 600 further reflects actions performed by a particular example decision module when it is deployed in controlling a portion of a target system, although execution of at least portions of a decision module may occur at other times, such as initially to train a model for the decision module before the decision module is deployed, as discussed in greater detail with respect to the CDD Decision Module Construction routine 500 of FIGS. 5A-5B.

The illustrated embodiment of the routine 600 begins at block 610, where an initial model for the decision module is determined that describes at least a portion of a target system to be controlled, one or more goals for the decision module to attempt to achieve related to control of the target system, and optionally initial state information for the target system. The routine continues to block 615 to perform one or more actions to train the initial model if needed, as discussed in greater detail with respect to blocks 553 and 555 of FIGS. 5A-5B—in some embodiments and situations, such training for block 615 is performed only if initial training is not done by the routine 500 of FIGS. 5A-5B, while in other embodiments and situations the training of block 615 is performed to capture information about a current state of the target system at a time that the decision module begins to execute (e.g., if not immediately deployed after initial creation and training) and/or to re-train the model at times as discussed in greater detail with respect to routine 700 of FIGS. 7A-7B as initiated by block 630.

After block 615, the routine continues to block 617 to determine a time period to use for performing each control action decision for the decision module, such as to reflect a rate at which control element modifications in the target system are needed and/or to reflect a rate at which new incoming state information is received that may alter future manipulations of the control elements. The routine then continues to block 620 to start the next time period, beginning with a first time period moving forward from the startup of the execution of the decision module. Blocks 620-680 are then performed in a loop for each such time period going forward until execution of the decision module is suspended or terminated, although in other embodiments a particular decision module may execute for only a single time period each time that it is executed.

In block 625, the routine optionally obtains state information for the time period, such as current state information that has been received for the target system or one or more related external sources since the last time period began, and/or by actively retrieving current values of one or more elements of the target system or corresponding variables as needed. In block 630, the routine then initiates execution of a local CCD Control Action Determination component of the decision module, with one example of such a routine discussed in greater detail with respect to routine 700 of FIGS. 7A-7B. In block 635, the results of the execution of the component in block 630 are received, including to either obtain an updated model for the decision module with a local solution for the current time period and decision module that includes one or more proposed control action determinations that the decision module may perform for the current time period, or to receive an indication that no local solution was found for the decision module in the allowed time for the execution of the component in block 630. It is then determined in block 640 whether a solution was found, and if so continues to block 642 to store the updated model for the decision module, and otherwise continues to block 643 to use the prior model for the decision module to determine one or more control action determinations that are proposed for the current time period based on a previous model (e.g., that does not reflect recent changes in state information and/or recent changes in activities of other decision modules, if any), as discussed in greater detail with respect to routine 700 of FIGS. 7A-7B.

After blocks 642 or 643, the routine continues to block 644 to determine if other decision modules are collectively controlling portions of the current target system, such as part of the same automated control system as the local decision module, and if so continues to block 645. Otherwise, the routine selects the local proposed control actions of the decision module as a final determined control action to perform, and continues to block 675 to implement those control actions for the current time period.

If there are other operating decision modules, the routine in block 645 determines if the local decision module includes a local copy of a CDD Coordinated Control Management (CCM) component for use in synchronizing the proposed control action determinations for the decision module's local solutions with activities of other decision modules that are collectively controlling the same target system. If so, the routine continues to block 647 to provide the one or more proposed control action determinations of the decision module and the corresponding current local model for the decision module to the local CDD CCM component, and otherwise continues to block 649 to provide the one or more proposed control action determinations for the decision module and the corresponding local model of the decision module to one or more centralized CDD CCM components.

After blocks 647 or 649, the routine continues to block 655 to obtain results of the actions of the CDD CCM component(s) in blocks 647 or 649, including to either obtain a further updated model resulting from synchronization of the local model for the current decision module with information from one or more other decision modules, such that the further updated model indicates one or more final control action determinations to perform for the time period for the current decision module, or an indication that no such synchronization was completed in the allowed time. The routine continues to block 660 to determine whether the synchronization was completed, and if so continues to block 665 to store the further updated model from the synchronization, and otherwise continues to block 670 to use the prior proposed control action determinations locally to the decision module as the final control action determinations for the time period.

After blocks 665 or 670, the routine continues to block 675 to implement the one or more final determined control actions for the decision module in the target system, such as by interacting with one or more effectuators in the target system that modify values or otherwise manipulate one or more control elements of the target system, or by otherwise providing input to the target system to cause such modifications or other manipulations to occur. In block 680, the routine optionally obtains information about the results in the target system of the control actions performed, and stores and/or provides information to the CDD system about such obtained results and/or about the activities of the decision module for the current time period.

After block 680, the routine continues to block 695 to determine whether to continue, such as until an indication to terminate or suspend is received (e.g., to reflect an end to current operation of the target system or an end of use of the decision module to control at least a portion of the target system). If it is determined to continue, the routine returns to block 620 to start the next time period, and otherwise continues to block 699 and ends.

Figure 7A:
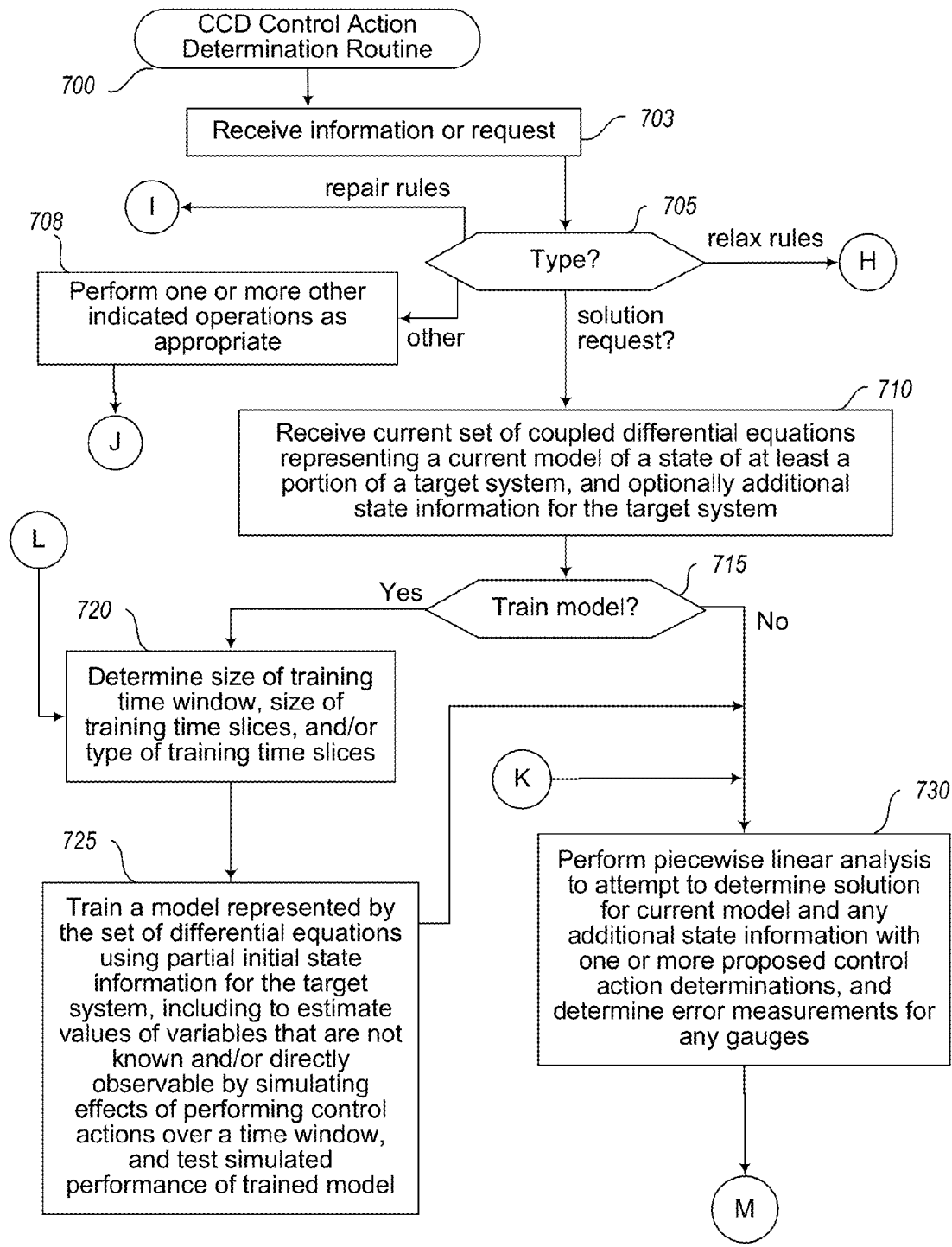
FIGS. 7A-7B illustrate a flow diagram of an example embodiment of a CDD Control Action Determination routine.
Figure 7B:
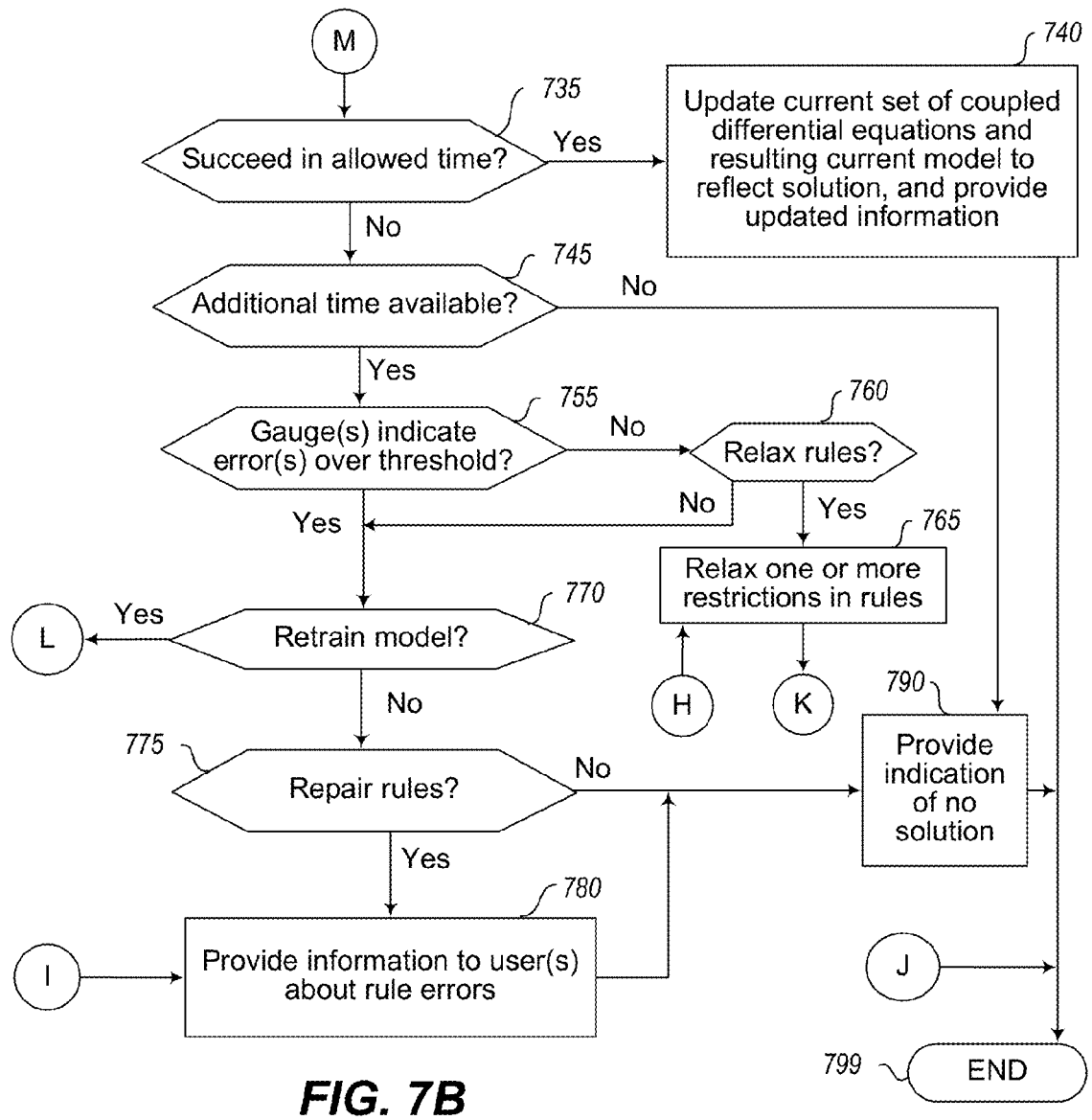

FIGS. 7A-7B are a flow diagram of a example embodiment of a CDD Control Action Determination routine 700. The routine may, for example, be provided by execution of the component 344 of FIG. 3 and/or components 144a-n or 244 of FIG. 2, such as to determine control actions for a decision module to propose and/or implement for a target system during a particular time period, including in some embodiments to perform an optimization to determine near-optimal actions (e.g., within a threshold of an optimal solution) to perform with respect to one or more goals if possible. While the illustrated embodiment of the routine is performed in a manner local to a particular decision module, such that some or all decision modules may each implement a local version of such a routine, in other embodiments the routine may be implemented in a centralized manner by one or more components with which one or more decision modules interact over one or more networks, such as with a particular decision module indicated to be used at a particular time rather than acting on behalf of the local decision module.

The illustrated embodiment of the routine 700 begins at block 703, where information or a request is received. The routine continues to block 705 to determine a type of the information or request, and to proceed accordingly. In particular, if a request is received in block 703 to attempt to determine a solution for a current time period given a current model of the local decision module, the routine continues to block 710 to begin to perform such activities, as discussed in greater detail with respect to block 710-790. If it is instead determined in block 705 that a request to relax one or more rules or other restrictions for the current model of the local decision module is received, such as discussed in greater detail with respect to blocks 760 and 765, the routine continues to block 765. If it is determined in block 705 that a request is received to repair one or more rules or other restrictions for the current model of the local decision module, such as discussed in greater detail with respect to blocks 775 and 780, the routine continues to block 780 to obtain user input to use during the rule repair process (e.g., to interact with a CDD Decision Module Construction component, or to instead interact with one or more users in another manner), such as to allow the current model for the local decision module to later be updated and replaced based on further resulting user actions, or if operation of the target system can be suspended, to optionally wait to further perform the routine 700 until such an updated model is received. If it is instead determined in block 705 that the information or request is of another type, the routine continues instead to block 708 to perform one or more other indicated operations as appropriate, and to then proceed to block 799. Such other indicated operations may include, for example, receiving information about current models and/or control actions proposed or performed by one or more other decision modules that are collectively controlling a target system with the local decision module (such as for use in synchronizing the model of the local decision module with such other decision modules by generating a consensus or converged shared model, as discussed in greater detail with respect to routine 800 of FIGS. 8A-8B), to receive updates to a model or underlying information for the model for use in ongoing operation of the routine 700 (e.g., from a CDD Decision Module Construction component, such as results from interactions performed in block 780), to receive current state information for the target system, such as for use as discussed in routine 600 of FIGS. 6A-6B, etc.

If it determined in block 705 that a request for a solution was received in block 703 for a current time period and based on a current model of the local decision module, the routine continues to block 710 to receive a current set of coupled differential equations that represent the current model for the local decision module of at least a portion of the target system, optionally along with additional state information for the target system for the current time. The routine then continues to block 715 to determine whether to train or re-train the model, such as if the routine is called for a first time upon initial execution of a corresponding decision module or if error measurements from ongoing operations indicate a need for re-training, as discussed in greater detail with respect to blocks 755, 770 and 730. If it is determined to train or re-train the model, the routine continues to block 720 to determine one or more of the size of a training time window, size of training time slices within the time window, and/or type of training time slices within the training time window, such as in a manner similar to that previously discussed with respect to block 553 of routine 500 of FIGS. 5A-5B. After block 720, the routine continues to block 725 to use partial initial state information for the target system to train the model, including to estimate values of state variables for the target system that are not known and/or directly observable, by simulating effects of performing control actions over the time window for each of the time slices, as discussed in greater detail with respect to block 555 of routine 500 of FIGS. 5A-5B.

After block 725, or if it is instead determined in block 715 not to train or re-train the model, the routine continues to block 730 to perform a piecewise linear analysis to attempt to determine a solution for the current model and any additional state information that was obtained in block 710, with the solution (if determined) including one or more proposed control action determinations for the local decision module to take for a current time period, as well as in some embodiments to use one or more model error gauges to make one or more error measurements with respect to the current model, as discussed in greater detail elsewhere. The routine then continues to block 735 to determine if the operations in block 730 determined a solution within a amount of time allowed for the operation of block 730 (e.g., a defined subset or fraction of the current time period), and if so continues to block 740 to update the current set of coupled differential equations and the resulting current model for the local decision module to reflect the solution, with the resulting updated information provided as an output of the routine 700.

If it is instead determined in block 735 that the operations in block 730 did not determine a solution, the routine continues to block 745 to determine if additional time is available within the current time period for further attempts to determine a solution, and if not continues to block 790 to provide output of the routine 700 indicating that no solution was determined for the current time period.

If additional time is available within the current time period, however, the routine continues to perform blocks 755-780 to perform one or more further attempts to identify the solution—it will be appreciated that one or more of the operations of blocks 755-780 may be repeatedly performed multiple times for a given time period if sufficient time is available to continue further solution determination attempts. In particular, the routine continues to block 755 if additional time is determined to be available in block 745, where it determines whether the measurements from one or more gauges indicate model error measurements that are over one or more thresholds indicating modifications to the model are needed, such as based on the model error measurements from the gauges discussed with respect to block 730. If not, the routine continues to block 760 to determine whether there are one or more rules or other restrictions in the current model that are available to be relaxed for the current time period (that have not previously attempted to be relaxed during the time period, if this is not the first pass through this portion of the routing for the current time period), and if so continues to block 765 to relax one or more such rules or other restrictions and to return to block 730 to re-attempt the piecewise linear analysis with the revised model based on those relaxed rules or other restrictions.

If it is instead determined in block 755 that the model error measurements from one or more of the gauges are sufficient to satisfy one or more corresponding thresholds, the routine continues instead to block 770 to determine whether to re-train the model based on one or more of the gauges indicating sufficient errors to do so, such as based on accumulated errors over one or more time periods of updates to the model. If so, the routine returns to block 720 to perform such re-training in blocks 720 and 725, and then continues to block 730 to re-attempt the piecewise linear analysis with the resulting re-trained model.

If it is instead determined in block 770 not to re-train the model (or if the model was re-trained already for the current time period and the resulting re-attempt in block 730 again failed to find a solution), the routine continues to block 775 to determine whether the model error measurements from one or more of the gauges indicate a subset of one or more rules or other restrictions in the model that potentially have errors that need to be repaired. If so, the routine continues to block 780 to provide information to one or more users via the CDD Decision Module Construction component, to allow the users to revise the rules or other restrictions as appropriate, although in other embodiments some or all such rule repair activities may instead be attempted or performed in an automated manner. After block 780, or if it is instead determined in block 775 not to repair any rules, the routine continues to block 790 to provide an indication that no solution was determined for the current time period. After blocks 740, 708, or 790, the routine continues to block 799 and ends. It will be appreciated that if the routine 700 was instead implemented as a centralized routine that supports one or more decision modules remote from the executing component for the routine, the routine 700 may instead return to block 703 to await further information or requests.

Figure 8A:
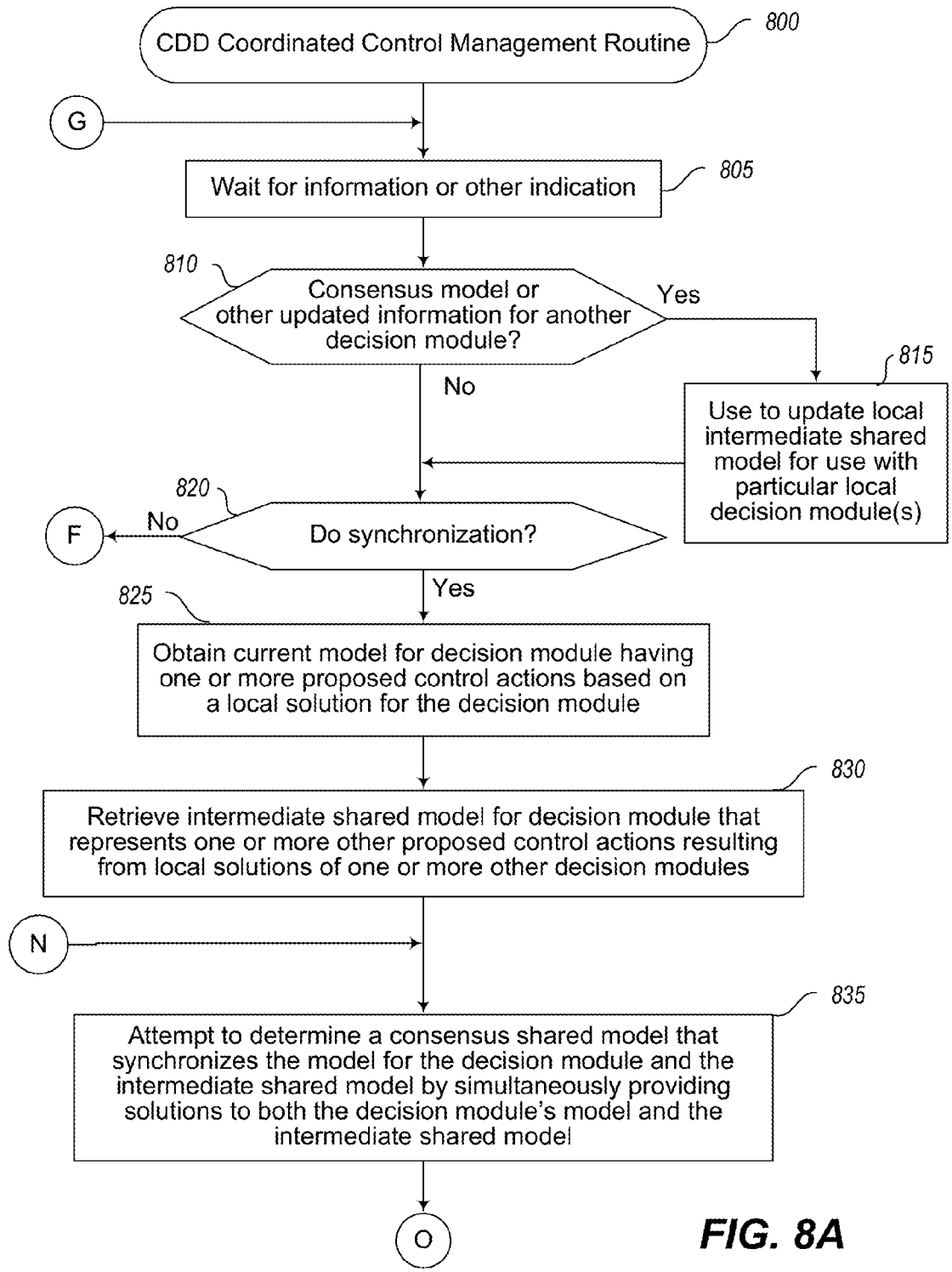
FIGS. 8A-8B illustrate a flow diagram of an example embodiment of a CDD Coordinated Control Management routine.
Figure 8B:
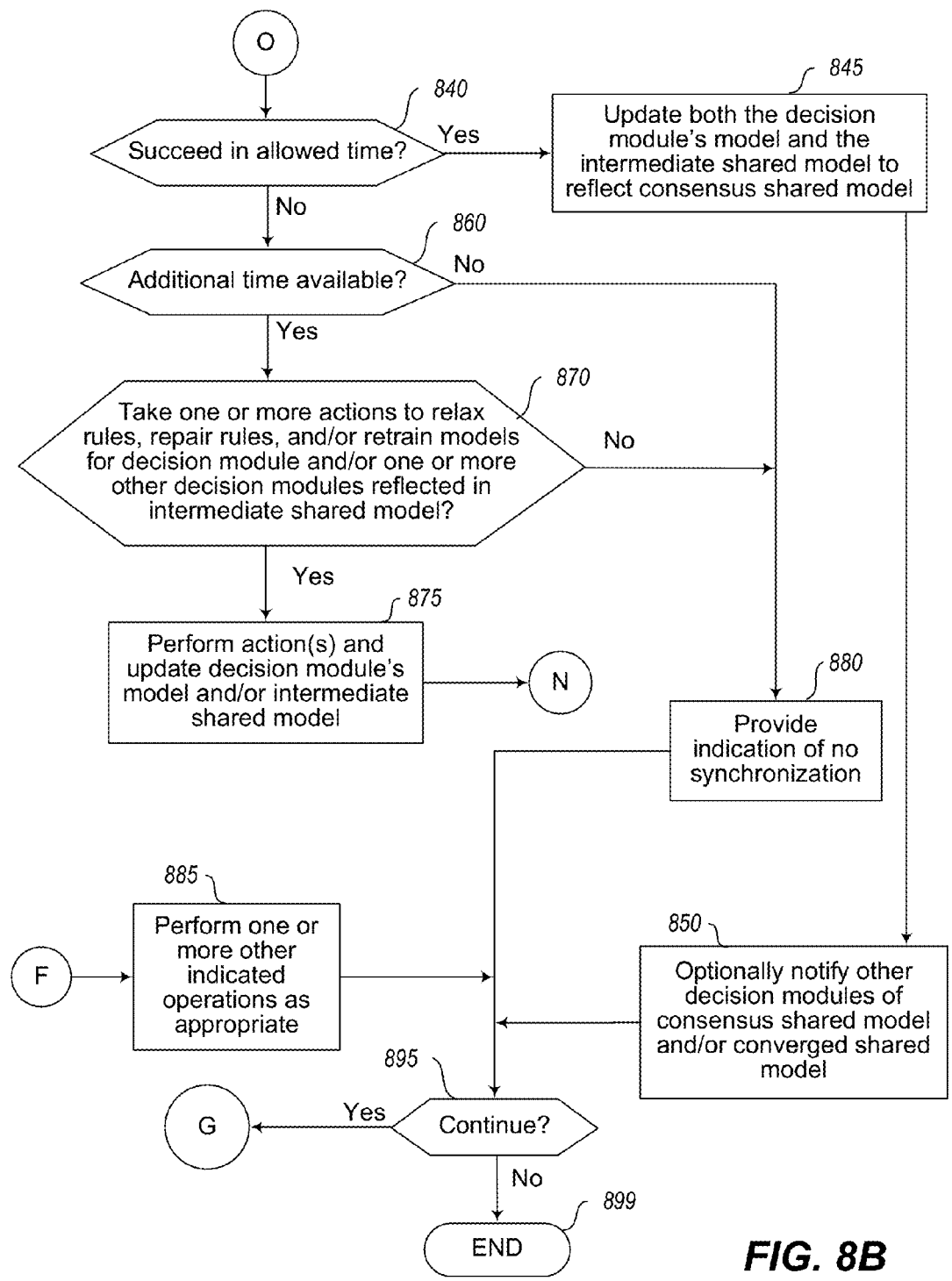

FIGS. 8A-8B are a flow diagram of an example embodiment of a CDD Coordinated Control Management routine 800. The routine may, for example, be provided by execution of the component 346 of FIG. 3 and/or the components 146a-n of FIG. 2, such as to attempt to synchronize current models and their proposed control actions between multiple decision modules that are collectively controlling a target system. In the illustrated embodiment of the routine, the synchronization is performed in a pairwise manner between a particular local decision module's local current model and an intermediate shared model for that decision module that is based on information about the current state of one or more other decision modules, by using a Pareto game technique to determine a Pareto equilibrium if possible that is represented in a consensus shared model, although in other embodiments other types of synchronization methods may be used. In addition, in the illustrated embodiment, the routine 800 is performed in a local manner for a particular local decision module, such as by being included within that local decision module, although in other embodiments the routine 800 may be implemented in a centralized manner to support one or more decision modules that are remote from a computing system implementing the component for the routine and that communicate with those decision modules over one or more computer networks, such as with a particular decision module indicated to be used at a particular time rather than acting on behalf of the local decision module.

The illustrated embodiment of the routine 800 begins at block 805, where it waits to receive information or another indication. The routine continues to block 810 to determine if a consensus model or other updated information for another decision module has been received, such as from a copy of the routine 800 executing for that other decision module, and if so continues to block 815 to use the received information to update local intermediate shared model information for use with the local decision module on whose behalf the current copy of the routine 800 is executing, as discussed in greater detail with respect to block 830. If it is instead determined in block 810 that the information or request received in block 805 is not information related to one or more other decision modules, or after block 815, the routine continues to block 820 to determine whether to currently perform a synchronization for the current local model of the local decision module by using information about an intermediate shared model of the local decision module that includes information for one or more other decision modules, such as to do such synchronization each time that an update to the local decision module's model is received (e.g., based on operation of the routine 700 for a copy of the CDD Control Action Determination component local to that decision module) in block 805 and/or each time that information to update the local decision module's intermediate shared model is received in block 805 and used in block 815, or instead as explicitly indicated in block 805—if the synchronization is to currently be performed, the routine continues to block 825 and begins to perform blocks 820-880 related to such synchronization activities. Otherwise, the routine continues to block 885 to perform one or more other indicated operations as appropriate, such as to receive requests from the CDD system or other requestor for current information about operation of the routine 800 and/or to provide corresponding information to one or more entities (e.g., to reflect prior requests), etc.

If it is determined in block 820 that synchronization is to be currently performed, such as based on updated model-related information that is received in block 805, the routine continues to block 825 to obtain a current local model for the local decision module to use in the synchronizing, with the model including one or more proposed control actions to perform for a current time period based on a local solution for the local decision module. The routine then continues to block 830 to retrieve information for an intermediate shared model of the local decision module that represents information for one or more other decision modules (e.g., all other decision modules) that are collectively participating in controlling the target system, with that intermediate shared model similarly representing one or more other proposed control actions resulting from local solutions of those one or more other decision modules, optionally after partial or complete synchronization has been performed for those one or more other decision modules between themselves.

The routine then continues to block 835 to attempt to determine a consensus shared model that synchronizes the current model of the local decision module and the intermediate shared model by simultaneously providing solutions to both the local decision module's current model and the intermediate shared model. In some embodiments, the operations of block 835 are performed in a manner similar to that discussed with respect to blocks 710-730 of routine 700 of FIG. 7A-7B, such as if the local model and the intermediate shared model are combined to create a combination model for whom one or more solutions are to be identified. As discussed in greater detail elsewhere, in some embodiments, the local current model and intermediate shared model may each be represented by a Hamiltonian function to enable a straightforward creation of such a combined model in an additive manner for the respective Hamiltonian functions, with the operations of routines 600 and/or 700 of FIGS. 6A-6B and 7A-7B, respectively, similarly representing the models that they update and otherwise manipulate using such Hamiltonian functions.

After block 835, the routine continues to block 840 to determine whether the operations of block 835 succeeded in an allowed amount of time, such as a fraction or other portion of the current time period for which the synchronization is attempted to be performed, and if so the routine continues to block 845 to update both the local model and the intermediate shared model of the local decision module to reflect the consensus shared model. As earlier noted, if sufficient time is allowed for each decision module to repeatedly determine a consensus shared model with changing intermediate shared models representing one or more other decision modules of a collective group, the decision modules of the collective group may eventually converge on a single converged shared model, although in other embodiments and situations there may not be sufficient time for such convergence to occur, or other issues may prevent such convergence. After block 845, the routine continues to block 850 to optionally notify other decision modules of the consensus shared model determined for the local decision module (and/or of a converged shared model, if the operations of 835 were a last step in creating such a converged shared model), such as if each of the notified decision modules is implementing its own local version of the routine 800 and the provided information will be used as part of an intermediate shared model of those other decision modules that includes information from the current local decision module's newly constructed consensus shared model.

If it is instead determined in block 840 that a synchronization did not occur in the allowed time, the routine continues to perform blocks 860-875 to re-attempt the synchronization with one or more modifications, sometimes repeatedly if sufficient time is available, and in a manner similar to that discussed with respect to blocks 745-780 of routine 700 of FIGS. 7A-7B. In the illustrated example, the routine determines in block 860 if additional time is available for one or more such re-attempts at synchronization, and if not the routine continues to block 880 to provide an indication that no synchronization was performed within the allowed time. Otherwise, the routine continues to block 870 to take one or more actions to perform one or more of relaxing rules or other restrictions, repairing rules or other restrictions, and/or re-training a model, with respect to one or both of the current model of the local decision module and/or one or more other decision modules whose information is represented in the intermediate shared model of the local decision module. If it is determined in block 870 to proceed in this manner, the routine continues to block 875 to perform corresponding actions, sometimes one at a time in a manner similar to that discussed with respect to routine 700, including to cause resulting updates to the current model of the local decision module and/or to the local intermediate shared model of the local decision module, after which the routine returns to block 835 to re-attempt to synchronize the local model and the intermediate shared model of the local decision module.

If it is instead determined in block 870 that no further actions are to be performed with respect to relaxation, repair and/or re-training, the routine continues instead to block 880. After blocks 850, 880 or 885, the routine continues to block 895 to determine whether to continue, such as until an explicit indication to terminate or suspend operation of the routine 800 is received, such as to reflect an end to operation of the target system and/or an end to use of the local decision module and/or a collective group of multiple decision modules to control the target system. If it is determined to continue, the routine returns to block 805, and otherwise continues to block 899 and ends.

Figure 9:
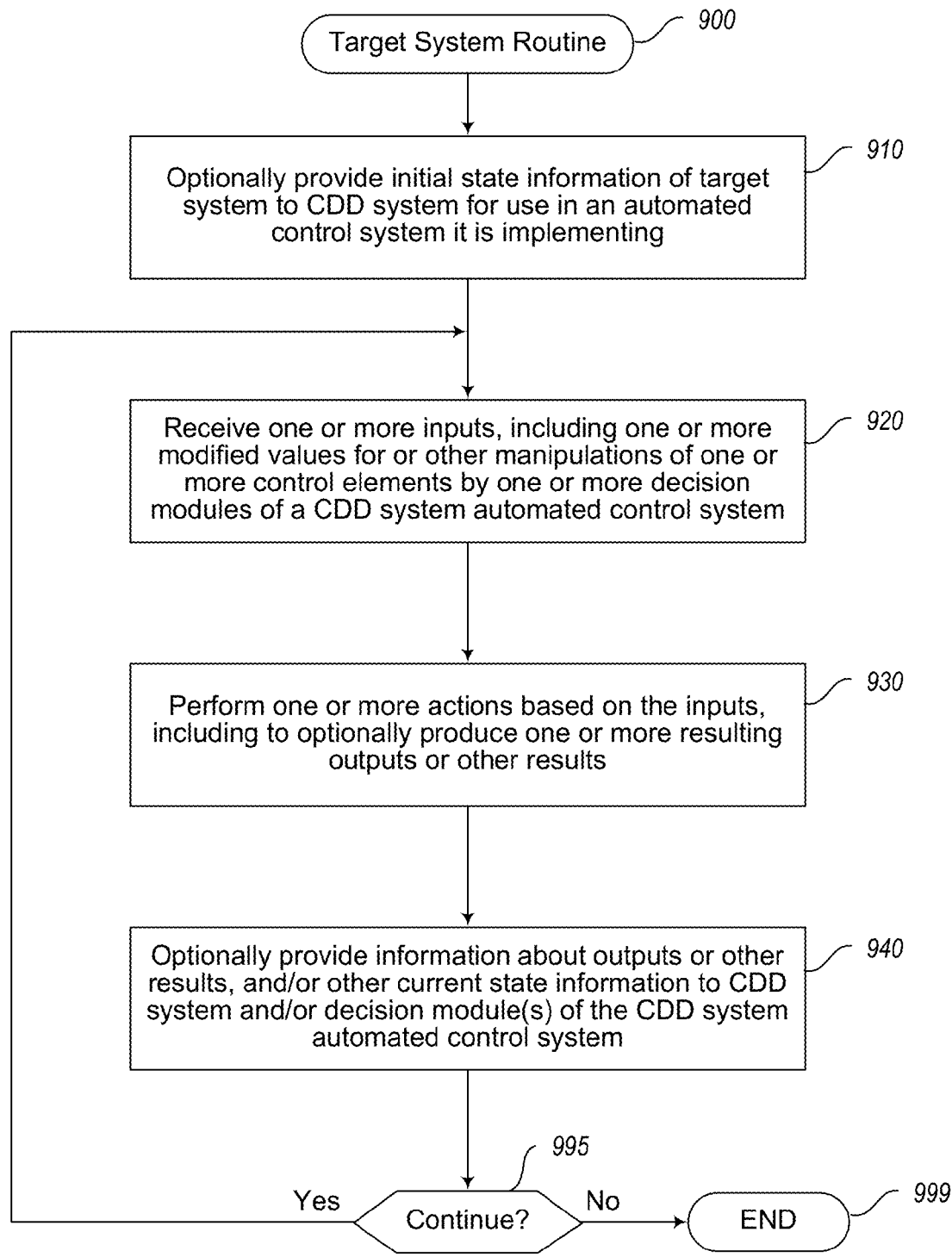
FIG. 9 illustrates a flow diagram of an example embodiment of a routine for a target system being controlled.

FIG. 9 illustrates a flow diagram of an example embodiment of a routine 900 performed for a representative generic target system, with respect to interactions between the target system and one or more decision modules that are controlling at least a portion of the target system. The routine may, for example, be provided by execution of a target system 360 and/or 370 of FIG. 3, and/or a target system 160 and/or 170 of FIGS. 1 and 2, such as to implement operations specific to the target system. It will be appreciated that the illustrated embodiment of the routine focuses on interactions of the target system with the one or more decision modules, and that many or all such target systems will perform many other operations in a manner specific to those target systems that are not illustrated here for the purpose of brevity.

The routine begins at block 910, where it optionally provides initial state information for the target system to a CDD system for use in an automated control system of the CDD system for the target system, such as in response to a request from the CDD system or its automated control system for the target system, or instead based on configuration specific to the target system (e.g., to be performed upon startup of the target system). After block 910, the routine continues to block 920 to receive one or more inputs from a collective group of one or more decision modules that implement the automated control system for the target system, including one or more modified values for or other manipulations of one or more control elements of a plurality of elements of the target system that are performed by one or more such decision modules of the automated control system. As discussed in greater detail elsewhere, the blocks 920, 930, 940 may be repeatedly performed for each of multiple time periods, which may vary greatly in time depending on the target system (e.g., a microsecond, a millisecond, a hundredth of a second, a tenth of a second, a second, 2 seconds, 5 seconds, 10 seconds, 15 seconds, 30 seconds, a minute, 5 minutes, 10 minutes, 15 minutes, 30 minutes, an hour, etc.).

After block 920, the routine continues to block 930 to perform one or more actions in the target system based on the inputs received, including to optionally produce one or more resulting outputs or other results within the target system based on the manipulations of the control elements. In block 940, the routine then optionally provides information about the outputs or other results within the target system and/or provides other current state information for the target system to the automated control system of the CDD system and/or to particular decision modules of the automated control system. The routine then continues to block 995 to determine whether to continue, such as until an explicit indication to terminate or suspend operation of the target system is received. If it is determined to continue, the routine returns to block 920 to begin a next set of control actions for a next time period, and otherwise continues to block 999 and ends. As discussed in greater detail elsewhere, state information that is provided to a particular decision module may include requests from external systems to the target system, which the automated control system and its decision modules may determine how to respond to in one or more manners.

The following sections describe a variety of specific, non-exclusive embodiments in which some or all of the described techniques may be implemented. It will be appreciated that particular details of particular embodiments may not be included in or true for all embodiments, and that the described embodiments may be implemented individually or in combination with any and all other combinations of other embodiments.

The following discusses several non-exclusive example embodiment, in which one or more specified embodiments of the Collaborative Distributed Decision system are each referred to as a Collaborative Distributed Inferencing (CDI) system or a Cooperative Distributed Inferencing Platform (CDIP), in which one or more specified embodiments of the Decision Module Construction component are each referred to as the "Rules Builder" or including or being performed by a "Rule Conversion Engine" (RCE) or a "CDL Compiler" or a "Rule(s) Entry Interface" (REI) or a "Rules and Goals UI", in which one or more specified embodiments of the Control Action Determination component are each referred to as having "chattering" subcomponents or performing "chattering" functionality or including or being performed by a "Query Response Engine" (QRE) or an "Optimization Element" or via "Hamiltonian-Chattering Control", in which one or more specified embodiments of the Coordinated Control Management component are each referred to as having or performing "mean field" information or functionality or including or being performed by a "Tellegen" agent or a "Pareto Multi-Criteria Optimization Engine" (PMOE) or a "Pareto element", in which decision modules are referred to as "agents" or "peer agents" or "agent nodes" or "decision elements", in which an automated control system may include a "cluster" of agents and in some cases is referred to as a "distributed architecture", in which a target system is referred to as an "application domain", in which a decision module's stored information about a target system includes an "Internal Heterogeneous Database" (IHDB) and/or a "Domain Rules Knowledge Base", in which a decision module's consensus shared model is referred to as an "internal optimum" generated using mean field information, in which changes propagated from one decision module to others is referred to as a "delta", etc.

Figure 10:
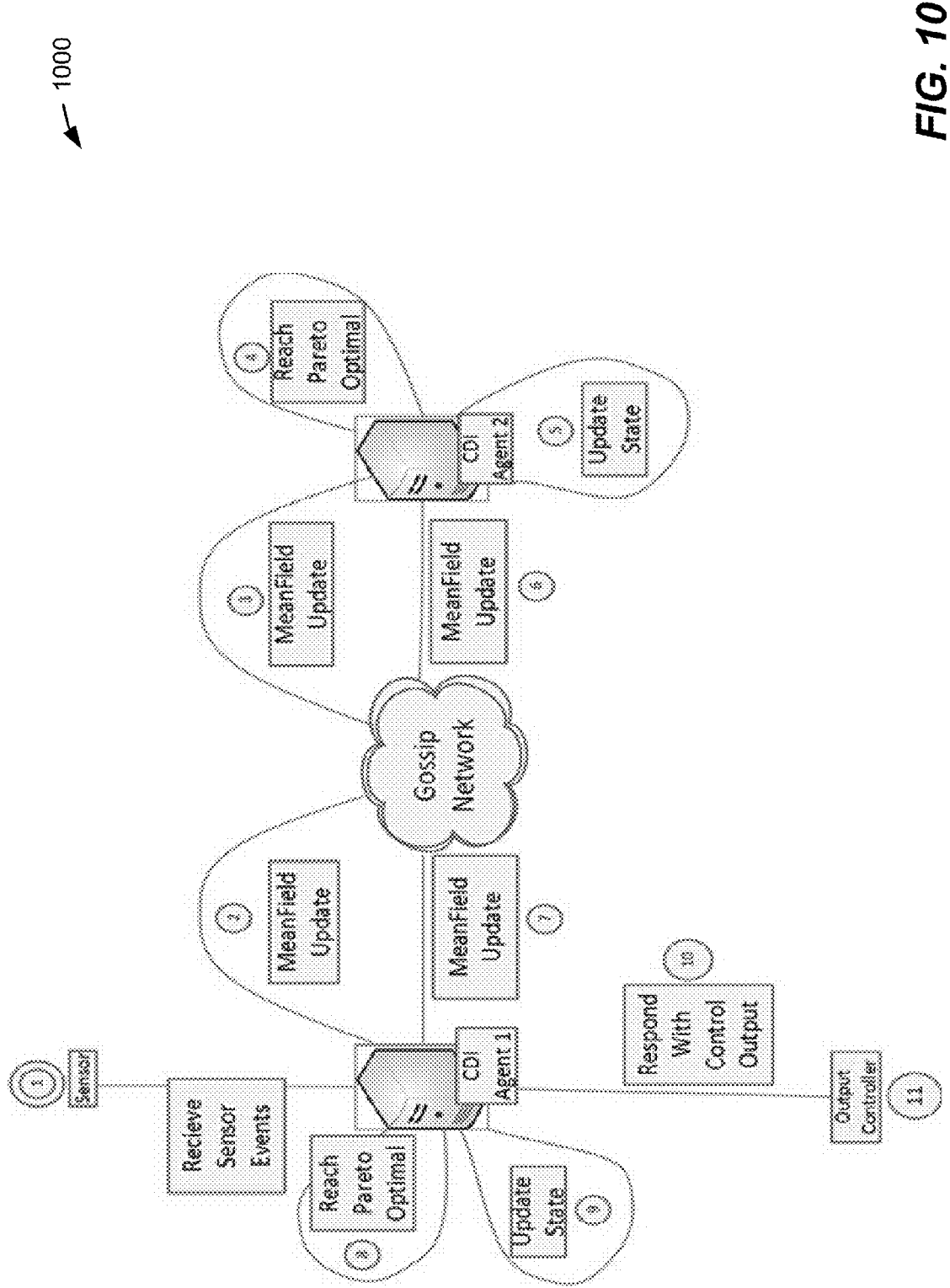
FIG. 10 illustrates a network diagram of a portion of a distributed architecture of an example CDI system.

CDI is built using a Peer-to-Peer (P2P) based distributed architecture that allows for partitioning the overall optimization problem into smaller sub-tasks or work-loads between peer agents. CDI Peer Agents are equally privileged participants in the application domain. They are configured to form a peer-to-peer network of nodes. This allows each agent in the network to solve the problem independently, using its own internal knowledge base. Each agent also internally engages in Pareto game playing to reach internal optimum before sharing changes with other agents. The agents then communicate the mean field changes with other agents in the network using a gossip protocol to synchronize their internal mean field approximation in an eventually consistent fashion. FIG. 10 illustrates a network diagram 1000 of a portion of a distributed architecture of an example CDI system.

CDI Cluster Setup

When system is initially configured certain agents are tagged as seed-nodes in the network. The seed agent nodes can be started in any order and it is not necessary to have all the seed agent nodes running. When initializing the CDI cluster at least one seed agent node is preferably running, otherwise the other CDI seed nodes may not become initialized and other CDI agent nodes might not join the cluster.

CDI Agent Cluster Registry

Each agent has a built-in registry of active CDI agent nodes in the cluster. This agent registry is started on all CDI agent nodes and is updated with every change in cluster membership including new agents joining the cluster, agents leaving the cluster, agent timeouts etc. Agents inform each other of active membership through a heartbeat mechanism. The registry is eventually consistent, i.e. changes may not immediately be visible at other nodes, but typically they will be fully replicated to all other nodes after a few seconds. The changed are propagated using the change deltas and are disseminated in a scalable way to other nodes with a gossip protocol.

CDI Cluster Agent Failure Detection

The CDI agent nodes in the cluster monitor each other by sending heartbeats to detect if a CDI agent node is unreachable from the rest of the CDI cluster. The heartbeat arrival times is interpreted by an implementation of the Phi Accrual Failure Detector (Hayashibara, Défago, Yared, & Katayama, 2004).

The suspicion level of failure is given by a value called phi. The basic idea of the phi failure detector is to express the value of phi on a scale that is dynamically adjusted to reflect current network conditions.

The value of phi is calculated as:

$$\text{Phi} = -\log 10(1 - F(\text{timeSinceLastHeartbeat}))$$

F is the cumulative distribution function of a normal distribution with mean and standard deviation estimated from historical heartbeat inter-arrival times.

CDI Cluster Agent Network Partition

Once a CDI agent node becomes network partitioned it will stop receiving mean field updates from the other agents in the Cluster. This however, should not prevent it from continuing to perform local optimizations based on its internal knowledge base, local mean field and sensor inputs that it will continue to receive.

The Rules Builder contains the following components:
Rules Entry Interface
Validator
CDL Compiler
Step Processor
Workflow Remote Control
Compiled Rules Engine Artifact
And interacts directly with the following components:
Master Agent.

Figure 11:
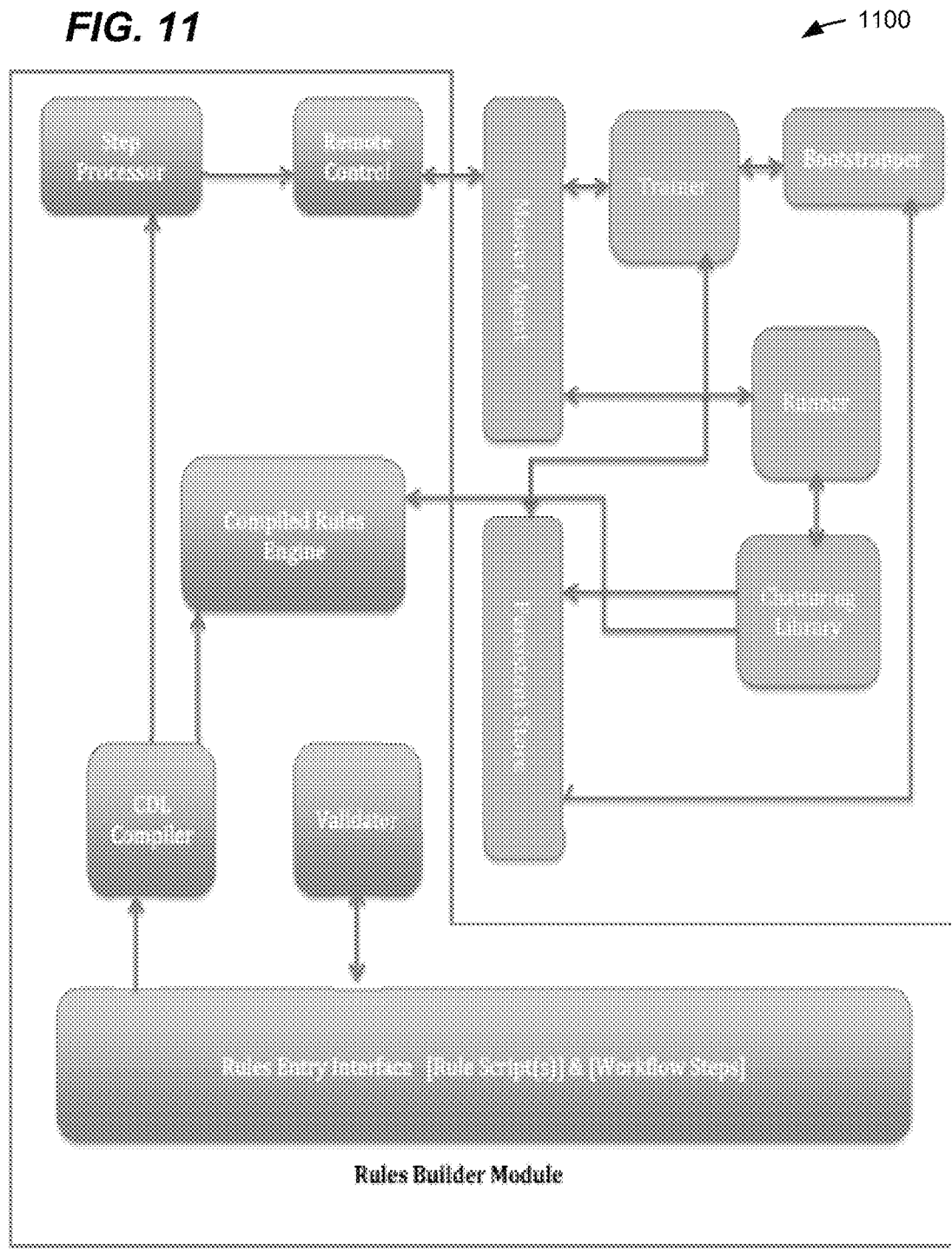
FIG. 11 illustrates a network diagram of a portion of an example Rules Builder component.

The Master Agent is responsible for interaction with all Chattering components, including the following:
System Trainer & Bootstrapper
Runner The System also utilizes a Persistent Store to access state and necessary models/data. FIG. 11 illustrates a network diagram 1100 of a portion of an example Rules Builder component.

Rules Entry Interface:

The Rules Entry Interface is responsible for receiving rules in a syntax familiar to a domain expert. The entry interface is a text entry tool where a domain expert would insert the rules, goal and system information (rules script(s)) to provide continuous control suggestions for a given problem. The entered rules script(s) would be composed in the CDI Domain-Specific Language (DSL). The CDI DSL facilitates functional translation of the entered rules script(s) into a problem definition which houses the control definitions (measurable variable with ranges allowed and any associated constraints on the control variable).

For example:

In the entry interface using the CDI DSL one would specify an upper and lower bound using the following syntax first defining a rule, with the parameters and the rule logic that evaluates against the system state.

rule id: "max production", params: ["production"], {it<=15.0}
rule id: "min production", params: ["production"], {it>=−50.0}
control var: "production", min: "min production", max: "max production"

In the entry interface using the CDI DSL one would specify the dynamics (variables that change with relation to other measurable variables and the definition of this change)

delta var: "inventory", params: ["production", "demand"], {p, d→p-d}

In the entry interface using the CDI DSL one would specify the goal (an objective i.e., to minimize or maximize a relationship between the control and controllable dynamics).

goal objective: "minimize", params: ["inventory", "production"], {inventory, production→((inventory−10)*(inventory−10))+(production*production)}

Finally, the entry interface is also responsible for facilitating a domain expert to provide certain settings that are used by the system as well as providing user workflow steps. The settings provided represent key: value terms used by the system and are available throughout by the Settings Provider encapsulated within the Rules Engine. An domain expert might write initial values of the following form:

settings <<[initialState: "20", initialCoState: "0", terminalCoState: "0", numChatteringLevels: "9", horizon: "3", delta: "0.1", iterations: "15"]

CDL Compiler:

The CDL Compiler is responsible for the conversion of said rules into evaluatable constraints, system information and an optimization goal. The CDI Compiler translates the entered script(s) into a problem definition. A problem definition is composed of labeled rules. A rule is a tuple comprised of a unique name and a Term. A Term is an evaluatable function where the logic was authored as previously described above, the input to which contains a representation of the system state (StateMap).

Validator:

The Validator is responsible for the validation of converted constraints with regards to restrictions the optimization problem needs to satisfy as a prerequisite to its solution and/or reaching a solution quality threshold.

The converted constraints defined in the problem definition, along with the settings provider, is validated for controllability, observability, stability and goal completeness.

controllability—this check ensures that every control variable has a defined rule relating it to one or more dynamic state variables. The above example satisfies this check since our single control variable 'production' is used in the dynamic definition of 'inventory';

observability—checks the statemap against the defined rules in the script(s). An observability check does not impede the solution of a problem, however if failing, represents that our problem may not be well defined;

stability—this check ensures that our system will converge over time on a solution, which can be tested in the testing stage; and goal completeness—ensures that every control variable appears in the goal.

Figure 12:
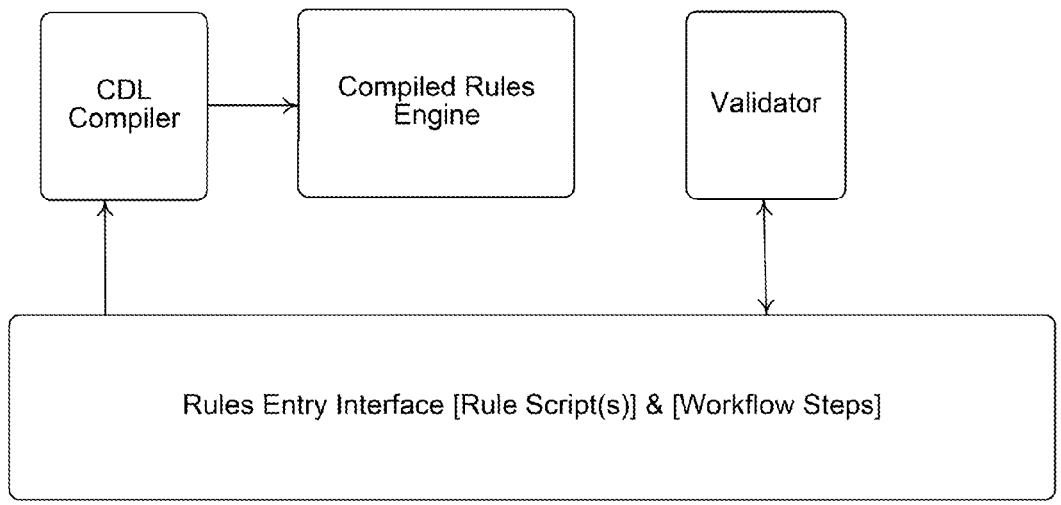
FIG. 12 illustrates a network diagram of example subcomponents of an example Rules Builder component.

Compiled Rules Engine:

The conversion of rule scripts into mathematical expressions that can be yielded through an explicit contract to the chattering agent for use in solving the optimization goal, manifests in the compiled artifact that we label the Compiled Rules Engine The Rules Engine defines and implements several interfaces for acquiring the values of these mathematical expressions, as later described with respect to "chattering" components. The Rules Engine is compiled as an artifact available to the Chattering component by the Compiler and made available for use in continuous processing. FIG. 12 illustrates a network diagram 1200 of example sub-components of an example Rules Builder component, in which compilation is dependent upon successful Validation of the observability, completeness, controllability, and workflow step validation. Any errors/warnings are returned to the domain expert for correction. Once corrections/improvements are complete, a new Compiled Rules Engine artifact is produced along with new commands delivered to the Step Processor.

Steps Processor and Remote Control:

Furthermore, the rules builder is also responsible for facilitating the workflow steps an individual domain expert would need to undertake before deploying such a system. These steps include:

training an optimization system using the converted rules, with bootstrapped sensor data;

testing the resulting control actuator inputs (the end results of the chattering optimization); and persisting the trained model for use in the running of the overall system.

The workflow component allows for training and testing a system. This is integrated into the DSL in the form of a workflow step builder.

For example,

```
workflow {
    train.onComplete {
    persist: model, '/tmp/model'
        run.withSensorData('/tmp/simulatedData').after(10 minutes)
        {
            persist: results, '/tmp/results'
            shutdown
        }
    }
}
```

Here a domain expert instructs the default bootstrapper to be used in loading predefined sensor data, train the system on this data, persist the trained model output to the file '/tmp/model', then once trained to begin running the system (as a single agent). The inputs are tested by analyzing the results from the run. The artifacts and model information are persisted to a persistent store. The Steps Processor facilitates the dispatch of interpreted workflow steps to the Remote Control for delegation to the Master Agent of a running system for processing.

Figure 13:
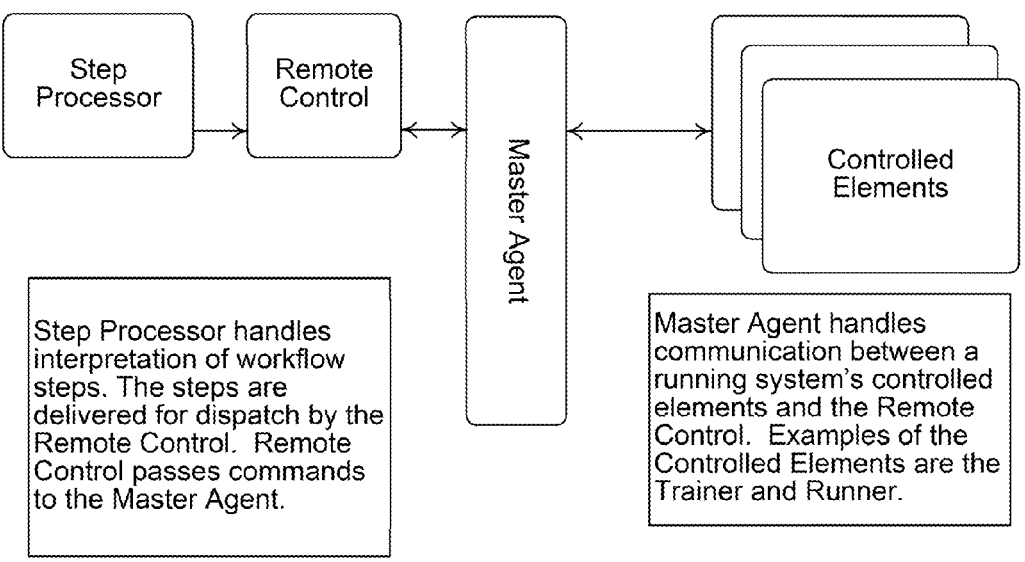
FIG. 13 illustrates a network diagram of interactions of portions of a Rules Builder component with an executing agent.

FIG. 13 illustrates a network diagram 1300 of interactions of portions of a Rules Builder component with an executing agent, including the Steps processor, the Remote Control and interactions with a running agent (the Step Processor handles interpretation of workflow steps, and the steps are delivered for dispatch by the Remote Control, which passes commands to the Master Agent; the Master Agent handles communication between a running system's controlled elements and the Remote Control, and examples of the Controlled Elements are the Trainer and Runner).

Figure 14:
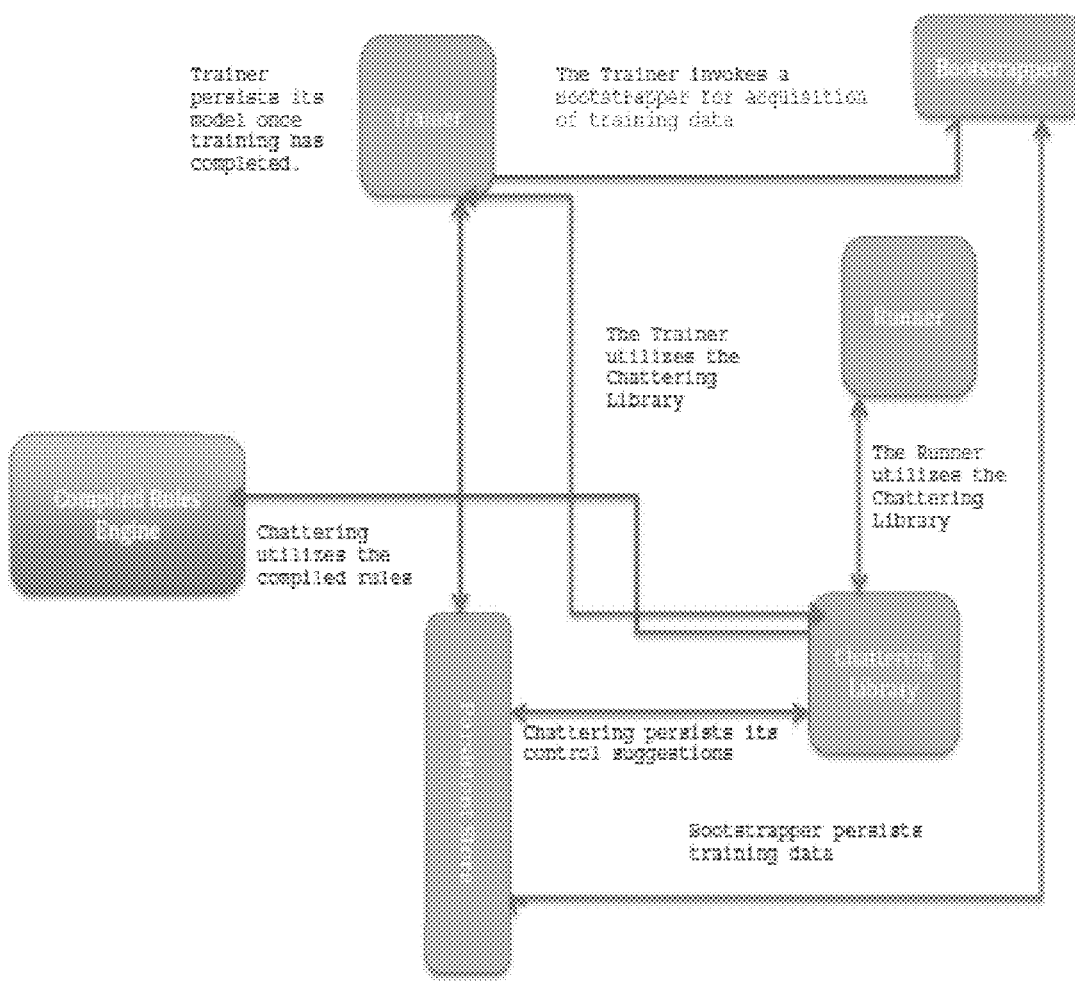
FIG. 14 illustrates a network diagram of interactions of portions of a Rules Builder component with chattering components.

FIG. 14 illustrates a network diagram 1400 of interactions of portions of a Rules Builder component with chattering components, including a Running Agent that delivers messages and interacts with the chattering components to facilitate training and running the system (the Trainer persists its model once training has completed; The Trainer invokes a Bootstrapper for acquisition of training data; The Trainer utilizes the Chattering Library; The Trainer utilizes the Chattering Library; Chattering utilizes the compiled rules; Chattering persists its control suggestions; Bootstrapper persists training data).

Figure 15:
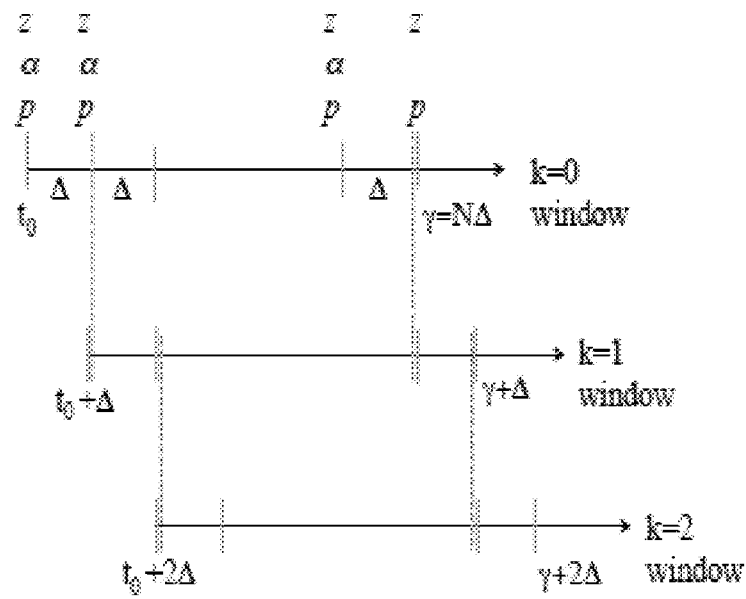
FIG. 15 illustrates a diagram of a sliding window for use with chattering.
Figure 16:
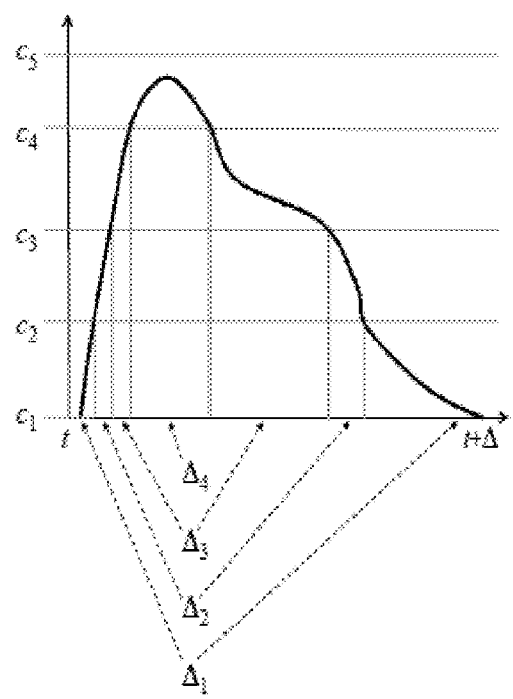
FIG. 16 illustrates a diagram of using Lebesgue integration to approximate a control trajectory for chattering.

With respect to the discussion below, FIG. 15 illustrates a diagram 1500 of a sliding window for use with chattering, and is referred to in the text for the example embodiment as "FIG. 1", while FIG. 16 illustrates a diagram 1600 of using Lebesgue integration to approximate a control trajectory for chattering, and is referred to in the text for the example embodiment as "FIG. 2".

1. Parametric Chattering Control Over a Rolling Horizon

The real-time problem we would like to solve is really over an infinite time horizon in real-time, but our approach is to consider a window of fixed length, and then apply invariant imbedding as we increase the window length to achieve an optimal relaxed control. The chattering control is applied to the window of fixed length, and results in a relatively easily solved problem. Then the window slides to a point where, perhaps, a new measurement is available, or a new control action is applicable. And the algorithm iterates in this manner.

To develop our chattering control method, we first start with a classical, deterministic control problem of the form, $$\min_{u(t) \in U} \int_{t_0}^{T} \mathcal{L}(x(t), u(t)) \, dt + \psi(x(T)) \tag{1}$$

$$\text{s.t.} \quad x(t) = x(t_0) + \int_{t_0}^{t} f(x(\tau), u(\tau)) \, d\tau$$

or alternatively $$\text{s.t.} \quad \dot{x}(t) = f(x(t), u(t))$$

for $t_0 \leq t \leq T$ where $x(t) \in \mathfrak{R}^n$, $u(t) \in U \subset \mathfrak{R}^m$, $L$ is twice continuously differentiable with respect to x and continuous with respect to u, $\psi(x(T)): \mathfrak{R}^n \rightarrow \mathfrak{R}$, and is continuous and twice continuously differentiable with respect to x. Also, $f(x(t),u(t))$ is twice continuously differentiable with respect to x and u. The time horizon T is assumed to be finite and known. We also assume initial conditions $x(t_0)$ are known.

The objective is to get the behavior at T based on information from the recent past. We develop discrete time windows with dynamics of recent past, update the state with sensory information, and construct an open loop feedback strategy.

We reformulate Problem (1) to a standard form. First we introduce a new variable $x_{n+1}(t)$, with $x_{n+1}(t_0)=0$, and defined by $$\dot{x}_{n+1}(t) = L(x(t), u(t)). \tag{2}$$

Note that, for $t_0 \leq t \leq T$, $$x_{n+1}(t) = \int_{t_0}^{t} \mathcal{L}(x(\tau), u(\tau)) \, dt.$$

Further, convert the terminal term in the criterion by defining a state variable $y(t) \in \mathfrak{R}^1$, with $y(t_0)=0$, and $$\dot{y}(t) = \frac{\partial \psi(x(t))}{\partial x(t)} f(x(t), u(t)) \tag{3}$$

for $t_0 \leq t \leq T$. Note that $y(T)=\psi(x(T))$ for any trajectory since $$\dot{y}(t) = \frac{\partial \psi(x(t))}{\partial x(t)} \dot{x}(t).$$

The original control problem (1) is now of the form $$\min_{u(t) \in U} x_{n+1}(T) + y(T)$$

$$\text{s.t.} \quad x_{n+1}(t) = \int_{t_0}^{t} \mathcal{L}(x(\tau), u(\tau)) \, d\tau$$

$$y(t) = \int_{t_0}^{t} \frac{\partial \psi}{\partial x} f(x(\tau), u(\tau)) \, d\tau$$

$$x(t) = x(t_0) + \int_{t_0}^{t} f(x(\tau), u(\tau)) \, d\tau$$

For ease of notation, we create an n+2 dimensional state vector, $$z(t) = + \begin{bmatrix} x_{n+1}(t) \\ x(t) \\ y(t) \end{bmatrix}$$

and denote the dynamics in integral form as $$z(t) = z(t_0) + \int_{t_0}^{t} F(z(\tau), u(\tau)) \, d\tau$$

or, if the dynamics are differentiable, as $$\dot{z}(t) = F(z(t), u(t)) = \begin{bmatrix} \dot{x}_{n+1}(t) \\ \dot{x}(t) \\ \dot{y}(t) \end{bmatrix} = \begin{bmatrix} \mathcal{L}(x(t), u(t)) \\ f(x(t), u(t)) \\ \frac{\partial \psi}{\partial x} f(x(t), u(t)) \end{bmatrix}.$$

Note that the state vector z(t) captures the original dynamics, criterion and terminal cost.

Without loss of generality, we now consider the following optimal control problem $$\min_{u(t) \in U} Qz(t) \tag{4}$$

$$\text{s.t.} \quad z(t) = z(t_0) + \int_{t_0}^{t} F(z(\tau), u(\tau)) \, d\tau$$

where Q is a row vector of dimension n+2 with $Q=[1 \; 0_{1 \times n} \; 1]$, so that $Qz(T)=x_{n+1}(T)+y(T)$. We assume $z(t_0)$ is known (since $x(t_0)$ is assumed known, $x_{n+1}(t_0)=0$, and $y(t_0)=0$).

For the rolling horizon approach, we consider the initial problem on a window $[t_0, \gamma]$, partitioned into N sufficiently small intervals of length $\Delta$. We let $\Delta$ be the same for all intervals for ease of notation. Note that $t_0+N\Delta=\gamma$. We get a sequence of windows as the window moves, and the kth window is $[t_0+k\Delta, \gamma+k\Delta]$. See FIG. 1 for an illustration of the sliding window.

We reformulate the control problem specified in (4) for the kth window, as follows, $$\min_{u(t) \in U} Qz(\gamma + k\Delta) \tag{5}$$

$$\text{s.t.} \quad z(t) = z(t_0 + k\Delta) + \int_{t_0 + k\Delta}^{t} F(z(\tau), u(\tau)) \, d\tau$$

for $t_0 + k\Delta \leq t \leq \gamma + k\Delta$.

We let k=0, 1, . . . , and consider the end of each window as corresponding to real-time.

Our approach is to chatter on the control, in a similar manner as in Kohn et al. (2010). In this paper, we use a probability distribution to derive a chattering control in a probability space, and find an approximation to the relaxed control problem.

The relaxed form of the control problem for the kth window specified in (5) is $$\min_{0 \le \alpha(t) \le 1} Q z(\gamma + k\Delta) \quad (6)$$

$$\text{s.t.} \quad z(t) = z(t_0 + k\Delta) + \int_{t_0+k\Delta}^{t} \int_{\Omega} F(z(\tau), c) d\alpha d\tau$$

$$\int_{\Omega} d\alpha = 1$$

where c is the control distribution defined by constructing the control probability distribution $\alpha$. The resulting $\alpha^*$ provides the optimal distribution that solves the problem in (5).

Problem (6) can be viewed as a relaxed optimal control problem with respect to the Young measure.

Note that $\Delta$ and $\gamma$ must be sufficiently small, so that F remains continuous and differentiable in z, and measurable in the control.

The idea underlying the chattering control is to approximate the control trajectory using Lebesgue integration instead of the more traditional Riemann integration. See FIG. 2.

The chattering approximation to the relaxed problem (6) for the kth window is $$\min_{0 \le \alpha_i(t) \le 1, \forall i \text{ and } t} Q z(\gamma + k\Delta) \quad (7)$$

$$\text{s.t.} \quad z(t+\Delta) = z(t) + \Delta \sum_{i=1}^{I} F(z(t), c_i) \alpha_i(t)$$

$$\sum_{i=1}^{I} \alpha_i(t) = 1 \text{ for } t = t_0 + k\Delta, t_0 + k\Delta + \Delta, \dots,$$

$$\gamma + k\Delta - \Delta$$

where $c_i$ for i=1, . . . , I is the $i^{th}$ quantization level of u(t) at time t, providing specific control levels for the Lebesgue integration, and I is the number of levels in the interval. For ease of notation, we let the number of levels I be the same over the whole time interval. The sum of $\alpha_i$ over i must equal one, for all t, since $\alpha_i$ is representing a probability. Also, upper and lower bounds on $\alpha_i$ must be satisfied, i.e., $0 \le \alpha_i \le 1$ for all i and all t.

Notice that $c_i(t)$ has the same dimension as u(t). And the number of levels I must be large enough to cover the range of u(t). For example, if u(t) is in two dimensions, and the number of levels on dimension 1 is three, and the number of levels on dimension 2 is two, then the number of levels in $c_i(t)$ is six.

If we know $z(t_0+k\Delta)$, we could solve the chattering problem (7) for $\alpha_i$ at discrete times $t_0+k\Delta$, $t_0+k\Delta+\Delta$, . . . , $\gamma+k\Delta-\Delta$ using an optimization engine, such as FMINCON. This involves evaluating F at all discrete times and c, levels, so we only want to solve this chattering problem occasionally. Instead of solving it frequently, we develop continualized incremental dynamics and an incremental optimization that has less computation. Then we only solve (7) when we have a large change in values or the accumulated error grows to be too large.

Also, if we know $z(t_0+k\Delta)$, we can easily solve the one-time period chattering problem for $\alpha_i(t_0+k\Delta)$. For a single time period, the chattering problem (7) reduces to $$\min_{\alpha_i(t_0+k\Delta) \forall i} Q\left(z(t_0 + k\Delta) + \Delta \sum_{i=1}^{I} F(z(t_0 + k\Delta), c_i) \alpha_i(t_0 + k\Delta)\right) \quad (8)$$

$$\sum_{i=1}^{I} \alpha_i(t_0 + k\Delta) = 1$$

$$0 \le \alpha_i(t_0 + k\Delta) \le 1.$$

Notice that one-time period chattering problem (8) is very easy to solve, since it is a type of relaxed knapsack problem, so the optimal a is determined by rank ordering the coefficients in the objective (since the coefficients in the constraint are all equal to one). Also note that Q only has two non-zero values, so only the first and last elements of F need to be evaluated (at $z(t_0+k\Delta)$ and all $c_i$).

Hence we know analytically that the optimal $\alpha_i$ is given by, $$\alpha_i(t_0 + k\Delta)^* = \begin{cases} 1 & \text{if } i \text{ provides the smallest value} \\ & \text{of all } QF(z(t_0 + k\Delta), c_j), j = 1, \dots, I. \\ 0 & \text{otherwise.} \end{cases} \quad (9)$$

2. Incremental Optimization and Continualized Incremental Dynamics

We start by adding an argument to the variables in (7) to indicate they are associated with the kth window problem. For instance, z(t, k) indicates the state at time t in the kth window. We also linearize with respect to F, yielding $$z(t,k) = z(t,k-1) + \delta z(t,k) + O(\Delta^2) \quad (10)$$

for $t_0+k\Delta \le t \le \gamma+(k-1)\Delta$. We use a continualization approach?? to yield $$\delta \dot{z}(t, k) = \sum_{i=1}^{I} \frac{\partial F(z(t_0 + k\Delta, k), c_i)}{\partial z} \alpha_i(t, k) \delta z(t, k)$$

where $\delta z(t, k)$ is the change in z(t, k).

For most of the systems we are considering, the value of the Jacobian matrix, $$\frac{\partial F(z(t_0 + k\Delta, k), c_i)}{\partial z},$$

changes slowly with the state, so we can approximate it by its value at the state at the beginning of the time window $z(t_0+k\Delta, k)$. Thus, the matrix is only computed at the beginning of the time window. It also could be computed using finite differencing.

With this approximation, the incremental optimization problem with continualized incremental dynamics is given by, $$\min_{[\alpha_i(t,k)]} Q \delta z(\gamma + k\Delta, k) \quad (11)$$

-continued $$\text{s.t. } \delta\dot{z}(t,k) = \sum_{i=1}^{l} \frac{\partial F(z(t_0 + k\Delta, k), c_i)}{\partial z} \alpha_i(t,k)\delta z(t,k)$$

$$\sum_{i=1}^{l} \alpha_i(t,k) = 1$$

$$0 \le \alpha_i(t,k) \le 1.$$

From Pontryagin's minimum principle for the incremental problem (11), the three necessary conditions for optimality are,

1.

$$\delta\dot{z}^*(t,k) = \left(\sum_{i=1}^{l} \frac{\partial F(z(t_0 + k\Delta, k), c_i)}{\partial z} \alpha_i(t,k)\right)\delta z^*(t,k) \quad (12)$$

with initial condition $\delta z(t_0+k\Delta)$

2.

$$\dot{p}(t,k) = -\left(\sum_{i=1}^{l} \frac{\partial F(z(t_0 + k\Delta, k), c_i)}{\partial z} \alpha_i(t,k)\right) p(t,k) \quad (13)$$

with terminal condition $p(\gamma+k\Delta)=Q^T$. Notice that the p equation is not incremental (p, not $\delta$p), but it includes an approximation because the Jacobian matrix is evaluated at the beginning of the window.

3.

$$p^T(t,k) \sum_{i=1}^{l} \frac{\partial F(z(t_0 + k\Delta, k), c_i)}{\partial z} \alpha_i^*(t,k)\delta z^*(t,k) \le$$

$$p^T(t,k) \sum_{i=1}^{l} \frac{\partial F(z(t_0 + k\Delta, k), c_i)}{\partial z} \alpha_i(t,k)\delta z(t,k)$$

for $\alpha$ satisfying $$\sum_{i=1}^{l} \alpha_i(t,k) = 1 \text{ and } o \le \alpha_i(t,k) \le 1.$$

Solving (12) and (13) will allow us to propagate $\delta z$ over the length of the window, and then update the Jacobian matrix when the error reaches a threshold value.

The following discusses an example implementation that may be used for such chattering.

Setup

The optimization problem we're solving is the following:

$$\min_u \int_{t_0}^{T} L(x(t), u(t))dt + \psi(x(T))$$

$$\text{s.t. } \dot{x}(t) = f(x(t), u(t))$$

The function L is the objective function; this comes from adding the original objective function specified in the DSL with penalty terms for the rules.
The function $f$ specifies the dynamics of the system; these are specified in the DSL.

The variable x represents the state of the system at time t; the variable u is the control (to be found) at time t.
Finally, $\psi$ represents the cost at being in the terminal state x(T). This term is typically set to 0, but does not have to be
The rules-builder engine creates code that allows us to compute functions used in this system, specifically $L(x(t),u(t))$ $f(x(t),u(t))$ $\psi(x(t))$ For these algorithms, we introduce two new (scalar) variables $$x_n + 1(t) = \int_{t_0}^{t} L(x(\tau), u(\tau))d\tau$$

$$y(t) = \int_{t_0}^{t} \frac{\partial \psi}{\partial x} f(x(\tau), u(\tau))d\tau$$

Let z be the vector $$z(t) = \begin{bmatrix} x_n + 1(t) \\ x(t) \\ y(t) \end{bmatrix}$$

Define the function F(x, u, t) as $$F(z(t), u(t)) = \begin{bmatrix} L(x(t), u(t)) \\ f(x(t), u(t)) \\ \frac{\partial \psi(x(t))}{\partial x(t)} f(x(t), u(t)) \end{bmatrix}$$

Also define the matrix $Q=[10_{1 \times n}1]$.
Observe that all entries of F may be computed at any time based on the functions provided by the rule builder.

$$\left(\text{Use finite differencing to compute } \frac{\partial \psi(x(t))}{\partial x(t)}.\right)$$

Chattering—Offline Training
The notation here is the same as in the paper Parameteric Chattering Control of Dynamic Systems.
Inputs:
  the functions L, $f$, and $\psi$.
  a time horizon T
  the time step $\Delta$
  a time window size $\gamma$
  the initial state x(0)
  a guess $\delta z_0$ for the initial rate of change in the state z
  the terminal costate p(T), typically assumed to be 0.
  $u_{min}$ and $u_{max}$, the min and max possible values for each control u
  c, the number of control levels for each control u
Outputs:
Let $N=T/\Delta$ be the number of intervals.
  the optimal controls u(t) for each t=0, $\Delta$, 2$\Delta$, . . . , N$\Delta$.
  the costate (assuming these controls) p(t) for each t=0, $\Delta$, 2$\Delta$, . . . , N$\Delta$.
  the state (corresponding to picking optimal controls) x(t) for each t=0, $\Delta$, 2$\Delta$, . . . , N$\Delta$.
  status information such as the number of iterations, whether there was a failure, etc.

Steps:

---

Algorithm 1 Finding optimal control within window k
---

1: for each component $j = 1, \ldots, k$, construct $r_j$ control levels by linearly interpolating from $\mu_{min_j}$ to $u_{max_j}$ 2: create a list all possible control combinations of each level for each control $j = 1, \ldots, k$. There are $$I = \prod_{i=1}^{k} r_i$$

total such combinations. Let $c_i$ be the ith such control combination, for $i = 1, \ldots, I$.

3: Solve the following problem $$\min_{a} \ Q_z(y + k\Delta)$$

$$\text{s.t.} \ z(t + \Delta) = z(t) + \Delta \sum_{i=1}^{I} F(z(t), c_i) a_i(t)$$

$$\sum_{i=1}^{I} a_i(t) = 1 \ \text{for} \ t = t_0 + k\Delta, \ldots, y + k\Delta - \Delta$$

$$0 \leq a_i(t) \leq 1 \ \text{for all} \ i, t$$

Note this is a nonlinear optimization problem and is solved using a nonlinear solver such as FMINCON.

4: the optimal control at each time is given by
$$\sum_{i=1}^{I} a_i c_i$$

5: ind $p(t)$ at every time from $t = t_0$ to $\gamma$ via numerically integrating the following ordinary differential equation backwards in time (using any standard solver):

$$p(\gamma, 0) = Q$$

$$p\dot{}(t, k) = -\left( \sum_{i=1}^{I} \frac{\partial F(z(t_0 + k\Delta, k), c_i)}{\partial z} a_i(t, k) p(t, k) \right)$$

6: find $\delta z(t)$ at every time from $t = t_0$ to $\gamma$ by numerically integrating the following ordinary differential equation forwards in time:

$$\delta z(0, 0) = \delta z_0$$

$$\delta \dot{z}(t, k) = \sum_{i=1}^{I} \frac{\partial F(z(t_0 + k\Delta, k), c_i)}{\partial z} a_i(t, k) \delta z(t, k)$$

Note that the matrix $\dfrac{\partial F(z(t_0 + k\Delta, k), c_i)}{\partial z}$ is the same between this step and the previous, so it doesn't have to be recomputed.

7: update the state $z$ at every time using
$z(t, k) = z(t, k - 1) + \delta z(t, k)$ 8: return the state $z$, the change in state $\delta z$, the chattering levels $a$, the controls $u$ and the costate $p$ at every time in the window

---

Algorithm 2 Chattering offline training
---

1: Solve the chattering problem on the first window with $k = 0$ using Algorithm 1.

2: for $k = 2, 3, \ldots$ (where k is the window number) do

3: Solve the incremental optimization problem to get the optimal controls at the end of the window $$\min_{a} Q \delta z(\gamma + k\Delta, k)$$

$$\text{s.t.} \ \delta \dot{z} \sum_{i=1}^{I} \frac{\partial F(z(t_0 + k\Delta, k), c_i)}{\partial z} \alpha_i(t, k) \delta z(t, k)$$

$$\sum_{i=1}^{I} a_i(t) = 1$$

$$0 \leq a_i(t) \leq 1 \ \text{for all} \ i$$

(This is a much easier optimization problem than finding the controls in Algorithm 1 as it is only for a single time step.)
4:    update our estimates of p(t) at every time in the window by numerically integrating the following ODE backwards:

$$p(\gamma, 0) = Q$$

$$\dot{p}(t, k) = \left( \sum_{i=1}^{I} \frac{\partial F(z(t_0 + k\Delta, k), c_i)}{\partial z} \alpha_i(t, k) p(t, k) \right)$$

5:    update δz(t) at every time in the window by numerically integrating the following ODE forwards:

$$\delta z(0, 0) = \delta z_0$$

$$\delta \dot{z}(t, k) = \sum_{i=1}^{I} \frac{\partial F(z(t_0 + k\Delta, k), c_i)}{\partial z} \alpha_i(t, k) \delta z(t, k)$$

6:    update the state z at every time using
      z(t, k) = z(t, k − 1) + δz(t, k)
7:    end for
8:    return the state z, the change in state δz, the chattering levels a, the controls u and the costate p at every time from 0 to T.

Chattering-Online Prediction

Inputs:
    the hamiltonian function H
    the time step Δ
    the current state x(t)
    the current costate p(t)
    $u_{min}$, and $u_{max}$, the min and max possible values for each control u
    c, the number of control levels for each control u
Outputs:
the optimal control u(t)
the new state x(t + Δ)
the new costate p(t + Δ)
Steps:
Algorithm 3 Chattering online updating 1:    given x(t) and p(t) at the current time t.
2:    compute optimal control u(t) by solving:

$$\min_{alpha} Q(z(t_0 + k\Delta)) + \Delta \sum_{i=1}^{I} F(z(t_0 + k\Delta) \alpha_i(t_0 + k\Delta))$$

$$\text{s.t.} \sum_{i=1}^{I} \alpha_i(t_0 + k\Delta) = 1$$

$$0 \leq \alpha_i(t_0 + k\Delta) \leq 1$$

This problem has a closed-form solution, as mentioned in the paper.

3:
$$u(t) = \sum_{i=1}^{I} a_i c_i$$

4:    update δz(t) over the last Δ using $$\delta z(0, 0) = \delta z_0$$

$$\delta \dot{z}(t, k) = \sum_{i=1}^{I} \frac{\partial F(z(t_0 + k\Delta, k), c_i)}{\partial z} \alpha_i(t, k) \delta z(t, k)$$

5:    update the state z at every time using    z(t, k) = z(t, k − 1) + δz(t, k)
6:    return $z(t_{i+i})$, u(t)

Chattering-Computing optimal values for T and Δ

Inputs
    The function F(x, u, t) (from the rule builder).
    A required error tolerance (provided in the DSL by the customer).
    an initial guess for T and Δ

Outputs
  Δ, the time step to use
  T, the time horizon
Steps
Algorithm 4 Finding Δ and T 1: Solve the offline chattering problem from t = 0 to t = T to get controls and state for every time from t = 0 to T.

2: Compute the Jacobian matrices
$$A(t) = \frac{\partial F(z(t))}{\partial z(t)}$$
at each time t = 0 to t = T using finite differencing.
3: for i = 1, 2, . . . , N do
4:    let t = iΔ
5:    Compute the error matrix
$$E(t) = \int_0^t (A(t) - A(0))e^{A(0)(t-t_0)}$$
via numerical integration.
6:    Compute the total error as the sum of the absolute values of the entries of E(t)
7:    if E > error tolerance then
8:      let T = (i − 1)Δ
9:      break
10:   end if
11: end for
12: Compute the Jacobian matrix
$$J = \frac{\partial F(z)}{\partial z}$$
at the current time using finite differencing.
13: Find the eigenvalues $\lambda_1, \ldots, \lambda_n$ of J
14: Take the eigenvalue $\lambda_i$, with largest magnitude $|\lambda_i|$.
15: Let Δ = $1/|\lambda_i|$

---

The following discusses further details regarding possible use with such chattering.

In the chattering algorithm, there are two timing parameters, the length of the window T, and the time slice Δ (where NΔ=T). For accuracy purposes, these two parameters should be sufficiently small, but for computational efficiency, these two parameters should be large. Therefore, we want to keep the parameters as large as possible, as long as the error is tolerable.

The incremental state equation (for δz) relies on the Jacobian matrix evaluated at the beginning of the time window. To characterize the error, we compare two linear systems, one that has a constant matrix, denoted $A(t_0)$, and the other has a time varying matrix, denoted $A(t)$.

Consider both linear systems:

$$\dot{x} = A(t)x(t) \quad (1)$$

$$\dot{y} = A(t_0)y(t) \quad (2)$$

with the same initial conditions, $x(t_0) = y(t_0)$.
The solution to (1) is of the form $$x(t) = \phi(t, t_0)x(t_0)$$

where $\phi(t, t_0)$ satisfies several properties, $$\dot{\phi}(t, t_0) = A(t)\phi(t, t_0)$$

$$\phi(t_0, t_0) = I$$

$$\phi^{-1}(t, t_0) = \phi(t_0, t).$$

The solution to (2) is of the form $$y(t) = e^{A(t-t_0)}x(t_0).$$

The error due to approximating A(t) with $A(t_0)$ is:

$$E(t) = \phi(t, t_0) - e^{A(t-t_0)}.$$

Taking the derivative yields $$\dot{E}(t) = \dot{\phi}(t, t_0) - A(t_0)e^{A(t-t_0)}$$

and replacing $\dot{\phi}(t, t_0)$ with $A(t)\phi(t, t_0)$ yields $$\dot{E}(t) = A(t)\phi(t, t_0) - A(t_0)e^{A(t-t_0)}$$

and substituting for $\phi(t, t_0)$ yields $$\dot{E}(t) = A(t)(E(t) + e^{A(t-t_0)}) - A(t_0)e^{A(t-t_0)}$$
$$= A(t)E(t) + (A(t) - A(t_0))e^{A(t-t_0)}.$$

This provides the error as a function of $(A(t) - A(t_0))$, and if the eigenvalues of A(t) for all t have real values less than zero, the error is linearly proportional to $(A(t) - A(t_0))$.

The procedure to choose T is to ask the customer what size of error is tolerable. The customer may say an error of 20% is tolerable, in which case the window length T can increase until reaching the associated threshold. The measure of the error is related to the difference, $$\sum_{i=1}^{I} \left.\frac{\partial F}{\partial z}\alpha_i\right|_t - \sum_{i=1}^{I} \left.\frac{\partial F}{\partial z}\alpha_i\right|_{t_0}$$

The size of the time slice Δ is related to the magnitude of the largest eigenvalue of $$\frac{\partial F}{\partial z}.$$

Let $|\lambda|=\sqrt{\lambda_{real}^2+\lambda_{imag}^2}$ and suppose $|\lambda|_i$ has the largest value. Then $$\Delta = \frac{1}{|\lambda|_i}.$$

The following discusses further details regarding an example of synchronizing a decision module's model and current information with that of information from one or more other decision modules.

In the multi-agent self-organizing architecture of CDI, all agents synchronize in some way. This is analogous in the worst case to the many-body problem, which Isaac Newton first formulated, and is unsolvable for three or more bodies. However, good approximations for systems of more than two bodies are computationally tractable. The approach in CDI is to solve a series of two-body problems that emulate a mean field aggregation, and update sequentially through a Pareto game.

Consider N agents, and each agent i, i=1, . . . , N, has its own optimization problem with criterion, state and control:

$$\text{Min}_{u_i} J_i(x_i, u_i)$$

$$\text{s.t. } \dot{x}_i = f(x_i, u_i)$$

The N problem in a single optimization problem is not algorithmically solvable, but it is possible to solve algorithmically a Pareto-optimization problem with two players (the Pareto game), and approximate the solution to the N player problem. The two-agent (agent 1 and agent 2) Pareto-optimization problem is $$\text{Min}_{u_1, u_2, \alpha_1, \alpha_2} \alpha_1 J_1(x_1, u_1) + \alpha_2 J_2(x_2, u_2)$$

subject to $$\dot{x}_1 = f(x_1, u_1)$$

$$\dot{x}_2 = f(x_2, u_2)$$

$$\alpha_1(t) + \alpha_2(t) = 1$$

The CDI approach is that each agent i plays a two-agent game with the CDI Mean Field agent composed of the criteria from all other agents except agent i. Instead of solving the two-agent optimization problem directly, we convert the formulation to a Hamiltonian problem (using Pontryagin's minimum principle).

The Hamiltonians are additive for Pareto optimization. Therefore, we can add local Hamiltonians for individual agents to create an aggregate mean field Hamiltonian.

Let $H_i$ be the local Hamiltonian for agent i and let $H_i^{MF}$ be the mean field Hamiltonian composed of the Hamiltonians for all other agents, excluding i. That is, the mean field Hamiltonian for agent i is a functional form of the Hamiltonians of the other agents.

Then the two-agent optimization problem is $$\text{Min}_{u_i, u_i^{MF}, \alpha_1, \alpha_2} \alpha_1 H_i(x_i, u_i) + \alpha_2 H_i^{MF}(x_i^{MF}, u_i^{MF})$$

subject to the state and costate equations of the combined Hamiltonian, and $$\alpha_1(t) + \alpha_2(t) = 1.$$

The state consists of $[x_i, x_i^{MF}]^T$, the costate is $[p_i, p_i^{MF}]^T$, and the control is $[u_i, u_i^{MF}]^T$. The initial conditions for $x_i^{MF}$ and $p_i^{MF}$ come from the previous solution, and $u_i$ is the local solution from the previous pass.

The solution to the two-agent Pareto game provides $\alpha_1(t)$ and $\alpha_2(t)$, and the total Hamiltonian for agent i is updated:

$$H_i^T = \alpha_1 H_i + \alpha_2 H_i^{MF}$$

The modified Hamiltonian for agent i is constructed by projecting the total Hamiltonian into the local state space. The modified mean field Hamiltonian is constructed by projecting the total Hamiltonian into the mean field state space.

Now, the another agent plays the game, solving the two-agent Pareto game, and updating locally, and each agent updates its mean field agent when it is ready to play its game.

The following discusses further details regarding example embodiments.

Overview

The Cooperative Distributed Inference (CDI) platform is a unique advanced technology offering to enable near-optimal and near-real-time decision making on vast amount of heterogeneous and distributed information, in complex knowledge-based decision support systems, combining absolute, hard and soft rules to handle various requirements from natural or governing laws, policies, and best practices. FIG. 17 illustrates a diagram 1700 of various interactions of different portions of a CDI system.

The CDI platform features a Distributed Architecture (DA) for resolving queries by accessing information from both an Internal Heterogeneous Database (IHDB) and external data sources referred to as Sensors. CDI utilizes a network of computing devices as its nodes—called Decision Elements (DE)—that cooperate to resolve queries given to them.

The Decision Elements (DE) in a given DA can work together to reach best outcome for the whole group, i.e., reaching Pareto Efficiency (also referred to as Pareto equilibrium)—a stable state where no change by any individual can be made to make the sum of whole group better.

Each DE can solve the problem independently if provided with complete knowledge and data. DE solves the query with a very unique approach, using Optimal Control Theory, starting with a technique called analytic continuation (transforming query and rules into differential equations whose dependent variables represent internal variables and parameters of the rules), then using its own internal knowledge to solve the query, providing an outcome.

In distributed environments, group of Decision Elements synchronize in an iterative process utilizing updates from other DEs and provide a final result, via a Pareto multi criteria optimization strategy.

The CDI platform needs rules, not necessarily exact criteria, to reach the objective state, producing the near-optimal solution. This is a very attractive feature when exact quantitative criteria cannot be provided in advance due to uncertainty or other reasons.

Platform Features

CDI is perfect for big data analytics, supporting many data types:
  Structured: databases, ontologies
  Semi-structured: spreadsheets, CSV/TSV, forms, emails
  Unstructured: web pages, blogs, text documents
  Symbolic: business rules, math formulas CDI's distributed computing architecture also make it very scalable to handle large amount (peta-size) of heterogeneous data ingestion while performing real-time analytic results even in microseconds (depending in part on resources available and the complexity of queries).

Rules Support

CDI can integrate different types of business rules: absolute, hard and soft rules, from natural or government laws, operational or policy requirements, and practice guidelines. Absolute rules and hard rules always take logic value 0 (false) or 1 (true) when instantiated. Soft rules, however, may take any value in the interval [0,1], or more generally more than two values. Absolute rules reflects a must-satisfy situation, such as FDA/USDA requirements; hard rules are operational requirements such as "no serious persistent side effects", but which may be temporarily relaxed in specific situations; and soft rules can come from guidelines or experiences, such as "better not give drug XYZ to diabetes patients with heart problems". FIG. 18 illustrates a diagram 1800 of examples of different types of rules. Please note that all chaining of the rules may happen automatically in a dynamic manner during the optimization process. CDI handles this complexity with said techniques above by solving a distributed continuous-space optimization problem.

Self-Adapting and Learning

CDI platform features a self-learning design. As CDI converts the original query solving into an optimal control problem, it can use feedbacks from the environment (external sensor or internal updates from peer decision elements) to refine its internal model: a Hamilton-Jacobi-Bellman equation will be updated to reflect new information and automatically form soft-rule like constraints internally. The process to update internal mathematical model is similar to reconstructing 3D images from CT or MRI imaging by tomographic reconstruction, but used for dynamic systems.

Scalability and Performance

CDI platform enables functionality to:
Integrate data that may include 1,000,000+ variables and 100,000+ of constraints
Provide data integration over evolving distributed network
Specify queries over a broad range of languages
Specify queries of a broad range of complexity
Provide best known response to queries at the local level
Operate in a variety of environments including cloud-based or local deployments
Real-time processing of queries Comparisons CDI stands out in being able to do the following things:
Approximate the optimal solution of NP-hard problems (such as planning and scheduling) by mapping criteria and constraints onto a continuous space and solve it as an Optimal Control problem with polynomial-time algorithms. The solutions offered by CDI may be near optimal rather than exactly optimal but the running time will be greatly shortened and some large-scale intractable problems can become solvable by CDI.
Blend adaptive learning together with rules composition. Traditional rule engines might support hard and soft rules (constraints), but the scoring mechanism and weights need be manually adjusted to meet the goals, while in CDI, via feedback mechanism, these weights can be optimized as internal configurations. The unique abilities make CDI an ideal choice for intelligent decision support systems.

Sample Applications

CDI platform works great in areas where there are a lot of heterogeneous data, government compliances and business requirements, such as healthcare and energy.

Clinical Auto-Coding Application

Figure 19:
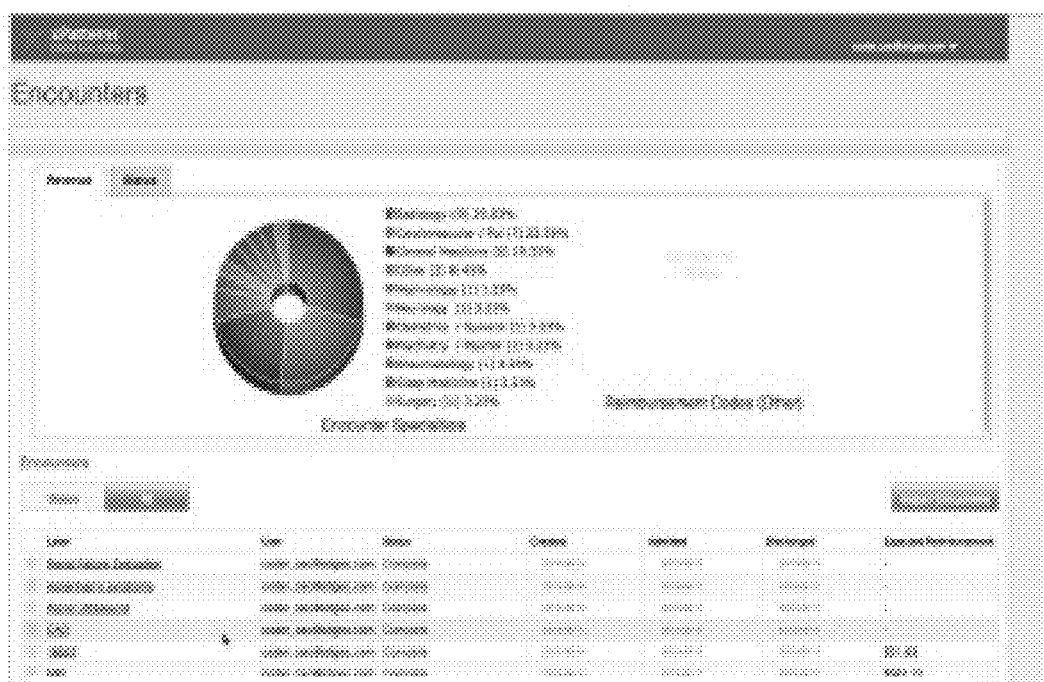
FIG. 19 illustrates an example user interface related to medical/clinical auto-coding.

A Clinical Auto-Coding (C.A.C.) application can be used to detect medical under-coding, over-coding, and miscoding, highlighting potential opportunities where higher billing is justified. It automatically generates clinical codes, including ICD-10 directly from clinical encounter notes such as physician notes, lab results, and discharge records, while supporting workflows accommodating the roles played by administrators, coders and doctors in coding. FIG. 19 illustrates an example user interface 1900 related to medical/clinical auto-coding. C.A.C. incorporates user feedback to learn coding best practices as it processes records. With its sophisticated adaptive technology, C.A.C. improves over time, optimizing coding for each organization to improve the efficiency, accuracy and revenue capture of the medical coding activity Clinical Intelligence Web Services CDI powers the following intelligent healthcare services that can be easily integrated:
Clinical Record Intelligence—For analysis of EMRs (electronic medical records) and encounter notes, identification of actionable clinical terms and concepts in those documents. The services can extract concepts, understand issues, and analyze documents.
Clinical Coding Intelligence—For inferring clinical codes from a set of clinical concepts, grouping codes, correlating codes, analyze documents, audit and justification, and compliance.
Patient-Centric Intelligence—Secure delivery of end-user applications to predict, recommend, and explain personalized actions to improve patient outcomes. It provides a patient centric view, can provide medical risk prediction and proactive monitoring for patients, automated data abstraction, actionable recommendations, and more.

All these web services run in secure cloud with full compliance measurement in place.

Fraud, Waste and Abuse Detection

In healthcare, CDI helps assess and monitor risk of medical fraud, waste and abuse (FWA) by uncovering providers, and to a lesser extent pharmacies, who are suspected of having committed fraud via a variety of schemes. Similar application domains include financial frauds.

By ingesting a wide variety of data that is difficult to link (including live public data), a FWA service analyzes data to find evidence and patterns of fraud, and provides a dashboard application for agents/detectives to prioritize and act on the discovered suspected cases of medical fraud. The service features strict and fuzzy rules-based detection as well as automatic pattern discovery, and runs in real-time and continuous mode to support proactive monitoring and action.

Energy Intelligence

Smart Grid can involve uncertain bi-directional exchange in distributed grids, so intelligent control can be used to provide active synchronization between the network of element controllers and the outside grid management system allows high quality of service to be maintained in a cost-effective manner, hence the dynamics can be learned from sensory observations. CDI enables distributed micro-grid control, supports inductive modeling with "soft" rules that are learned and continuously updated, to optimize the grid.

Distributed Architecture (DA)

The DA is a network of interacting components called decision elements (DEs). The DEs collaborate in the resolution of a query posed by one of them. The DA's block diagram is shown in FIG. 18, where Sensors refer to external input data in general. There is an additional translation layer to process external data to be consumed by DEs.

Decision Element (DE)

A decision element is a higher-level functional component solving queries locally.

It can have subcomponents such as a programmable search engine, internal heterogeneous database, Inference engine, Inference rule base, API/user interface, and network interface. A decision element is capable of providing a quick and near-optimal solution to a complex query with complete input of data.

Internal Heterogeneous Database (IHDB) and External Knowledge Base (EKB)

IHDB is data preprocessed and stored by a specific decision element (DE). FIG. 20 illustrates a diagram 2000 of some components of a CDI system, including Knowledge Bases containing data sources ranging from domain knowledge to general facts. IHDB encodes knowledge into knowledge components (KC's). Each KC is used and updated by a DE in the DA, and multiple KCs may share rules.

External Knowledge Base (EKB) refers to data, including rules, as input into specific decision elements, such as patient's body temperature, blood pressure, or instantiated rule to determine if patient's cholesterol level is high. EKB can also contain communicated information from other DEs. Domains for variables include: real, complex, integer, binary numbers and symbolic token on finite domains.

Interfacing Components

The following components act between users and the data via API and/or GUI.
  Rule Entry Interface—It provides the entry of rules into the IHDB, validates the specification of rules before insertion, and route the rules to the appropriate DE for insertion to their respective knowledge components.
  Sensor Ingestion Interface—A sensor is a machine or service where external data exist. Sensor Ingestion Interface (SII) enables the system to add or remove a sensor, poll a sensor and submit data to the network.
  Query Language Interface—Query Language Interface accepts the query, submits it to the system (Distributed Architecture) and provides response. It is an API and flexible UI can be built on top of it.

Minimization Function Generator (MFG)

The minimization function generator converts a query to a minimization function (i.e. analytic continuation). This is useful because the problem is converted from search problem in a large discrete space (like graph search problems, which are usually NP-complete) into an optimization problem in continuous space (polynomial algorithms exist). An analogy is NP-hard integer programming, while continuous linear programming has a very efficient solution.

Query Response Engine (QRE)

The Query Response Engine is the core of the whole system responsible solving the query (locally). A mathematical model is constructed based on these equations obtained from previous steps, containing the current state and object state (goal state). The continuous-space optimization automatically handles forward and backward rule chaining by moving along the trajectory toward target state. It also manages uncertainty by keeping a large set of possible states and reducing the solution space only when more information becomes available. Standard optimization techniques (e.g. Newton-Raphson Method) can be employed to solve the problem.

Feedbacks and updates (data from EKB or other DE in the architecture) will be used to refine the mathematical model over time; therefore, the core engine is self-adapting.

Pareto Multi-Criteria Optimization Engine

Figure 21:
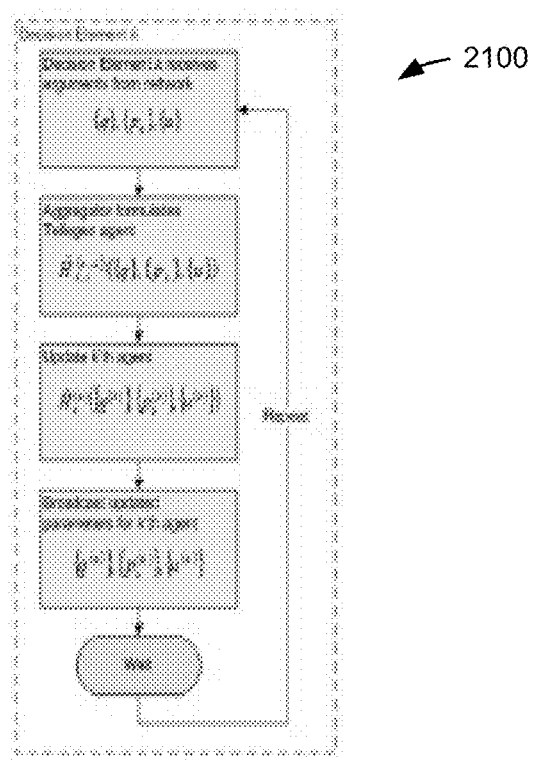
FIG. 21 illustrates a diagram of performing Pareto processing for use with mean field techniques.

The Pareto Multi-Criteria Optimization Engine (PMOE) is the aggregation step where all DE in the network settle to obtain a good stable solution—a state where no improvements can be made to any individual DE without reducing the whole team's performance—a state belongs Pareto Optimal Set in Game Theory. It is like each DE is playing a game and they communicate and interact and work together to make the best outcome for the criteria (query). To efficiently synchronize all decision elements, Mean Field Theory is applied for dimension reduction using knowledge obtained. FIG. 21 illustrates a diagram 2100 of performing Pareto processing for use with mean field techniques, including to reach Pareto efficiency.

Data Exchange Specifications

The system can take many different data types via ingestion API and has adapters from different public data sources. The supported data types include common ones from XML, CSV, TSV, SQL, Spreadsheet, JSON, and more. OData support is also available. Output types can be API (XML or JSON), as well as exporting to CSV, SQL or directly to services such as SOLR and Cassandra.

Running Environment

CDI can run in the cloud as Software as a Service platform. We can provide whole end-to-end support by setting up the infrastructure in a Virtual Private Cloud or deploy and configure it with the cluster clients provide. The system features SaaS architecture and provides APIs to be used by third parties. For advanced integration requests, Java/Scala and Python libraries are available.

To sum up, CDI platform utilizes many advanced techniques from Mean Field Theory, Lagrangian and Hamiltonian functions, Pareto Optimal Set, Gauge Theory, and so on derived from modern mathematics, quantum physics, optimal control and game theory to achieve high performance. In the detailed computation process, lots of transformation, approximation, optimization, caching and other advanced computing techniques are used to improve accuracy, speed and scalability. Due to this unique approach, CDI is able to solve complex decision making problem in a smoothly, efficient manner and achieve near optimal results.

The Cooperative Distributed Inference (CDI) platform is a unique advanced technology offering to enable near-optimal and near real-time decision making on vast amount of heterogeneous and distributed information, in complex knowledge-based decision support systems, combining absolute, hard and soft rules to handle various requirements from natural or governing laws, policies, and best practices.

Each agent in the Distributed Architecture is a Decision Element that can solve the problem independently, provided with knowledge base and data. In a very unique manner, the agent uses Optimal Control Theory to obtain a near optimal solution, starting with a technique called analytic continuation (transforming query and rules into differential equations whose dependent variables represent internal variables and parameters of the rules), then using its own internal knowledge to solve the problem as an optimization problem in continuous space, to allow for efficient solving.

The outcome will be fed back to the Rules Editor and optimization process (the Chattering algorithm) to enable automatic adjustment of weights of soft rules (constraints) and achieve optimal score of the objective function.

Figure 22:
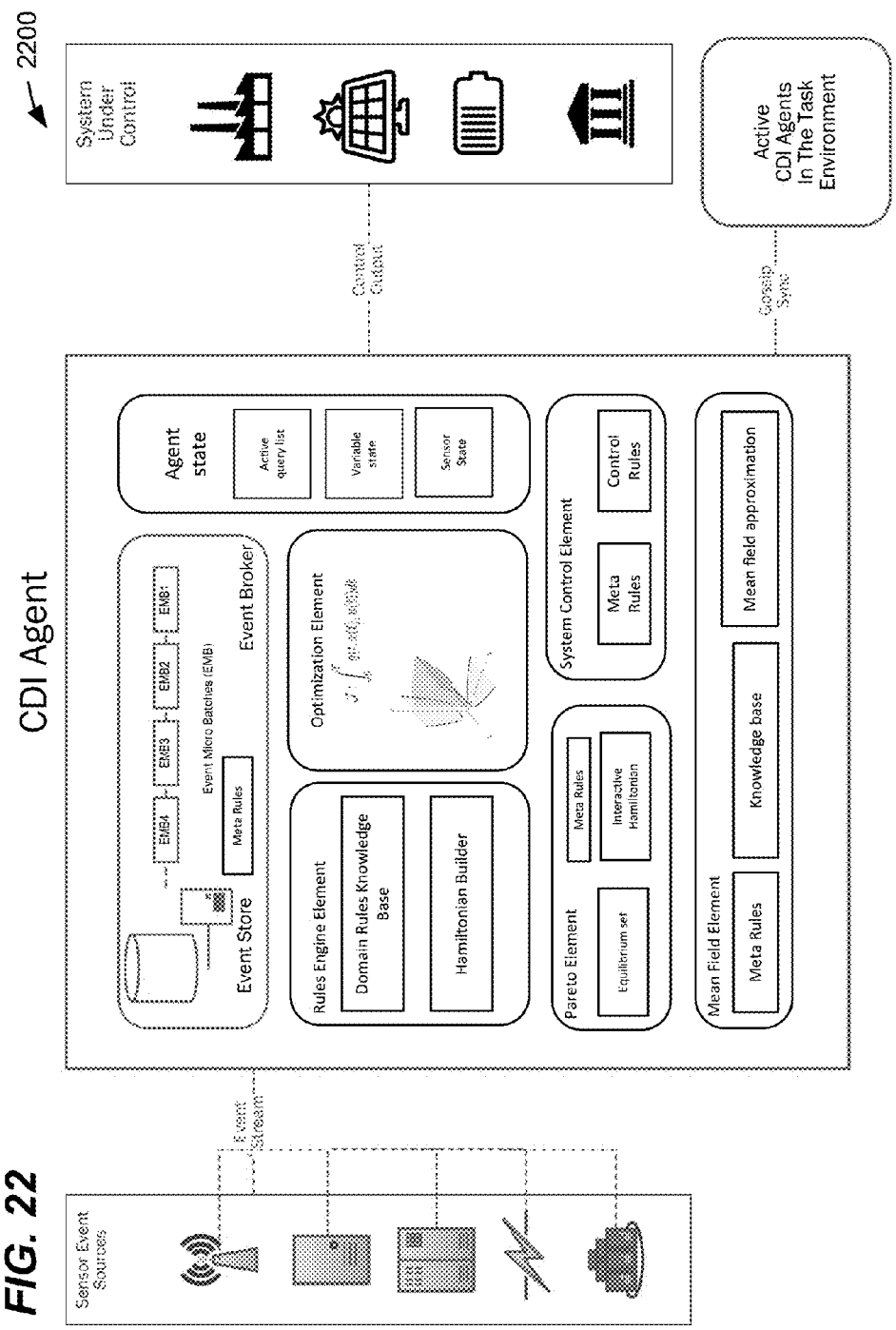
FIG. 22 illustrates a network diagram of an example decision module agent.

A CDI agent is an independent decision element that can take in sensor data (input from the environment, streaming or in batches), as well as the knowledge-bases (rules composed by domain experts, including absolute, hard and soft rules) to generate a set of partial differential functions (Lagrangian constraints), through continualization. Similarly, the objective is also converted into a minimization function, as part of the Lagrangians which will be solved via the Hamilton-Jacobi-Bellman equation. Each agent will talk to other agents via a "mean field" abstraction layer to greatly reduce the communication and computation overhead, and incorporate additional information to reach the global optimal state (a stable, near optimal set of states across all agents). Finally, the agent exercises control over the system. FIG. 22 illustrates a network diagram 2200 of an example decision module agent.

Various domain knowledge is captured from experts in the form of Domain Specific Language. Some are constraints; logic forms need be converted to Boolean equations; and variables in soft rules take values [0 . . . 1]. This creates a set of equations to be solved by the optimization algorithm. The optimization process takes data from a time range and finds the best state configuration to reach optimality. It starts with a "learning" process to find a good initial configuration by taking in a short history of data, before processing real-time streams. FIG. 23 illustrates a network diagram 2300 of an example of offline workflows for knowledge capture.

Each CDI agent computes a "mean field" view of the system via its neighbors, and responds to queries with the latest updates. The approximate mean field view of a group greatly reduces computational dimensions. The agents synchronize with others and understand the global state via the mean-field approximation. They engage in games to reach Pareto Optimal (also referred to as Pareto equilibrium)—the best output. FIG. 24 illustrates a network diagram 2400 of an example of workflows for mean field computation and Pareto Optimal.

Figure 25:
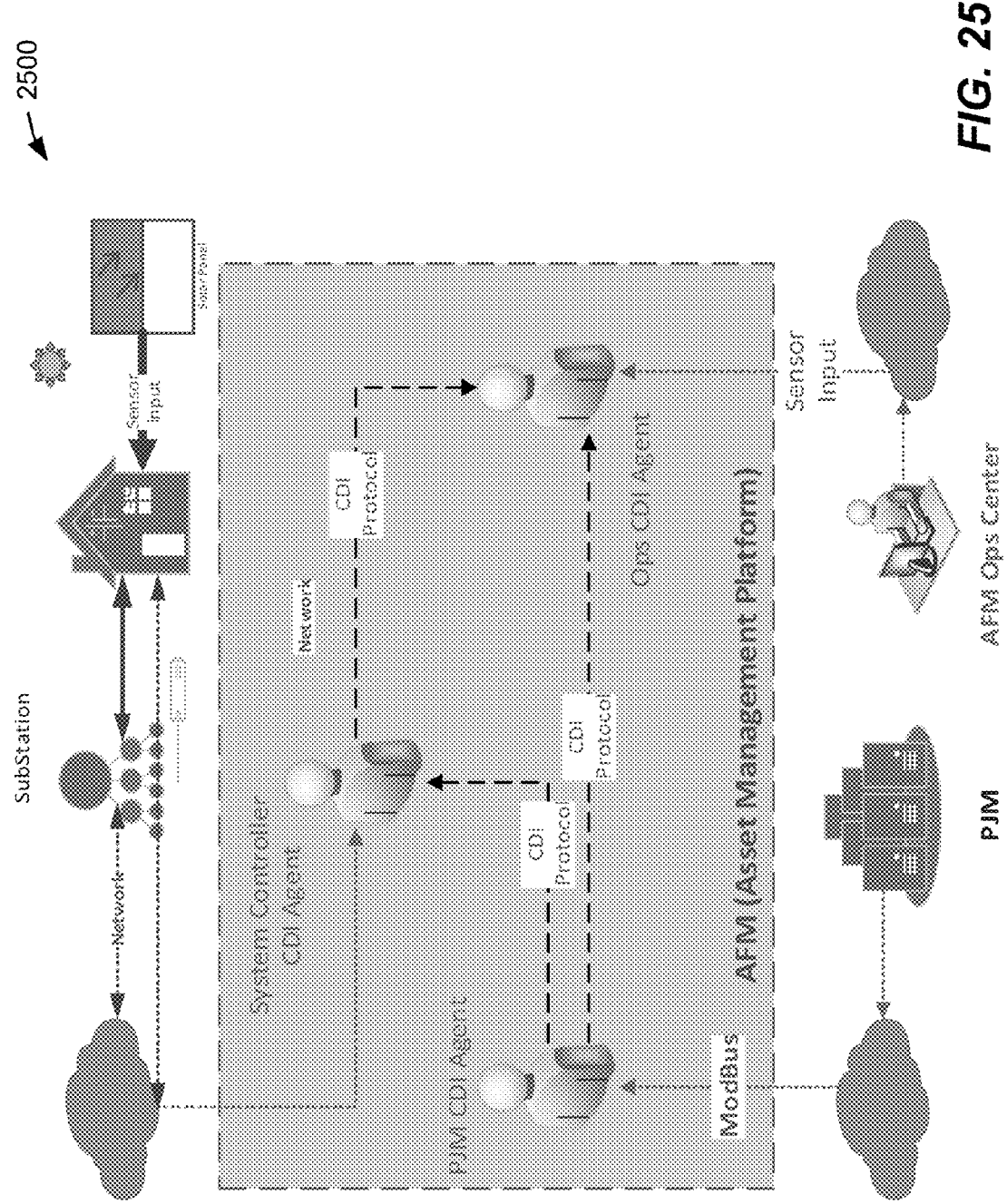
FIG. 25 illustrates a network diagram of an example of an automated control system for a home solar micro-grid electrical generating system.

An example home solar micro-grid system illustrates one example embodiment of a CDI application or automated control system, which takes the sensor data from the solar panel (in the house), substation, and power network, and decides whether or not to fulfill the utility requests in real time using a set of complex rules. FIG. 25 illustrates a network diagram 2500 of an example of an automated control system for a home solar micro-grid electrical generating system.

Figure 26:
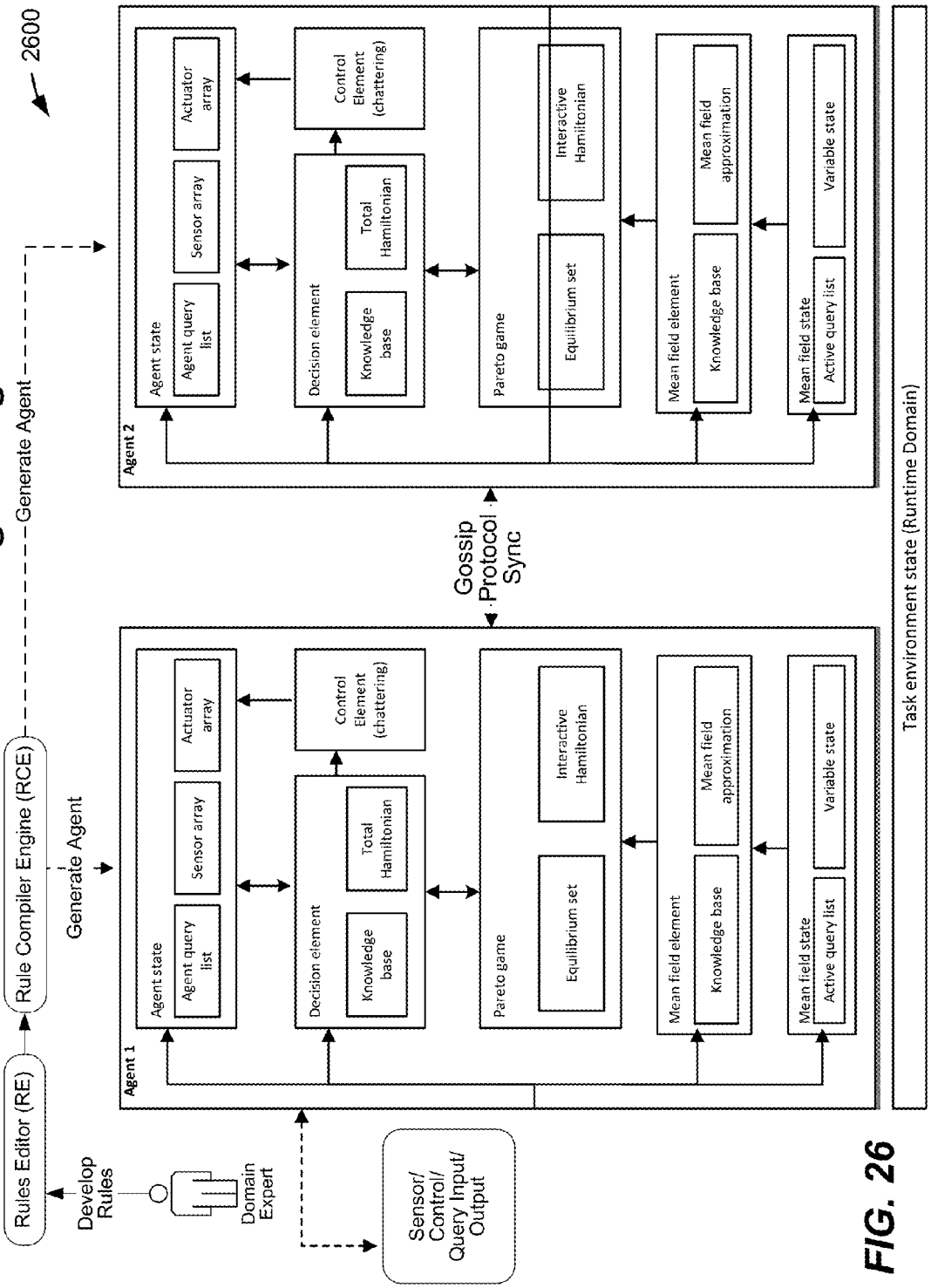
FIG. 26 illustrates a diagram of workflow and components of a portion of a CDI system.
Figure 27:
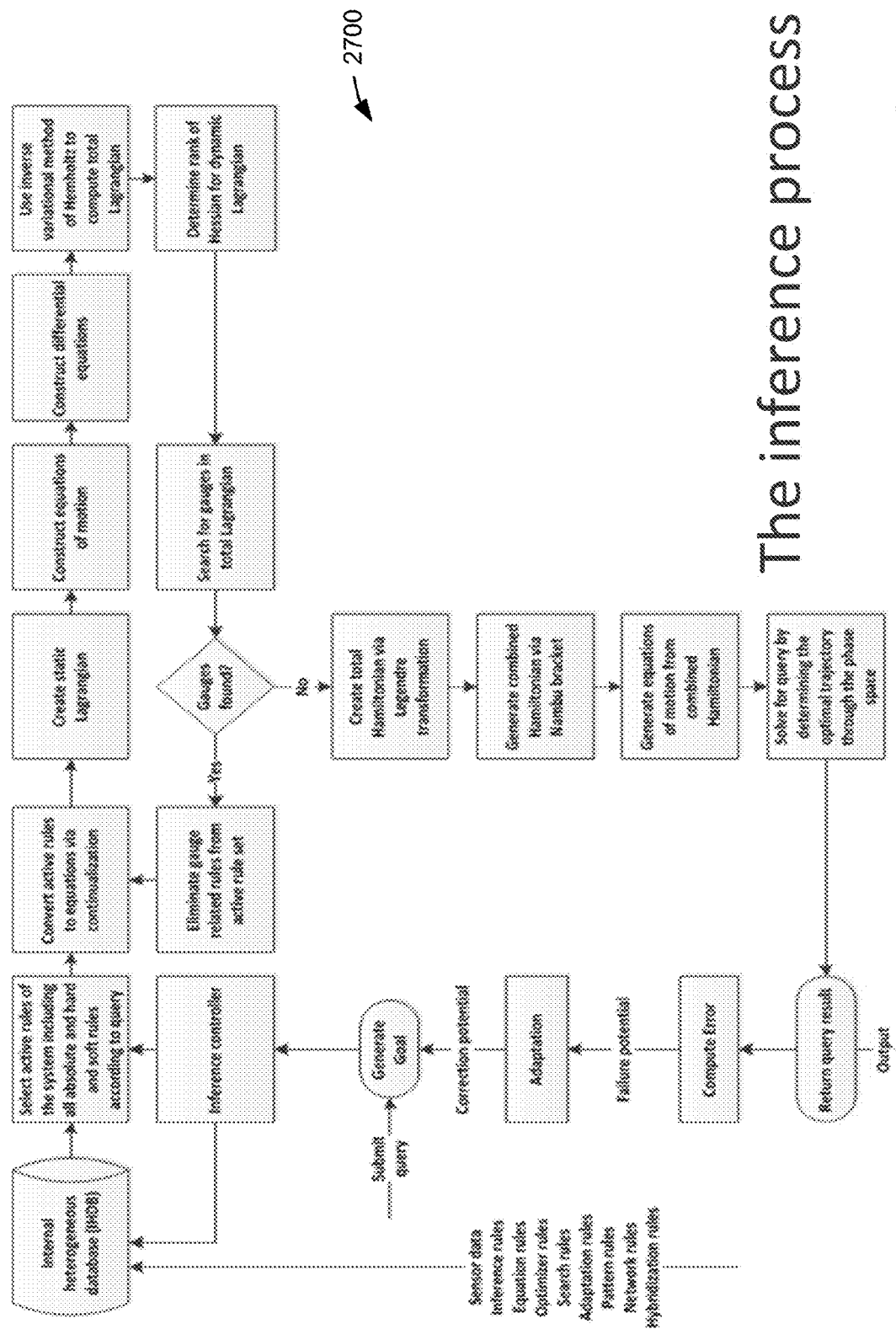
FIG. 27 illustrates a diagram of a workflow for an inference process portion of a CDI system.
Figure 28:
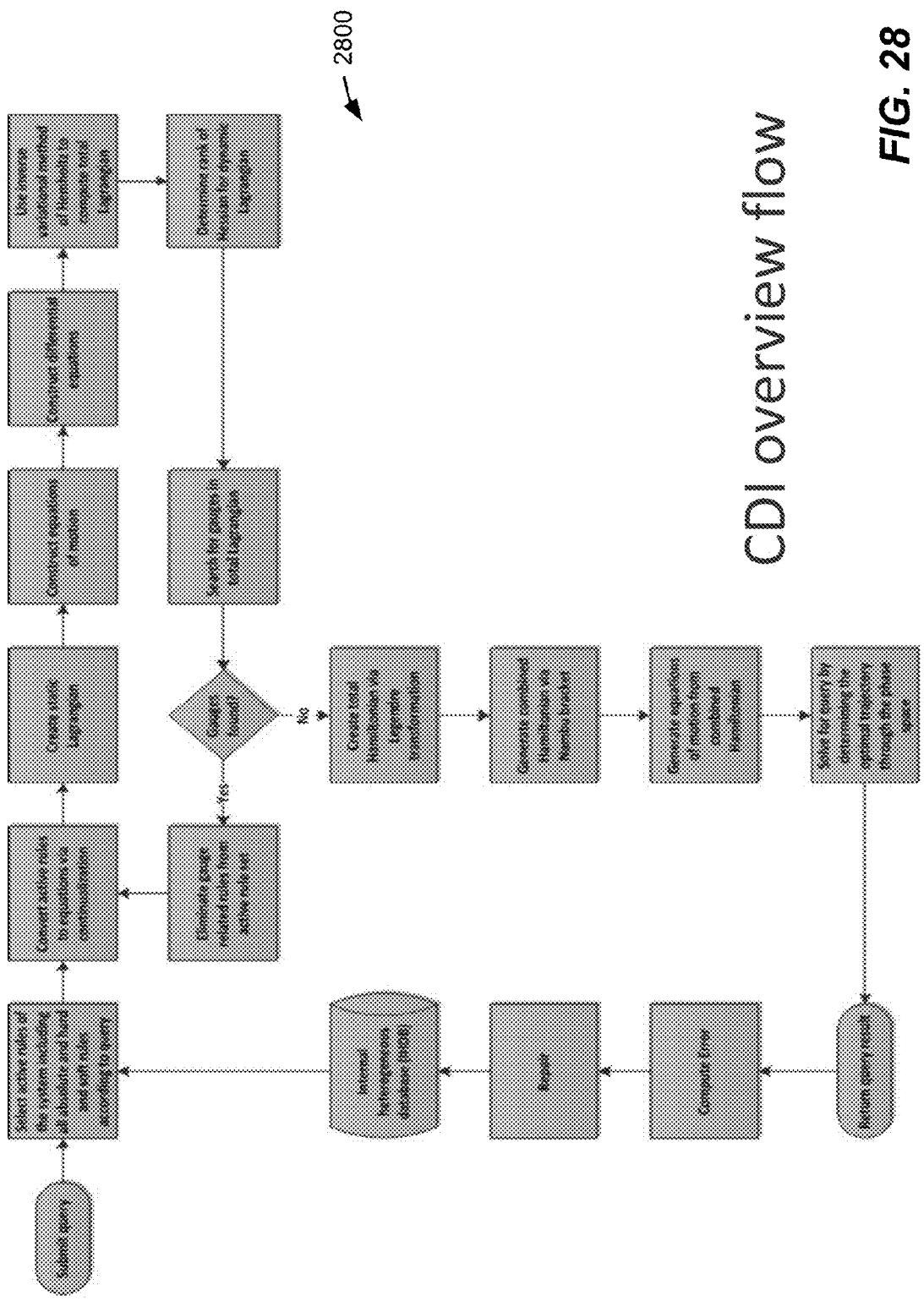
FIG. 28 illustrates a diagram of an overview workflow for a portion of a CDI system.
Figure 29A:
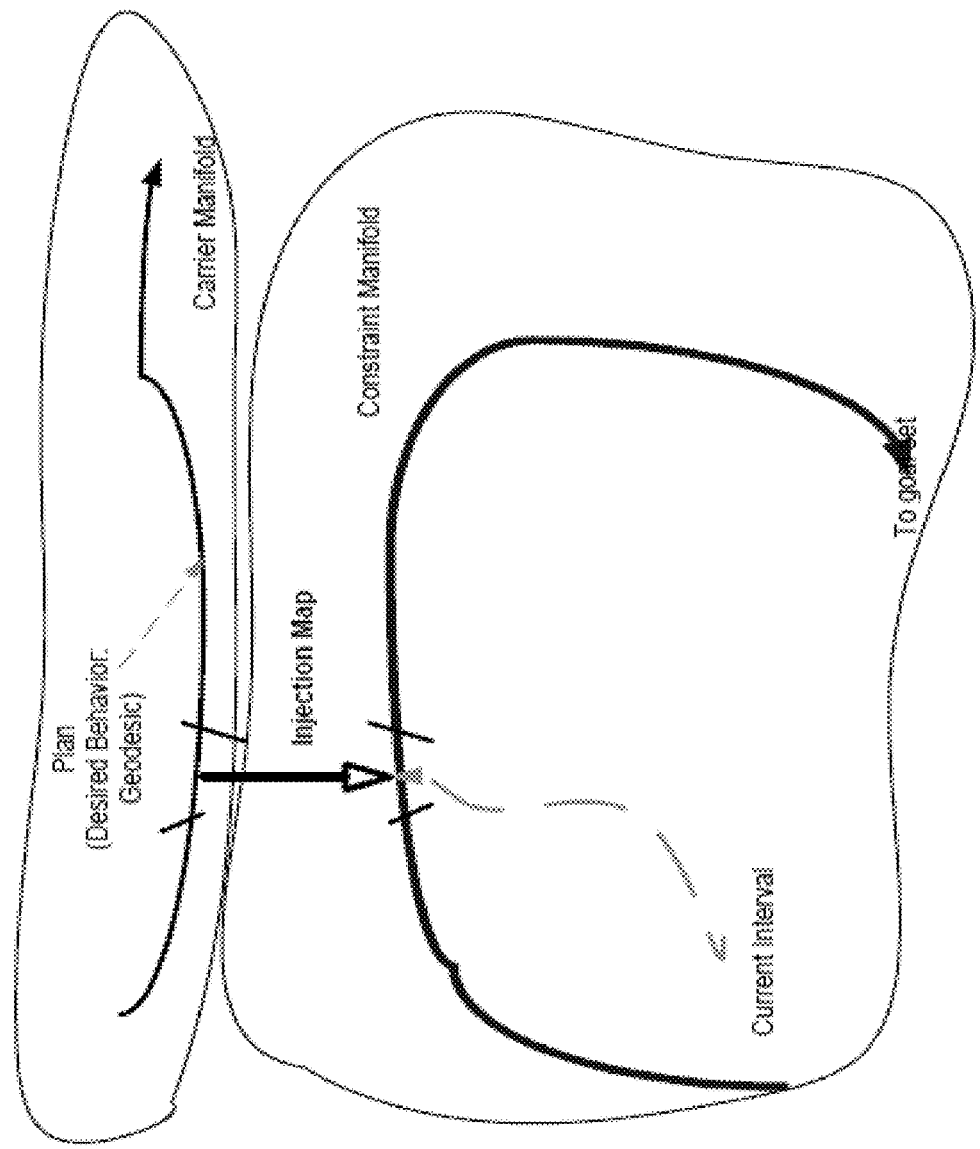
Figure 29B:
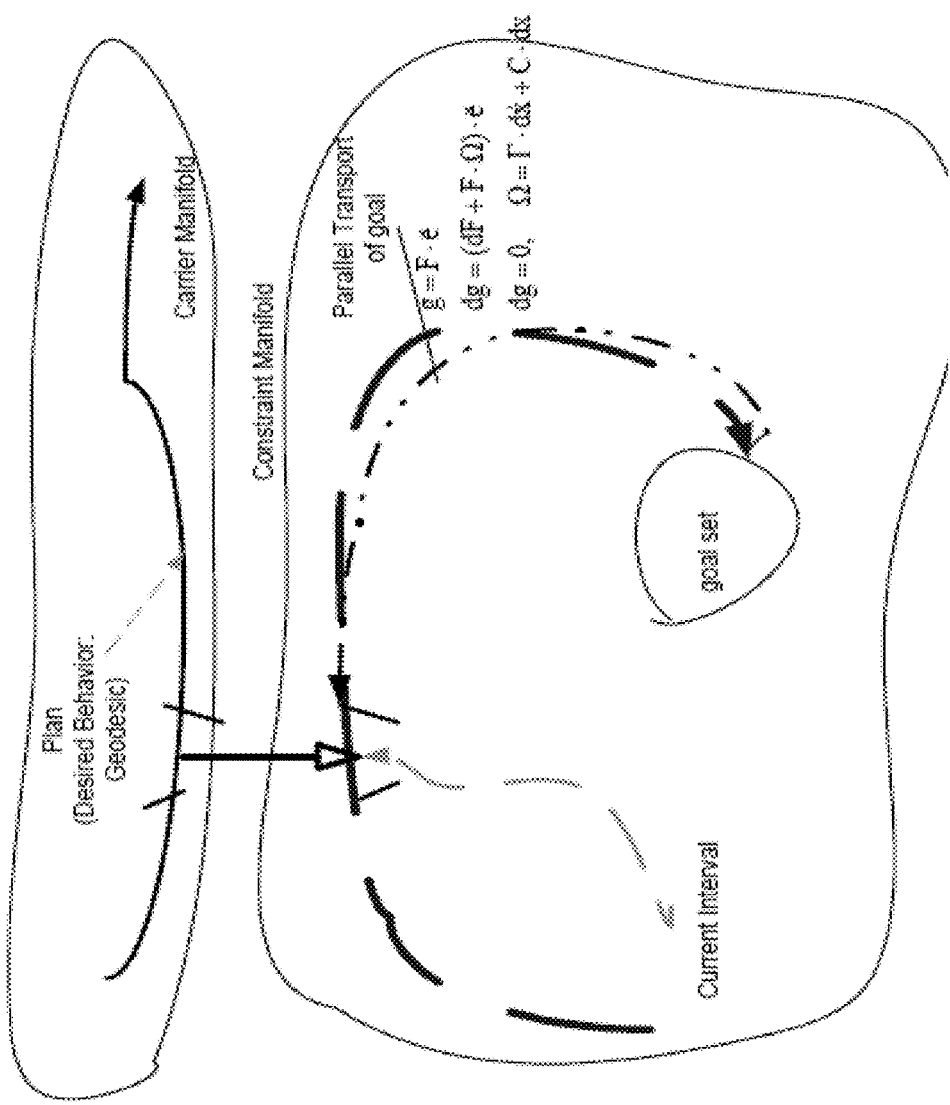
Figure 29C:
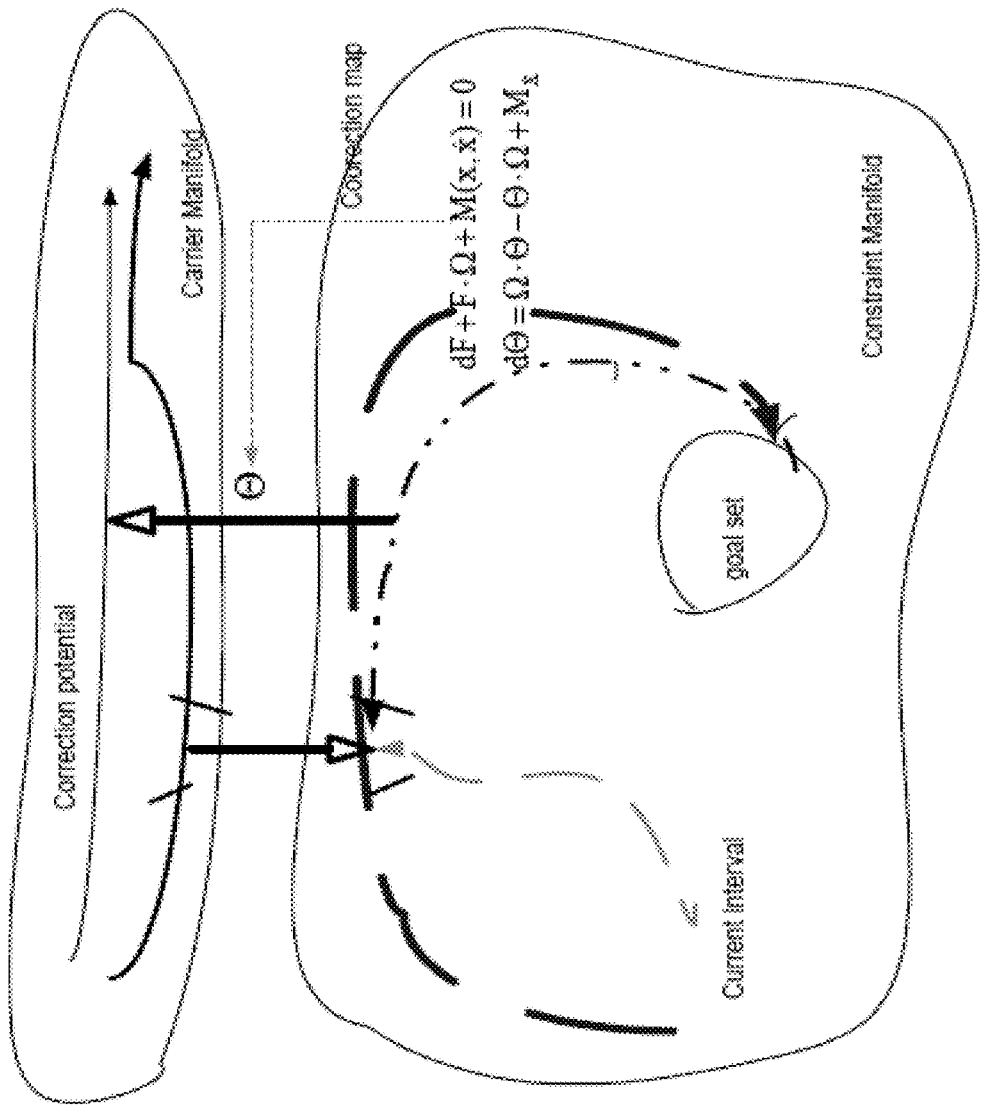
Figure 29D:
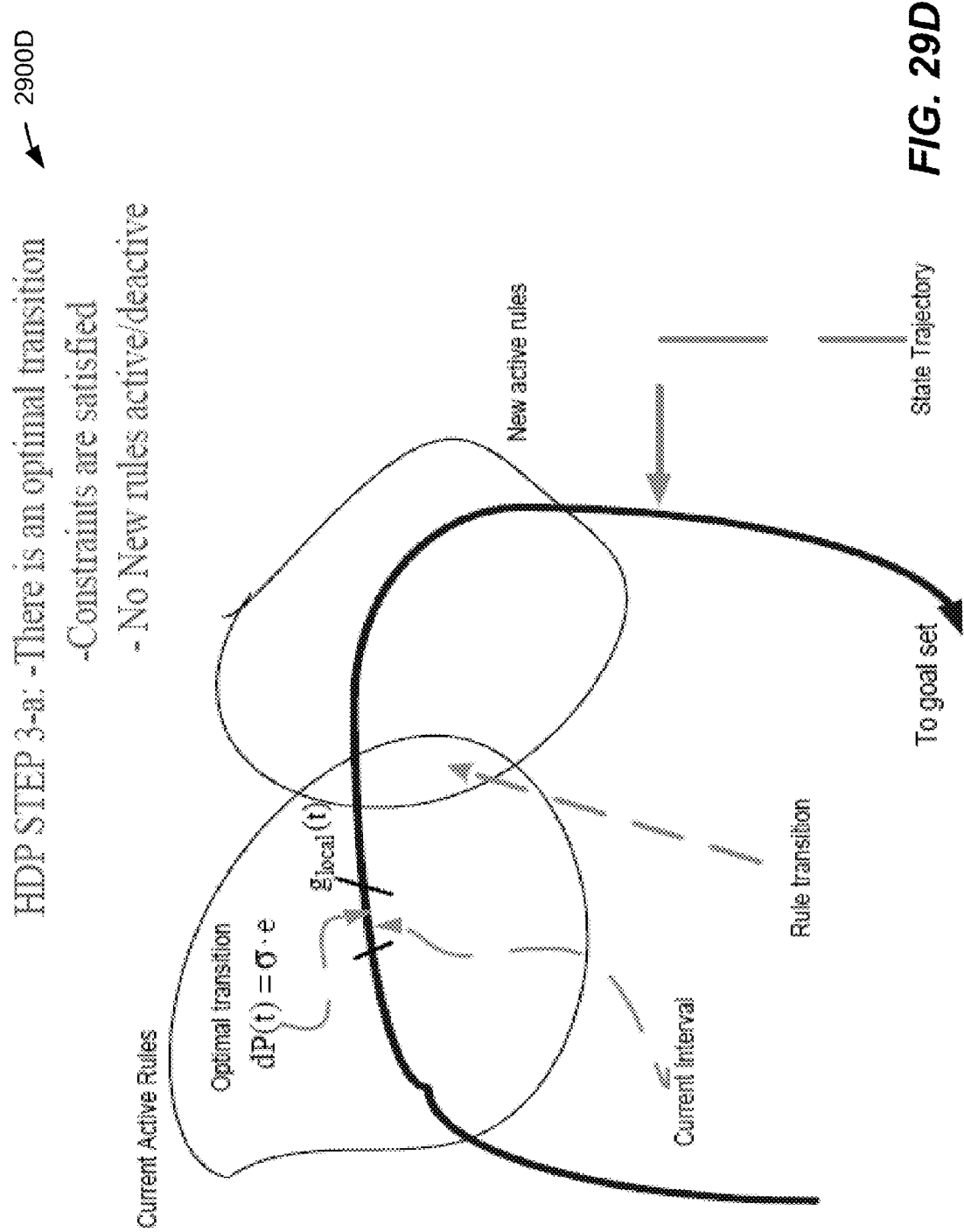
Figure 29E:
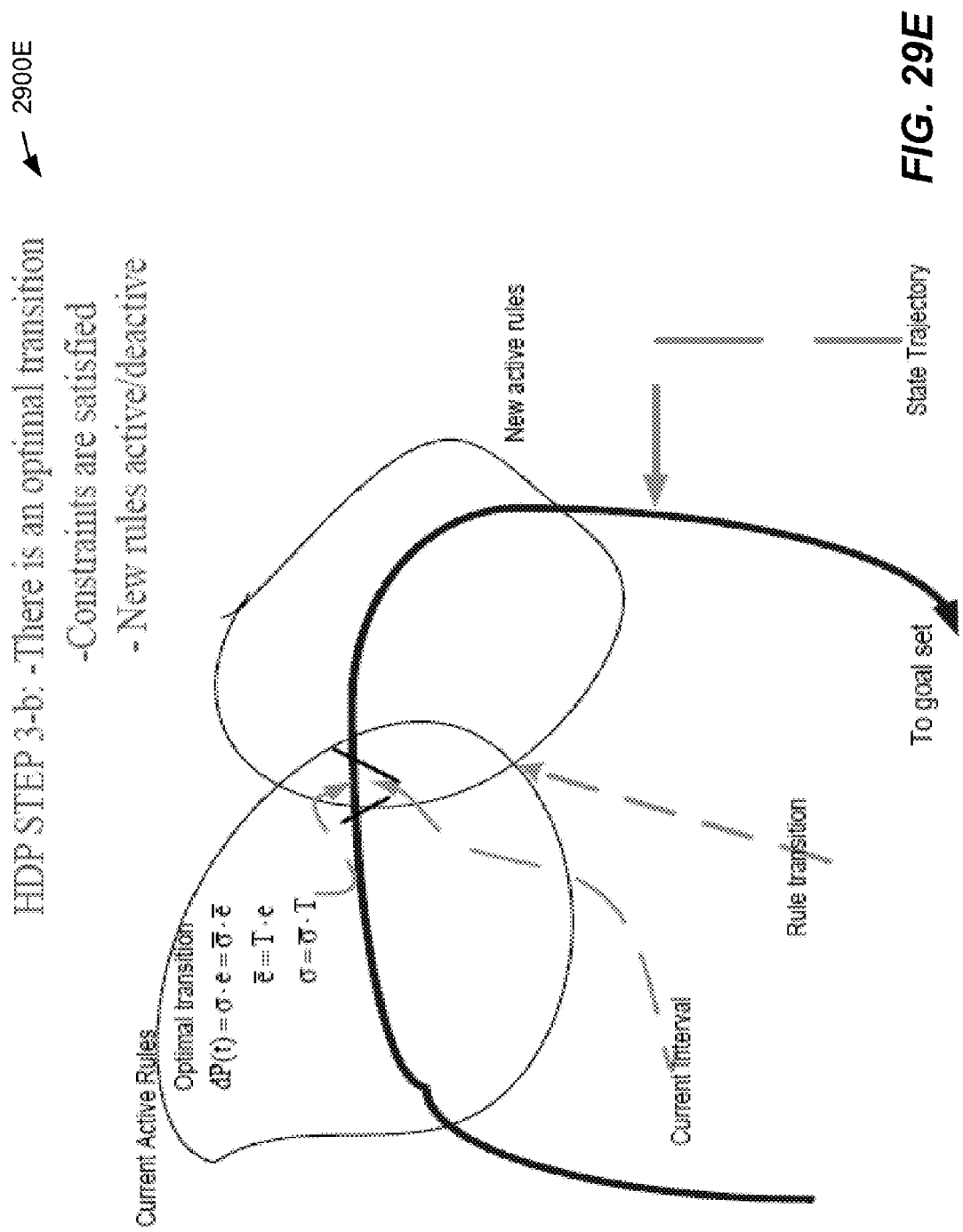
Figure 29F:
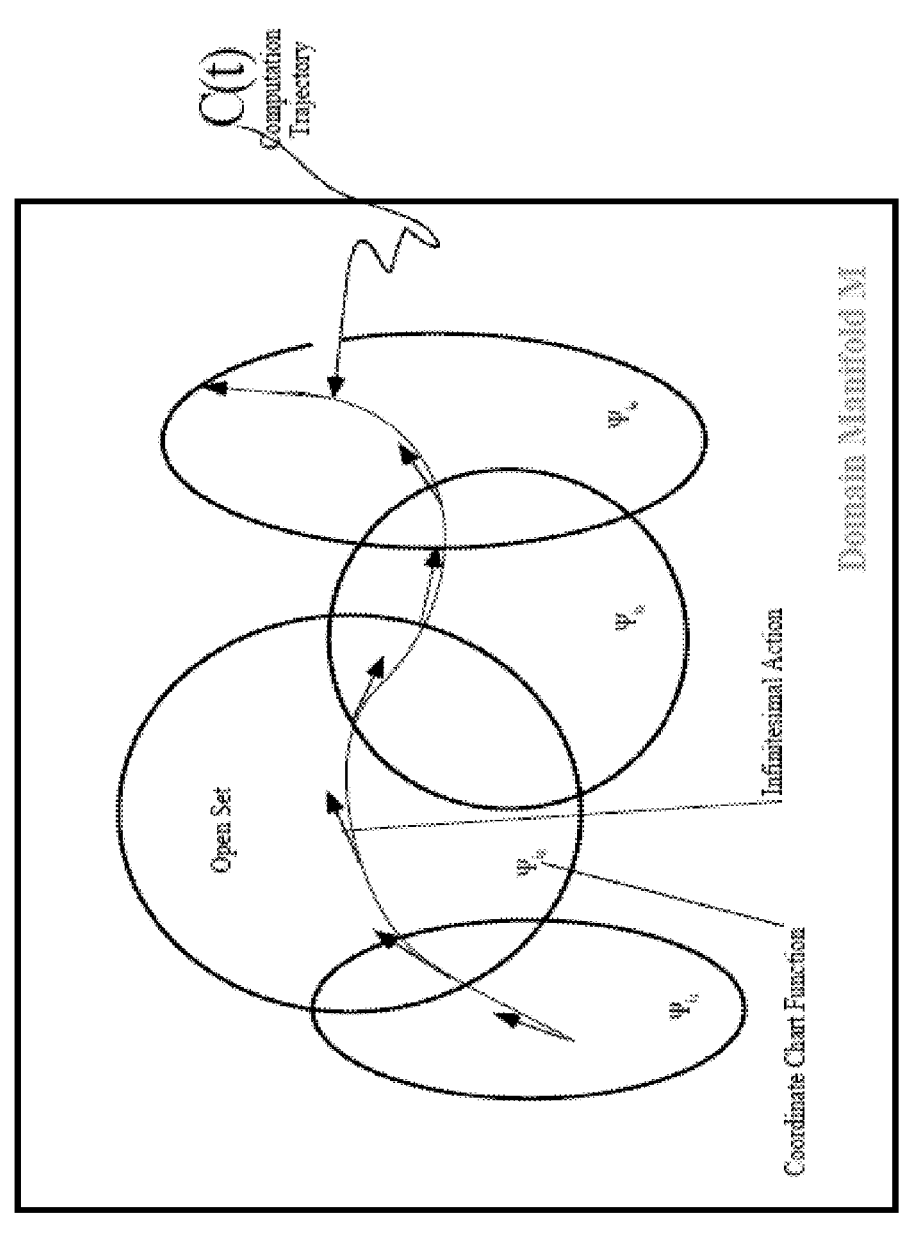
Figure 29H:
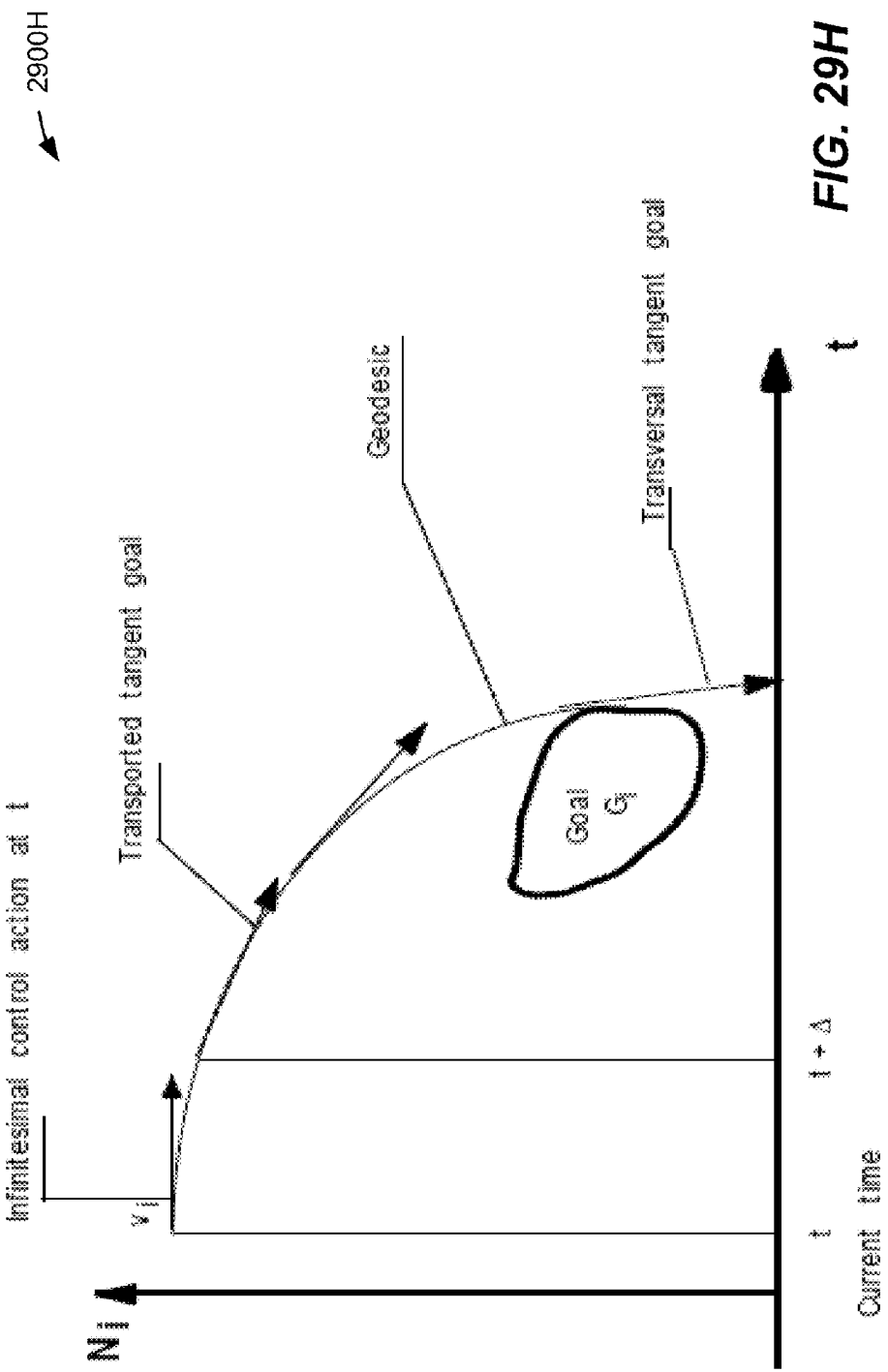
Figure 29I:
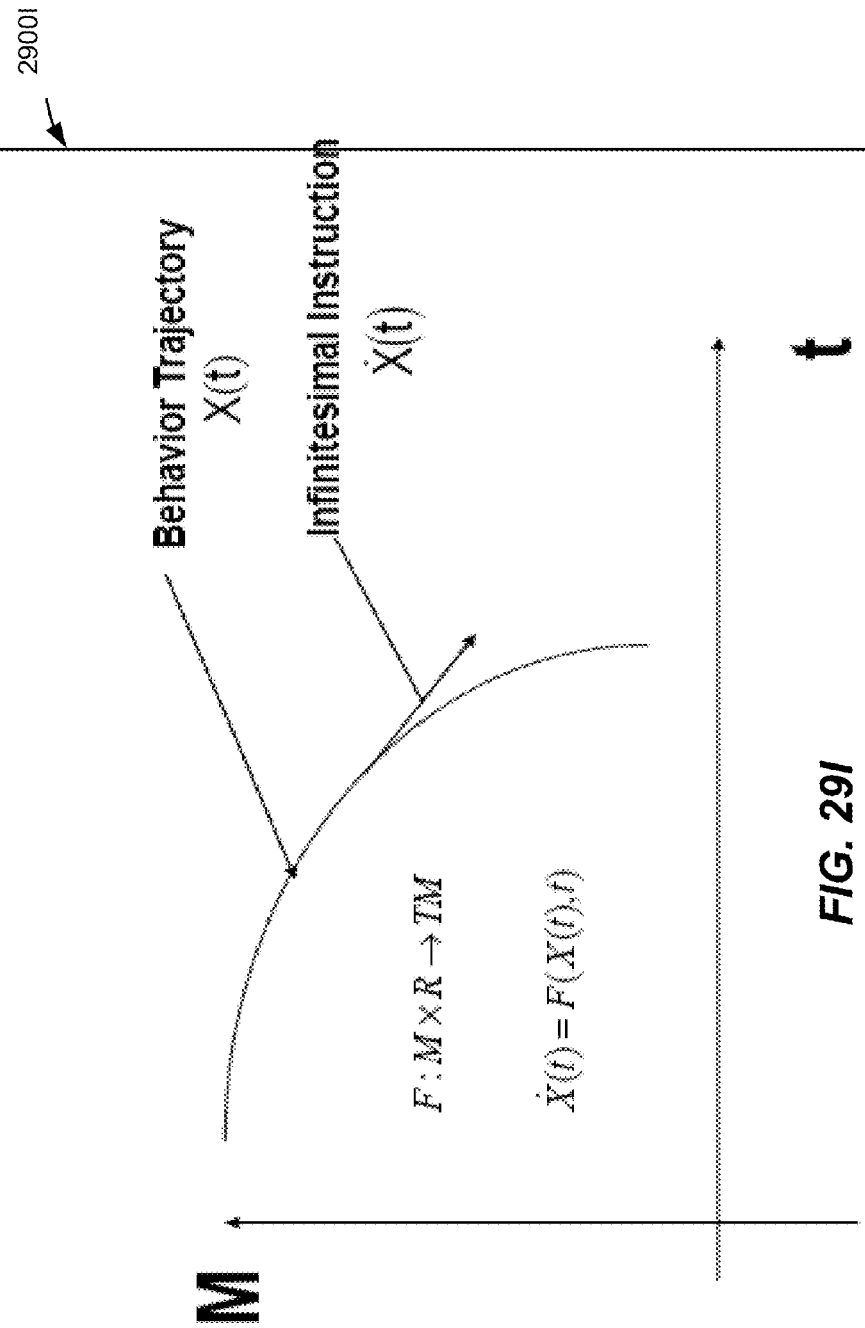
Figure 29K:
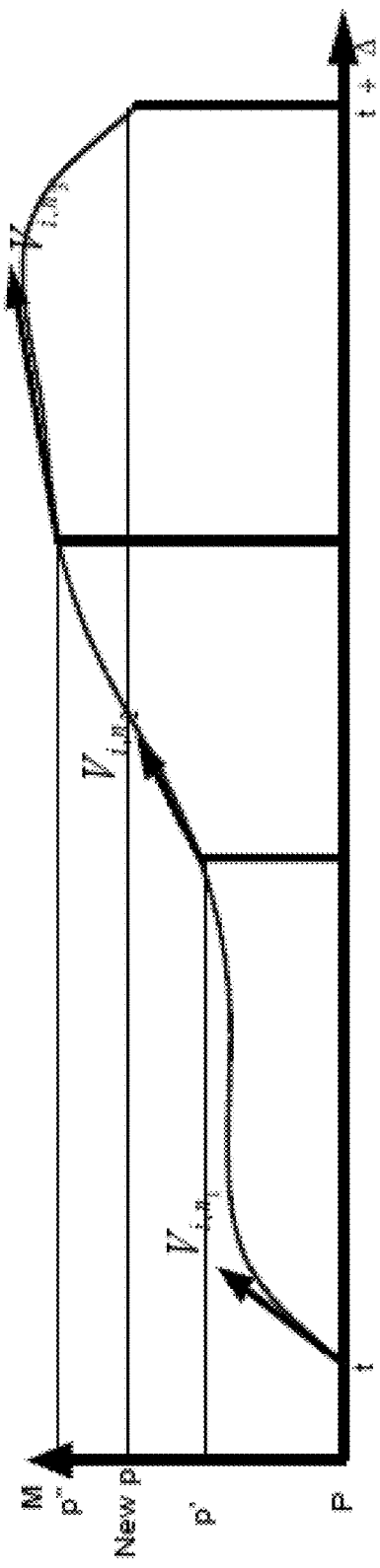
Figure 29L:
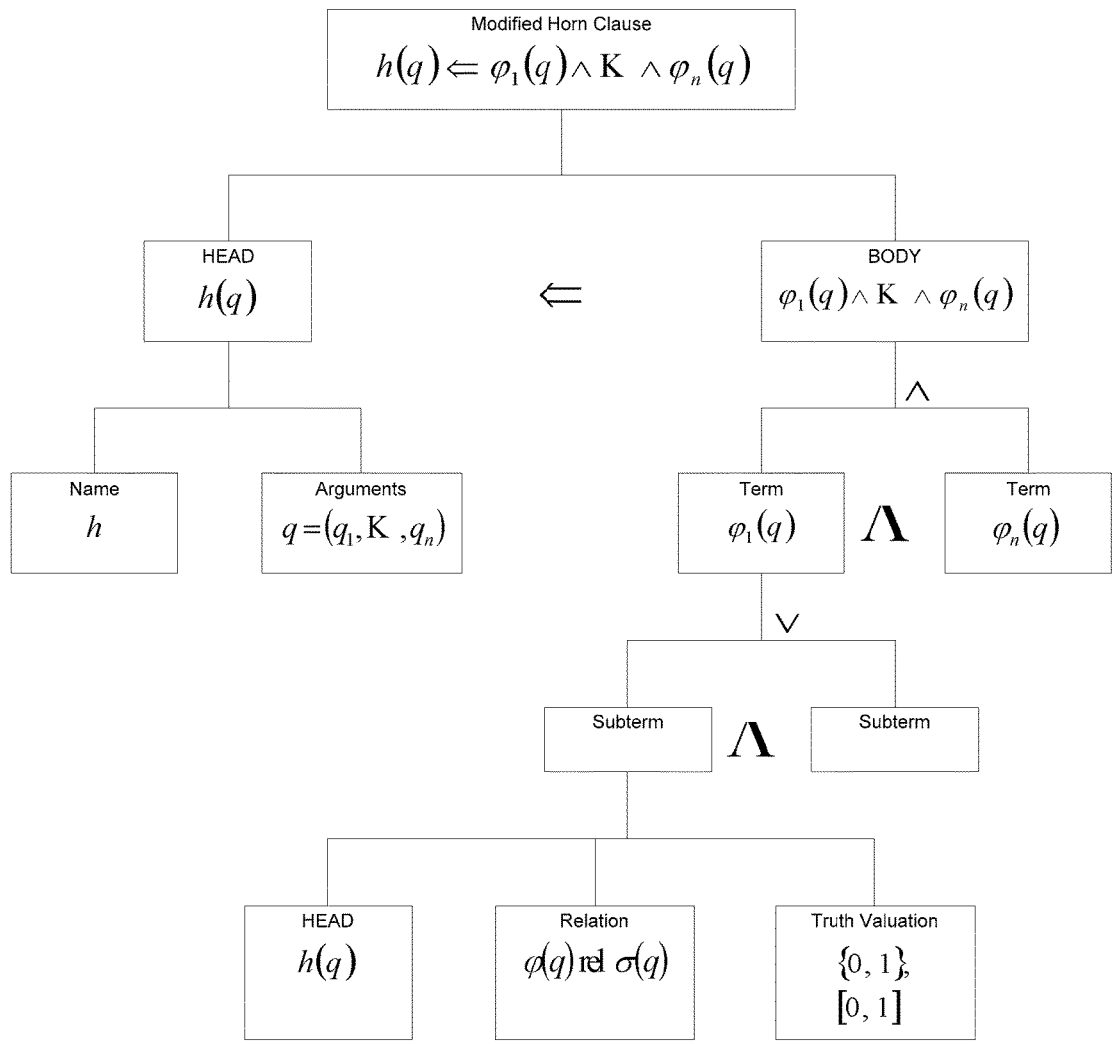

FIGS. 26-28 provide further details regarding operations of portions of example CDI systems and their sub-components, and FIGS. 29A-29K illustrate examples of using a CDI system to iteratively determine near-optimal solutions over time for controlling a target system in diagrams 2900A-2900K. In particular, FIG. 26 illustrates a further diagram 2600 of workflow and components of a portion of a CDI system, FIG. 28 illustrates a diagram 2800 of an overview workflow for a portion of a CDI system, and FIG. 27 illustrates a diagram 2700 of workflow for an inference process portion of a CDI system.

Further details related to an example CDI system are shown below and included in provisional U.S. Patent Application Ser. No. 62/015,018, filed Jun. 20, 2014 and entitled "Methods And Systems For Cooperative Distributed Inferencing," which is hereby incorporated by reference in its entirety. In addition, further details related to example details of using gauges to perform model error measurements are included in provisional U.S. Patent Application No. 62/182,796, filed Jun. 22, 2015 and entitled "Gauge Systems," which is also hereby incorporated by reference in its entirety. Furthermore, further details related to examples of using the CDD system in particular manners with particular types of target systems are included in provisional U.S. Patent Application No. 62/182,968, filed Jun. 22, 2015 and entitled "Applications Of Cooperative Distributed Control Of Target Systems," which is also hereby incorporated by reference in its entirety—the example types of target systems discussed include, for example, a vehicle being controlled, controlling inventory management, controlling a micro-grid electrical generation facility, controlling activities in a day trader financial setting, etc.

| Current notation | Comments |
|---|---|
| t | Notation for algorithmic time. |
| q(t) | Notation of canonical coordinate vector for entire system. |
| q | Notation of canonical coordinate vector dropping time dimension. |
| $q^{(f)}$ | Notation of canonical coordinate vector for specific function f. |
| $\dot{q}$ | Notation of first time derivative of canonical coordinate vector. |
| $\ddot{q}$ | Notation of second time derivative of canonical coordinate vector. |
| h | Notation of HEAD of Horn clause. |
| φ(q) | Notation of generic proposition. |
| σ(q) | Notation of generic proposition alternate to φ. |
| $T_i$ | Notation of the TV of a soft rule. |
| ř(q; φ, σ) | Generic equational form relating two propositions. |
| $\tilde{\varphi}(q)$ | Notation of the equational form of φ(q) |
| $\varphi_Q(q)$ | Notation for proposition defined by the query. |
| $\tilde{\varphi}_Q(q)$ | Notation for equation defined by the query. |
| J(q) | Notation for minimization function for the query. |
| £ | Notation for static Lagrangian |
| $£_k^{(o,T)}$ | Notation for total static Lagrangian for $DE_k$. |
| q | |
| $\{p_a\}$ | |
| $u^{(k)}$ | |
| $H_k^{(o)}$ | Primary Hamiltonian for the absolute rules for $DE_k$. |
| $H_k^{(A)}$ | Hamiltonian for the Tellegen agent of the total Hamiltonian's rules. |
| $H_k^{(T)}$ | Total Hamiltonian for $DE_k$. |

Overview

This document introduces and specifies the architecture for the Cooperative Distributed Inferencing Platform (CDIP). The primary instance of this is the Distributed Architecture (DA) for resolving queries by accessing both an Internal Heterogeneous Database (IHDB) populated by a special class of Horn Clause rules and external data sources referred to as sensors.

The architecture implements a network of active devices at its nodes. These devices are called Decision Elements (DE's). The DE's cooperate in the resolution of a query posed to one or several of them. The DE's in a given DA are referred to as the team.

Every DE in a team is programmed to transform rules in its domain, determined by a posed query, into an ordinary differential equation (ODE), whose dependent variables represent internal variables and parameters. The dependent variables include unknowns of the query posed to the DE. The DE's in the architecture are synchronized via a Pareto multi criteria optimization strategy.

The components of the CDIP include:

Application requirements that the system is designed to accommodate.

Functional requirements that satisfy the application requirements and pertain directly to the construction and operation of the system components.

Subcomponents which are necessary to implement the functional requirements

Limitations which highlight noteworthy constraints which are inherent the specified implementation of the architecture.

Architectural flow describes key aspects of the architecture that indicate how the system is to be constructed given the specified essence and key behavior of the subcomponents.

Software realization of the architecture describes the key pieces of software necessary for system implementation.

Data describes the kinds of data the system is expected to accept as input and produce as output.

Data exchange protocols reference key data types and structures that need to be exchanged across the system and the protocols for exchange.

Environment describes the particulars of the environments that the system will be able to operate in and therefore should be tested in.

Testing describes how the system should be tested given the data and operating environments.

Subcomponents

Subcomponents are fundamental parts of the architecture that perform particular roles. This section contains descriptions for each of the subcomponents of the architecture. The subcomponents are:

The Distributed Architecture (DA).
The Internal Heterogeneous Database (IHDB).
The Rule Entry Interface (REI).
The Rule Editor (RE).
The External Knowledge Base (EKB).
The Sensor Ingestion Interface (SII).
The Rule Conversion Engine (RCE).
The Decision Element (DE).
The Query Language Interface (QLI).
The Minimization Function Generator (MFG).
The Query Response Engine (QRE).
The Pareto Multi-Criteria Optimization Engine (PMOE).

Distributed Architecture (DA)

The DA is a platform of interacting components called DE's. The DE's collaborate in the resolution of a query posed by one of them. The DE's implement a distributed, dynamic optimization process, herein referred as the optimization process (OP). OP implements an optimization process that computes an answer to the active queries as a function of data stored in two categories of repositories: IHDB and EKB's. These repositories of the data needed to implement OP given a query.

The EKB's are a collection of public or private repositories of knowledge relevant to the DE posing a query. A DE has a list of external repositories (LER). Each entry in an LER includes 1) a protocol, 2) a heading sub-list, and 3) a translation grammar. Each protocol entry prescribes the access procedure to the corresponding knowledge repository. Each heading sub-list entry contains a summary of the knowledge contents of the corresponding repository. Finally, each translation grammar entry provides a procedure for converting knowledge elements of the corresponding repository in to the rule representation in the IHDB of the DE.

Functional characteristics of this architecture and in particular, the DE's, IHDB, and the sensors are described, including the following concepts:

The DA
  A process for resolving queries by accessing the IHDB and External Knowledge Bases (EKB's) through sensors
The constitution of DE's
  A query and corresponding rules transformation into an ODE
  The orchestration of a team of DE's through a Pareto multi criteria optimization strategy
The Internal Heterogeneous Database (IHDB)
Composition of IHDB as a Set of Knowledge Components The IHDB encodes knowledge about the implemented application. The IHDB is divided into knowledge components (KC's). Each KC is consulted and updated by a DE in the DA. Any pair of KC's may have an overlapping set of rules by which they operate, but there is no a priori constraint on intersections or inclusion. The collection of KC's constitutes the existing knowledge of the system.

Algorithmic Formulation of a Rule

A KC is a collection of rules, written in a restrictive Horn clause format. The rules are logic entities. When a rule is instantiated, it has a logic value. The logic values a rule can have are taken from the interval[0,1]. The entire system of rules is evaluated using variables and parameters which are collectively referred to as the generalized coordinates of the system and are indexed as follows:

$$q(t)=\{q^{(1)}(t),\ldots,q^{(N)}(t)\}. \quad (3.2\text{-}1)$$

The time argument t refers to the algorithmic time of the system which means that it has no other meaning than as a continuous index with respect to the evolution of the system. There is therefore no requirement that it correspond to a physical aspect of the system although this may naturally occur. Physical time may be represented specifically by a canonical coordinate of choice $q^{(i)}(t)$. Alternatively, we may refer to the q's without expressly stating the independent time argument and write $$q(t)=\{q^{(1)},\ldots,q^{(N)}\}. \quad (3.2\text{-}2)$$

Then we should also note that the time derivatives are referred to notationally as $$\dot{q}=\frac{dq(t)}{dt},\quad \ddot{q}=\frac{d^2q(t)}{dt^2} \quad (3.2\text{-}3)$$

These coordinates are referred to variously as q depending on the context and the expected arguments of the function to which they are applied. When it is necessary to distinguish between more than one q in equational form we generally write $q_f$ where f denotes the reference function or appropriate domain. Typically, we assume without loss of generality the entire set of canonical coordinates q is an argument to any function, term or proposition. In practice, we may further assume it is possible to apply the particular required coordinates as need to mathematical construct in question.

The rules in each knowledge component are of three types: absolute rules, hard rules, and soft rules. Absolute rules and hard rules take logic value 0 (false) or 1 (true) when instantiated. Soft rules take any value in the interval [0,1].

The format of the restrictive Horn Clauses in the IHDB is illustrated in Equation 3.2-2. A Horn Clause is an object composed of two objects a HEAD and a BODY connected by backward Implication ($\Leftarrow$) The logic implication transfers the logic value of the BODY to the HEAD. If the rule is an absolute rule or a hard rule, the logic value is 1 (if the BODY is logically true) or 0 (if the BODY is logically false). If the rule is a soft rule, the logic value transferred by the body is any number in [0, 1].

The HEAD is a data structure composed of two objects: A name, h, and a list of arguments described by the argument vector $q=(q^{(1)}, q^{(n)})$. The list of arguments includes variables and parameters. The variables take values in the domain of the rule and the parameters are constants passed to the rule and unchanged by the instantiation of the rule. The domain of the rule is a set of values that each of its variables can take. In general, variables can take values over numerical or symbolic domains. As an example, a symbolic domain can be a list of diseases. A numeric domain can be a set of pairs of numbers representing blood pressure.

For the applications of CU, the domains for variables are: real numbers, complex numbers (floating point and floating point complex numbers), integer numbers, binary numbers and symbolic token on finite domains.

The BODY of a clause is a data structure composed of one or more terms, denoted $\varphi_i(q)$. The composition operation is extended-and, denoted by: $\wedge$. The extended-and works as a regular and in absolute rules and hard rules and as a functional product[2] on soft rules.

A rule with a head but not a body is called a fact. A fact's truth value is determined on the basis of the instantiation of its variables.

Each term in the body of a rule is an extended disjunction (or denoted by $\vee$) of sub-terms. The $\vee$ operator behaves like the standard- or for absolute and hard rules and behaves in a functional form, described later, when connecting sub-terms encoding heads of soft rules.

A sub-term is either the HEAD of a rule, a relation or a truth valuation (TV). When it is a HEAD it may have the same name as the one in the HEAD of the rule but with different arguments. This provides a recursive mechanism for rule evaluation.

When a rule has a sub-term that is the head of another rule it is said that the two rules are chained together by the corresponding sub-term. Note that a rule can be chained to several rules via corresponding sub-terms.

Constraint Domains

Constraint domains augment the BODY clause of Horn clauses to facilitate dynamic programming. Constraints are specified as a relationship between terms. Define the relationship between two terms $$\varphi(q) \text{rel } \sigma(q). \quad (3.2\text{-}4)$$

as a member of the following set $$\text{rel} \in \{=, \neq, \leq, \geq, \text{statistical propagation}\}. \quad (3.2\text{-}5)$$

A relation can be of two types numeric or symbolic. Numeric relations establish equational forms between two functional forms. (For the initial phase only polynomial and affine linear functional forms will be considered.)

In general, an equational form is a set of one or more relations. For numeric relations, $\varphi(q)$ rel $\sigma(q)$, rel$\in\{=, \neq, \leq, \geq, <, >,$ statistical propagation$\}$. The table below gives the relations considered and their symbols.

TABLE EE

| Numeric Relation | Symbol | Code Form |
|---|---|---|
| Equality | = | $\varphi = \sigma$ |
| Disequation | $\neq$ | $\varphi\backslash = \sigma$ |
| Less-inequality | < | $\varphi < \sigma$ |
| Less-Equal | $\leq$ | $\varphi =< \sigma$ |
| Great-equality | > | $\varphi > \sigma$ |
| Great-inequality | $\geq$ | $\varphi >= \sigma$ |

The adopted code forms are the ones used in constraint logic programming.

A symbolic relation can be of two types: inclusion and constraint. Inclusion relations are of the form:

$$q \in \text{Set} \quad (3.2\text{-}6)$$

Where x is a variable or a parameter, $\in$ is the inclusion symbol and Set is a set of symbolic forms or a set of numbers or a composite set of the form shown in the table below.

TABLE FF

| Composite Set | Symbol | Code Form |
|---|---|---|
| Intersection | $\cap$ | Set1/\Set2 |
| Union | $\cup$ | Set1\/Set2 |
| Complement | \ | \Set |

Constraint forms of the symbolic relational type may be one or a set of the forms presented in the table below For numeric relations, $\varphi(q)$ rel $\sigma(q)$, rel$\in\{=, \neq, \subset, \supset, \subseteq, \supseteq\}$

TABLE GG

| Symbolic Relation | Symbol | Code Form |
|---|---|---|
| Equal | = | $\varphi\varphi\# = \sigma$ |
| Not Equal | $\neq$ | $\varphi\#\backslash = \sigma$ |
| Is Contained | $\subset$ | $\varphi\# < \sigma$ |
| Contains | $\supset$ | $\varphi\# > \sigma$ |
| Is Contained or Equal | $\subseteq$ | $\varphi\# =< \sigma$ |
| Contains or Equal | $\supseteq$ | $\varphi\# >= \sigma$ |

A TV is either a variable or a constant with values in the interval [0,1]. The TV of a Horn Clause that is an absolute rule or a hard rule can only take two values: 1 or 0. The TV when instantiated is 0 or 1. If the TV for an absolute or hard rule is 1, the rule is said to be in inactive state; if the TV is 0, the rule is said to be in active state.

The TV, $T_i$, of a soft rule satisfies $$0 \leq T_i \leq 1. \quad (3.2\text{-}7)$$

If $T_i$ above satisfies, $$T_i \geq T_{threshold} \quad (3.2\text{-}8)$$

the soft clause is said to be in inactive state. If $$T_i < T_{threshold}, \quad (3.2\text{-}9)$$

the soft clause is said to be in active state, where $T_{threshold}$ is a constant in [0,1] defined for each soft clause. The default value is 0.5.

This concludes the description of the knowledge representation. The instantiation process of the goal in a DE, as function of its knowledge base, is carried out by the inference engine of the DE. This process is the central component of CU and will be described later on the document.

Summary of Terminology

The following table summarizes the terminology we have just reviewed.

TABLE HH

| Reference term | Definition |
| --- | --- |
| proposition | Defined as a construct as in the propositional calculus where the proposition takes on the value of true or false. |
| term | Recursively according to its assigned sub-term. |
| sub-term | A sub-term may be a Horn clause, a relation between two other sub-terms or an extended truth valuation depending on the context of absolute, hard or soft rules. In the case of absolute and hard rules it may be evaluated as a proposition. In the case of soft rules it takes a value on the interval [0, 1] and is considered to be active or true in the case that it exceeds its specific threshold. |
| Horn clause | A disjunction of terms with at most one positive term. |
| definite clause | A Horn clause with exactly one positive term. |
| goal clause | A Horn clause with no positive terms. |
| fact | A definite clause with no negative terms. |
| head | The positive term of a definite clause. |
| inactive state | The case when a rule will not apply for constrained optimization. |
| active state | The case when a rule will apply for constrained optimization. |
| truth value, TV | The value that is used to determine whether a rule is active or inactive. |

Horn Clause Example
The following example illustrates a Horn clause:

$$\text{has\_fever}(\text{name, temperature, white\_count,} \quad (3.12\text{-}10)$$
$$\text{heartrate, blood\_pressure}) \Longleftarrow (\text{temperature} > 37) \land$$
$$((\text{heartrate} \geq 70) \lor bp(\text{name, temperature, blood\_pressure}) \lor$$
$$wc(\text{name, white\_count}))$$

The clause establishes under which conditions the patient of name, has a fever. The variables in clause are:

name,temperature,white_count,heartrate,blood_pressure.

When instantiated they represent, respectively, the name of the patient, his current body temperature, his white blood cell count, his heart rate range, and his blood pressure.

The clause body includes other clauses: by (blood pressure) and we (white count).

This completes the specification of the rule-based framework. The next step is to specify a complete process for converting all rules of this form to a set of equations.

Rule Entry Interface (REI)
The Rule Entry Interface provides a mechanism for:
Providing an API for the entry of rules into the IHDB.
Validating the specification of rules to be inserted into the IHDB.
Routing the rules to the appropriate DE's for insertion to their respective KC's.

Rule Editor (RE)
The Rule Editor allows users to specify rules associated with the systems to be interrogated.

External Knowledge Base (EKB)
It may be distributed or not
It may be persisted or not
It may be persisted locally or remotely to an agent
It may or may not be architecturally co-located with the IHDB A sensor may include any source of data used by the agent
It may use various types of buses for data communication
Sensors may or may not be co-located with agents/DEs Rule Conversion Engine (RCE)
The rule conversion engine converts rules of the IHDB into equations.

Method for Specification of a Simple Term as an Equation
Consider the term $\varphi(q)$ with the following truth assignment.

$$\varphi(q) = \begin{cases} T & q \in \mathcal{D}_\varphi \\ F & q \notin \mathcal{D}_\varphi \subset \mathcal{D} \end{cases} \quad (3.6\text{-}1)$$

Then we can define the set of arguments which yield positive truth assignment.

$$\{q \in \mathcal{D}_\varphi | \varphi(q) \leftarrow T\}. \quad (3.6\text{-}2)$$

Define the corresponding equation $\check{\varphi}(q)$ of the term $\varphi(q)$ as $$\check{\varphi}(q) = \begin{cases} 1 & \varphi(q) \leftarrow T \\ 0 & \varphi(q) \leftarrow F \end{cases} \quad (3.6\text{-}3)$$

Then extend the range of $\check{\varphi}(a)$ to the closed unit interval $$\check{\varphi}(q) \to [0,1]. \quad (3.6\text{-}4)$$

Revisiting the taxonomy of absolute, hard and soft rules, we recognize that hard and soft rules (terms in this example) can take values along the interval $$0 \leq \check{\varphi}(q) \leq 1. \quad (3.6\text{-}5)$$

And for absolute rules we add the constraint $\check{\varphi}(a) \to \{0,1\}$ $$\check{\varphi}(q)(1 - \check{\varphi}(q)) = 0. \quad (3.6\text{-}6)$$

Conversion of Fundamental Clauses of Propositional Calculus to Equations
Define the following notation for the propositional calculus.

TABLE II

| Symbol | Function |
| --- | --- |
| ∧ | And |
| ∨ | Or |
| ⇒ | Implication |
| ~ | Not |
| ∃ | Exists |
| ∀ | All |
| Fuzzy rule | |

Theorem 3.6.1. Given the method for the specification of equations from propositions, we prove the following transformations.

TABLE JJ

| Proposition | Equation |
| --- | --- |
| $\sim\varphi(q)$ | $1 - \check{\varphi}(q)$ |
| $\varphi(q) \land \sigma(q)$ | $\check{\varphi}(q) \cdot \check{\sigma}(q)$ |
| $\varphi(q) \lor \sigma(q)$ | $\check{\varphi}(q) + \check{\sigma}(q) - \check{\varphi}(q) \cdot \check{\sigma}(q)$ |
| $\varphi(q) \Rightarrow \sigma(q)$ | $1 - \check{\varphi}(q) + \check{\varphi}(q) \cdot \check{\sigma}(q)$ |

TABLE JJ-continued

| Proposition | Equation |
|---|---|
| $\varphi_1(q) \wedge \varphi_2(q) \wedge \ldots \wedge \varphi_{k-1}(q) \wedge$ $\varphi(q) \Rightarrow \varphi(q)$ | $\check{\varphi}(n, q) = \dfrac{\check{h}(n-1, q)}{\check{\sigma}(n, q)\check{\varphi}(n-1, q) - 1}$ |

(tail recursive)

Proof by Enumeration for Equational Representation of Conjunction

Define the function ř (q; φ, σ) which represents the equation corresponding to conjunction (∧). Verify by enumeration the correspondence of the mathematical equation values corresponding to the mapping T→1 and F→0.

TABLE KK

| φ(q) | ∧ | σ(q) | ř(q; φ, σ) = φ̌(q) · σ̌(q) |
|---|---|---|---|
| T | T | T | $\mid 1 = 1 \cdot 1 \mid$ |
| T | F | F | $0 = 1 \cdot 0$ |
| F | F | T | $0 = 0 \cdot 1$ |
| F | F | F | $0 = 0 \cdot 0$ |

Proof by Enumeration for Equational Representation of Disjunction

Define the function ř (q; φ, σ) which represents the equation corresponding to disjunction (∨). Verify by enumeration the correspondence of the mathematical equation values corresponding to the mapping T→1 and F→0.

TABLE LL

| φ(q) | ∨ | σ(q) | ř(q; φ, σ) = φ̌(q) + σ̌(q) − φ̌(q) · σ̌(q) |
|---|---|---|---|
| T | T | T | $1 = 1 + 1 - 1 \cdot 1$ |
| T | T | F | $1 = 1 + 0 - 1 \cdot 0$ |
| F | T | T | $1 = 0 + 1 - 0 \cdot 1$ |
| F | F | F | $0 = 0 + 0 - 0 \cdot 0$ |

Proof by Enumeration for Equational Representation of Negation

Define the function ř (q; φ, σ) which represents the equation corresponding to negation (∨). Verify by enumeration the correspondence of the mathematical equation values corresponding to the mapping T→1 and F→0.

TABLE MM

| φ(q) | ~φ(q) | ř(q; φ, σ) = 1 − φ̌(q) |
|---|---|---|
| T | F | $0 = 1 - 1$ |
| F | T | $1 = 1 - 0$ |

Proof by Enumeration for Equational Representation of Implication

Define the function ř (q; φ, σ) which represents the equation corresponding to disjunction (⇒). First note the equivalence of $$\varphi(q) \Rightarrow \sigma(q) \text{ and } \sim\varphi(q) \vee \sigma(q). \tag{3.6-7}$$

Verify by enumeration the correspondence of the mathematical equation values corresponding to the mapping T→1 and F→0.

TABLE NN

| ~φ(q) | ∨ | σ(q) | ř(q; φ, σ) = 1 − φ̌(q) + φ̌(q) · σ̌(q) |
|---|---|---|---|
| T | T | T | $1 = 1 - 1 + 1 \cdot 1$ |
| T | F | F | $0 = 1 - 1 + 1 \cdot 0$ |
| F | T | T | $1 = 1 - 0 + 0 \cdot 1$ |
| F | T | F | $1 = 1 - 0 + 0 \cdot 0$ |

Proof for Equational Representation of Tail Recursion

Tail recursion is propositionally defined as $$\varphi(q) \Leftarrow \varphi_1(q) \wedge \varphi_2(q) \wedge \ldots \wedge \varphi_{k-1}(q) \wedge \varphi(q) \tag{3.6-8}$$

where s represent the current state. To develop an equational representation of the recursive formulation, first define the general function φ̃(n,q) where n represents the $n^{th}$ iteration of the tail recursion ad φ̃(n,q) is the logical consequent. Then rewrite the above formulation using the recursive step.

$$\tilde{\varphi}_1(n,q) \wedge \tilde{\varphi}_2(n,q) \wedge \ldots \wedge \tilde{\varphi}_{k-1}(n,q) \wedge \tilde{\varphi}(n-1,q) \Rightarrow \tilde{\varphi}(n,q) \tag{3.6-9}$$

Define $$\tilde{\sigma}(n,q) \approx \tilde{\varphi}_1(n,q) \wedge \tilde{\varphi}_2(n,q) \wedge \ldots \wedge \tilde{\varphi}_{k-1}(n,q)$$

$$\tilde{r}(n-1,q) \approx \tilde{\sigma}(n,q) \wedge \tilde{\varphi}(n-1,q) \tag{3.6-10}$$

Then the tail recursion is rewritable as $$\tilde{\sigma}(n,q) \wedge \tilde{\varphi}(n-1,q) \Rightarrow \tilde{\varphi}(n,q)$$

$$\tilde{r}(n-1,q) \Rightarrow \tilde{\varphi}(n,q). \tag{3.6-11}$$

According to the equational representation of implication, let $$\check{h}(n-1, q) = 1 - \check{\tilde{\sigma}}(n,q) \cdot \check{\tilde{\varphi}}(n-1,q) + \check{\tilde{\sigma}}(n,q) \cdot \check{\tilde{\varphi}}(n-1, q) \cdot (n, q)\check{\tilde{\varphi}}. \tag{3.6-12}$$

Since by definition $\hat{\tilde{r}}(n-1, q) = \hat{\tilde{\sigma}}(n,q) \cdot \hat{\tilde{\varphi}}(n-1, q)$. Then $$\check{\tilde{\varphi}}(n, q) = \dfrac{\hat{\tilde{h}}(n-1, q) + \hat{\tilde{\sigma}}(n, q) \cdot \hat{\tilde{\varphi}}(n-1, q) - 1}{\hat{\tilde{\sigma}}(n, q) \cdot \hat{\tilde{\varphi}}(n-1, q)} \tag{3.6-13}$$

with boundary condition n=0.

Converting Rules Based System of Inference to the Problem of Constrained Minimization Consider the following example.

Converting Rules to Constraints

The preceding discussion has established an algorithm for convert rules of the form $$h(q) \Leftarrow \varphi_1(q) \wedge \varphi_2(q) \wedge \ldots \wedge \varphi_m(q) \tag{3.6-14}$$

To constraints of the form $$\check{h}(q) = \check{\varphi}_1(q) \cdot \check{\varphi}_2(q) \cdot \ldots \cdot \check{\varphi}_m(q). \tag{3.6-15}$$

Decision Element (DE)

A diagram of the Decision Element Architecture is shown in illustration OO. It is composed six elements:
Programmable search engine (PSE)
Internal heterogeneous database (IHDB)
Inference engine (IE)
Inference rule base (IRB)
API/user interface
Network interface (NI)
List of External Repositories (LER)

A DE has a List of External Repositories (LER). Each entry in an LER includes 1) a protocol, 2) a heading sub-list, and 3) a translation grammar. Each protocol entry prescribes the access procedure to the corresponding external knowledge repository. Each heading sub-list entry contains a summary of the knowledge contents of the corresponding repository. Finally, each translation grammar entry provides a procedure for converting knowledge elements of the corresponding repository in to the rule representation in the IHDB of the DE.

Programmable Search Engine

The programmable search engine implements a standard hashing algorithm for detecting active rules as a function of the current instantiation of the variables in a variable buffer (VB) of the IE, and the contents of the active rule buffer (ARB). The VB contains the variables that form part of the query and all additional variables incorporated to this buffer during the inference process (IP). The VB includes all relevant data from the EKB beneficial to perform the query. The IP will be described below. The ARB contains all the currently active rules in the IP.

The search hashing algorithm is characterized by the search rules in the Inference Rule Base.

Internal Heterogeneous Database

The IHDB is the repository of the application clauses associated with the DE. These encode the domain of knowledge characterizing the expertise of the DE. For example in a medical application, a decision element may deal with expertise on heart illnesses, and the corresponding clauses might encode diagnoses and treatments for these diseases.

Inference Engine

The IE encodes an algorithm, the IP, for assigning values to the variables appearing in the query.

Inference Rule Types

The DE incorporates inference rules (IR) that are a collection of rules for transforming and inferring instantiations of the goal. These rules provide the Inference Engine with directives for processing database rules to give a satisfactory instantiation to a given query or to request additional information so that a satisfactory instantiation can be generated. They are organized according to their functionality as follows. (See Illustration PP)

Equation Rules

These rules include the formal rules for inference. This includes all rules for natural language modeling from first principles.

Optimizer Rules

These rules include rules for finding the interior point in optimization.

Search Rules

These rules include rules for identifying the nature of insufficient potential. The goal is to apply these rules to acquire additional information required to satisfy the optimization goal.

Adaptation Rules

Adaptation rules are used to update the soft rules to relax them further to reduce the complexity and constrains of the optimization problem. The adaptation also serves to update the search rules to improve information acquisition.

Language Statistics and Pattern Rules

These rules embody the machine learning models.

Network Rules

These rules define how information is distributed over the network and what information is available from which resources.

Hybridization Rules

The rules define how other rules may be combined.

User Interface

The UI provides the utilities for entering queries, pragma rules, displaying query answers, status and for general interaction with the IE.

Network Interface

The NI provides a generic mechanism for interacting with other DE's via a procedure termed companionship. The companionship procedure implements the active coupling for the cooperation of the DE's in query resolution. This procedure is not hierarchical and implements a Pareto Agreement set strategy as the mechanism for Ca Query Language Interface (QLI)

Information about the QLI is available elsewhere herein.

Process for Determining Active Constraints

The process for determining active constraints is available elsewhere herein.

Minimization Function Generator (MFG) and Determining Active Constraints

The minimization function generator converts a query to a minimization function. Again, we assume without loss of generality the entire set of canonical coordinates q is an argument to any proposition $\varphi_i$. In practice, we may further assume it is possible to apply the particular required coordinates as need to the proposition or function in question. Then let $\varphi^{(k)}$ be the set of propositions associated with $DE_k$ in the context of query Q. These propositions are composed of the proposition associated with the query $\varphi_Q(q)$, and other propositions $\varphi_i(q)$, comprising the constraints of the system. The proposition $\varphi_Q(q)$ associated with a given query Q can be converted to an equation $\check{\varphi}_Q(q)$. Queries that are satisfiable specify a set.

$$\{q|\varphi_Q(q) \leftarrow T\} \quad (3.10\text{-}1)$$

Similarly, a satisfied query represented as an equation is also a set $$\{q|\check{\varphi}_Q(q)=1\}. \quad (3.10\text{-}2)$$

Relaxing the values that $\check{\varphi}_Q(\cdot)$ can take to include the unit interval so that soft rules are incorporated yields the following constrained optimization expression. Let $J(q)=(\check{\varphi}_Q(q)-1)^2$. Then specify the optimization $$\min_q J(q) \quad (3.10\text{-}3)$$

Subject to:
1. $\check{\varphi}_Q(q) \leq 1$
2. $\check{\varphi}_Q(q) \geq 0$
3. A knowledge base on the set $\{\check{\varphi}_1(q), \ldots, \check{\varphi}_n(q), \ldots, \check{\varphi}_{n+s}(q)\} \subseteq \check{\varphi}^{(k)}$ which represents a further set of active constraints specific to the problem:
   a. $\check{\varphi}_i(q) \geq 0$ for $1 \leq i \leq n$,
   b. $\check{\varphi}_i(q) \leq 1$ or, equivalently $-(\check{\varphi}_i(q)-1) \geq 0$ for $1 \leq i \leq n$,
   c. and in the case of absolute rules $\check{\varphi}_i(q)(1-\check{\varphi}_i(q))=0$ for $n < I \leq n+s$.

Introduce the indicator functions $$V^-_{\check{\varphi}_i} = \begin{cases} 0 & \check{\varphi}_i(q) \geq 0 \\ \infty & \check{\varphi}_i(q) < 0 \end{cases} \quad (3.10\text{-}4)$$

and $$V^+_{\check{\varphi}_i} = \begin{cases} 0 & 1-\check{\varphi}_i(q) \geq 0 \\ \infty & 1-\check{\varphi}_i(q) < 0 \end{cases} \quad (3.10\text{-}5)$$

which yields the two logarithmic barrier functions $$\check{V}^-_{\check{\varphi}_i} = -\log(\check{\varphi}_i(q)) \quad (3.10\text{-}6)$$

and $$\check{V}^+_{\check{\varphi}_i} = -\log(1-\check{\varphi}_i(q)). \quad (3.10\text{-}7)$$

According to the method of Lagrange multipliers, combine this with the equality constraints to form the static Lagrangian function $$\mathcal{L}\left(q; \check{\varphi}_Q, \check{\varphi}^{(k)}, \omega_1^{(+)}, \ldots, \omega_n^{(+)}, \omega_{n+1}^{(-)}, \ldots, \right.$$
$$\left. \omega_{2n}^{(-)}, \omega_{2n+1}^{(\lambda)}, \ldots, \omega_{2n+s}^{(\lambda)}, \omega_{2n+s+1}^{(Q)}, \omega_{2n+s+2}^{(Q)}\right) = \quad (3.10\text{-}8)$$
$$\check{\varphi}_Q(q) + \sum_{i=1}^{n}\left[\omega_i^{(+)}\check{V}_{\check{\varphi}_i}^{+} + \omega_{n+i}^{(-)}\check{V}_{\check{\varphi}_i}^{-}\right] + \sum_{l=1}^{s}\omega_{2n+l}^{(\lambda)}\check{\varphi}_l(q)\bigl(1 - \check{\varphi}_l(q)\bigr) -$$
$$\omega_{2n+s+1}^{(Q)}\log(\check{\varphi}_Q(q)) - \omega_{2n+s+2}^{(Q)}\log(1 - \check{\varphi}_Q(q)),$$

the roots of which can be found using a formulation of Newton-Raphson. Since $\mathcal{L}$ here includes absolute, hard and soft rules we may call it the total static Lagrangian for $DE_k$ and refer to it as $\mathcal{L}_k^{(T)}$.

Construct Equations of Motion

Information for equations of motion is available elsewhere herein.

Query Response Engine (QRE) which Includes Process for Constructing Differential Equations Application of Newton-Raphson Consider a continuous analog of the independent variables of $\mathcal{L}(\cdot)$ $$q = q(t) = \begin{bmatrix} q^{(1)}(t) \\ \vdots \\ q^{(v)}(t) \end{bmatrix} \quad (3.12\text{-}1)$$

where each of the v total independent variables of $\mathcal{L}(\cdot)$ is mapped to its corresponding position in q(t), the column vector that is represented with a lower-case q. To reiterate, the independent variable t refers algorithmic time as opposed to physical time which may also be represented in the system. The corresponding unconstrained optimization goal can be written as $$\min_{q_1,\ldots,q_v} \mathcal{L}(q^{(1)}(t), \ldots, q^{(v)}(t)) \quad (3.12\text{-}2)$$

so that $\nabla L(q)$ $$\nabla \mathcal{L}(q(t)) = \begin{bmatrix} \frac{\partial \mathcal{L}}{\partial q^{(1)}} \\ \vdots \\ \frac{\partial \mathcal{L}}{\partial q^{(v)}} \end{bmatrix} = \begin{bmatrix} \nabla \mathcal{L}_1 \\ \vdots \\ \nabla \mathcal{L}_v \end{bmatrix} = 0, \quad (3.12\text{-}3)$$

with positive definite Hessian matrix $$\nabla^2 \mathcal{L}(q(t)) = \begin{bmatrix} \frac{\partial \mathcal{L}}{\partial q^{(1)}\partial q^{(1)}} & \cdots & \frac{\partial \mathcal{L}}{\partial q^{(1)}\partial q^{(v)}} \\ \vdots & \ddots & \vdots \\ \frac{\partial \mathcal{L}}{\partial q^{(v)}\partial q^{(1)}} & \cdots & \frac{\partial \mathcal{L}}{\partial q^{(v)}\partial q^{(v)}} \end{bmatrix} = \quad (3.12\text{-}4)$$

$$\begin{bmatrix} \nabla \mathcal{L}_{11} & \cdots & \nabla \mathcal{L}_{1v} \\ \vdots & \ddots & \vdots \\ \nabla \mathcal{L}_{v1} & \cdots & \nabla \mathcal{L}_{vv} \end{bmatrix} = > 0.$$

Write the recursion for Newton's method $$q_{(k+1)}(t) = q_{(k)}(t) - (\nabla^2 \mathcal{L}(q_{(k)}(t)))^{-1}\nabla \mathcal{L}(q_{(k)}(t)). \quad (3.12\text{-}5)$$

This is equivalently rewritten $$\frac{q_{(k+1)}(t) - q_{(k)}(t)}{\delta} = -\frac{1}{\delta}(\nabla^2 \mathcal{L}(q_{(k)}(t)))^{-1}\nabla \mathcal{L}(q_{(k)}(t)). \quad (3.12\text{-}6)$$

Via continualization we approximate the derivative $$\dot{q}(t) = \frac{dq(t)}{dt} = -(\nabla^2 \mathcal{L}(q(t)))^{-1}\nabla \mathcal{L}(q(t)). \quad (3.12\text{-}7)$$

Translation of Inverted Matrix

Consider M, an invertible and positive definite matrix. Then we make the following provable assertions.

1. $A^T A$ is symmetric.
2. $-A^T A$ has negative eigenvalues.

Define $$\frac{dM(t)}{dt} = -A^T A M(t) + A^T \quad (3.12\text{-}8)$$

Then as $t \to \infty$, $M(t) \to A^{-1} = \nabla^2 \mathcal{L}(q_{(k)}(t)^{-1}$. Using (3.12-3) and (3.12-4) approximate $\dot{q}(t)$ by rewriting the derivative in the context of M(t). This yields the following two equations.

$$\dot{q}(t) = -M(t)\nabla L(q(t)) = \begin{bmatrix} m_{11} & \cdots & m_{1v} \\ \vdots & \ddots & \vdots \\ m_{v1} & \cdots & m_{vv} \end{bmatrix}\begin{bmatrix} \nabla \mathcal{L}_1 \\ \vdots \\ \nabla \mathcal{L}_v \end{bmatrix} = \begin{bmatrix} m_{11}\nabla \mathcal{L}_1 + \ldots + m_{1v}\nabla \mathcal{L}_v \\ \vdots \\ m_{v1}\nabla \mathcal{L}_1 + \ldots + m_{vv}\nabla \mathcal{L}_v \end{bmatrix} \quad (3.12\text{-}9)$$

-continued $$\frac{dM(t)}{dt} = -(\nabla^2 \mathcal{L}(q(t)))^T (\nabla^2 \mathcal{L}(q(t))) M(t) + (\nabla^2 \mathcal{L}(q(t)))^T \quad (3.12\text{-}10)$$

$$= -\begin{bmatrix} \nabla \mathcal{L}_{11} & \cdots & \nabla \mathcal{L}_{v1} \\ \vdots & \ddots & \vdots \\ \nabla \mathcal{L}_{1v} & \cdots & \nabla \mathcal{L}_{vv} \end{bmatrix} \begin{bmatrix} \nabla \mathcal{L}_{11} & \cdots & \nabla \mathcal{L}_{1v} \\ \vdots & \ddots & \vdots \\ \nabla \mathcal{L}_{v1} & \cdots & \nabla \mathcal{L}_{vv} \end{bmatrix} \begin{bmatrix} m_{11} & \cdots & m_{1v} \\ \vdots & \ddots & \vdots \\ m_{v1} & \cdots & m_{vv} \end{bmatrix} + \begin{bmatrix} \nabla \mathcal{L}_{11} & \cdots & \nabla \mathcal{L}_{v1} \\ \vdots & \ddots & \vdots \\ \nabla \mathcal{L}_{1v} & \cdots & \nabla \mathcal{L}_{vv} \end{bmatrix}$$

$$= -\begin{bmatrix} \nabla \mathcal{L}_{11}^2 + \ldots + \nabla \mathcal{L}_{v1}^2 & \cdots & \nabla \mathcal{L}_{11} \nabla \mathcal{L}_{1v} + \ldots + \nabla \mathcal{L}_{v1} \nabla \mathcal{L}_{vv} \\ \vdots & \ddots & \vdots \\ \nabla \mathcal{L}_{11} \nabla \mathcal{L}_{1v} + \ldots + \nabla \mathcal{L}_{v1} \nabla \mathcal{L}_{vv} & \cdots & \nabla \mathcal{L}_{1v}^2 + \ldots + \nabla \mathcal{L}_{vv}^2 \end{bmatrix} \begin{bmatrix} m_{11} & \cdots & m_{1v} \\ \vdots & \ddots & \vdots \\ m_{v1} & \cdots & m_{vv} \end{bmatrix} +$$

$$\begin{bmatrix} \nabla \mathcal{L}_{11} & \cdots & \nabla \mathcal{L}_{v1} \\ \vdots & \ddots & \vdots \\ \nabla \mathcal{L}_{1v} & \cdots & \nabla \mathcal{L}_{vv} \end{bmatrix}$$

$$= \begin{bmatrix} (\nabla \mathcal{L}_{11}^2 + \ldots + \nabla \mathcal{L}_{v1}^2) m_{11} + \ldots + & & (\nabla \mathcal{L}_{11}^2 + \ldots + \nabla \mathcal{L}_{v1}^2) m_{1v} + \ldots + \\ (\nabla \mathcal{L}_{11} \nabla \mathcal{L}_{1v} + \ldots + \nabla \mathcal{L}_{v1} \nabla \mathcal{L}_{vv}) m_{v1} + & \cdots & (\nabla \mathcal{L}_{11} \nabla \mathcal{L}_{1v} + \ldots + \nabla \mathcal{L}_{v1} \nabla \mathcal{L}_{vv}) m_{vv} + \\ \nabla \mathcal{L}_{11} & & \nabla \mathcal{L}_{v1} \\ \vdots & \ddots & \vdots \\ (\nabla \mathcal{L}_{11} \nabla \mathcal{L}_{1v} + \ldots + \nabla \mathcal{L}_{v1} \nabla \mathcal{L}_{vv}) m_{11} + \ldots + & & (\nabla \mathcal{L}_{11} \nabla \mathcal{L}_{1v} + \ldots + \nabla \mathcal{L}_{v1} \nabla \mathcal{L}_{vv}) m_{1v} + \ldots + \\ (\nabla \mathcal{L}_{1v}^2 + \ldots + \nabla \mathcal{L}_{vv}^2) m_{v1} + & \cdots & (\nabla \mathcal{L}_{1v}^2 + \ldots + \nabla \mathcal{L}_{vv}^2) m_{vv} + \\ \nabla \mathcal{L}_{1v} & & \nabla \mathcal{L}_{vv} \end{bmatrix}$$

$$= \begin{bmatrix} \nabla m_{11} + \ldots + \nabla m_{1v} \\ \vdots \\ \nabla m_{v1} + \ldots + \nabla m_{vv} \end{bmatrix}$$

The approximation proceeds as follows, applying the Magnus expansion to compute the integral:
1. Fix $M(0) = \nabla^2 \mathcal{L}(q(0))$ and $= \nabla^2 \mathcal{L}(q(t))$.
2. Use the variation of constants formula to solve $$M(T) = e^{-[\nabla^2 \mathcal{L}(q(T))]^2 t} M(0) + [\int_0^T e^{-[\nabla^2 \mathcal{L}(q(\tau))]^2 (T-\tau)} d\tau]$$

$$\nabla^2 \mathcal{L}(q(T))$$

The following is computation flow, flowing down unless otherwise indicated: (A) Initialize $q_0$, $k=0$ and express the Hessian $A(q) = \nabla^2 L$ symbolically; (B) Evaluate the Hessian at $q_k$: $A_k = A(q_k) = \nabla^2 L(q_k)$; (C) If $\|A_k - A_{k-1}\| \geq \epsilon$, solve $\dot{M}(t) = -(A_k)^2 M(t) + A_k$ for large $t=T$. $M(t) \approx A_k^{-1}$; (D) Integrate $\dot{q}(t) = -\text{Gain} \cdot M(T) \nabla L(q(t))$ from $t_k$ to $t_k + \tau$ with initial condition $q_k$. Set $q_{k+1} = q(t_k + \tau)$; and (E) Continue?, and then Stop, or $t_{k+1} \leftarrow t_k + \tau$ and $k \leftarrow k+1$ and return to (B) above.

Process for Determining Dynamic Lagrangian Via Hemholtz Equations

Given $$G_i(\ddot{q}, \dot{q}, q) = \sum_{j=1}^{n} W_{i,j}(\dot{q}, q)(\dot{q}, q) \ddot{q}^{(j)} + K_i(\dot{q}, q) = 0 \quad (3.12\text{-}11)$$

$$j = 1, \ldots, n$$

If the three conditions $$\frac{\partial G_i}{\partial \ddot{q}^{(j)}} = \frac{\partial G_j}{\partial \ddot{q}^{(i)}}, \quad (3.12\text{-}12)$$

$$\frac{\partial G_i}{\partial \dot{q}^{(j)}} + \frac{\partial G_j}{\partial \dot{q}^{(i)}} = \frac{d}{dt}\left(\frac{\partial G_i}{\partial \ddot{q}^{(j)}} + \frac{\partial G_j}{\partial \ddot{q}^{(i)}}\right),$$

$$\frac{\partial G_i}{\partial q^{(j)}} - \frac{\partial G_j}{\partial q^{(i)}} = \frac{1}{2}\frac{d}{dt}\left(\frac{\partial G_i}{\partial \dot{q}^{(j)}} - \frac{\partial G_j}{\partial \dot{q}^{(i)}}\right),$$

with $i, j = 1, \ldots, n$ hold, then $$\sum_{j=1}^{n} \frac{\partial^2 L}{\partial \dot{q}^{(i)} \partial \dot{q}^{(j)}} \ddot{q}^{(j)} + \frac{\partial^2 L}{\partial q^{(j)} \partial \dot{q}^{(i)}} - \frac{\partial L}{\partial q^{(i)}} = G_i, \quad (3.12\text{-}13)$$

$$i = 1, \ldots, n$$

This is a second order, linear hyperbolic differential equation on the Lagrangian L. It can be solved efficiently by the method of characteristics.

Let $$G(\ddot{q}, \dot{q}, q) = \begin{bmatrix} q(t) \\ \dot{q}(t) \\ \dot{M}(t) \end{bmatrix} \quad (3.12\text{-}14)$$

$$= \begin{bmatrix} q^{(1)} \\ \vdots \\ q^{(v)} \\ m_{11} \nabla \mathcal{L}_1 + \ldots + m_{1v} \nabla \mathcal{L}_v \\ \vdots \\ m_{v1} \nabla \mathcal{L}_1 + \ldots + m_{vv} \nabla \mathcal{L}_v \\ \nabla m_{11} \\ \vdots \\ \nabla m_{v1} \\ \vdots \\ \nabla m_{1v} \\ \vdots \\ \nabla m_{vv} \end{bmatrix}$$

Process for Determining Hessian Rank of Dynamic Lagrangian

Information for determining Hessian rank of dynamic Lagrangian is available elsewhere herein.

Converting the Lagrangian to the Hamiltonian Via the Legendre Transformation.

In our formulation the Lagrangian, $L_k^{(T)}(q, \dot{q}; \omega)$, may be converted to the Hamiltonian using the Legendre transformation, so that $$H_k^{(T)}(q, p; \omega) = \frac{\partial L_k^{(T)}}{\partial \dot{q}} \dot{q} - L_k^{(T)}(q, \dot{q}; \omega) \quad (3.12\text{-}15)$$

$$= p^T \dot{q} - L_k^{(T)}(q, \dot{q}; \omega)$$

Pareto Multi-Criteria Optimization Engine (PMOE)

Consider the problem of determining the relaxed Pareto optimal solution to a given system query at a given time step. There are N decision elements, k=1, ..., N. A given decision element, $DE_k$, has the following associated parameters which are constituent to the ARB:

A generalized set of coordinates relevant to $DE_k$, q.

A generalized set of linearly independent momenta $\{p_a\}$ where the index a refers the linearly independent momenta selected from the canonical set p.

A set of control parameters co for hard a soft rules of the system, where $0 \leq \omega_i \leq 1$.

The ARB has the following components which determine the constraints of $DE_k$:

The Hamiltonian which identifies the fundamental dynamics of the system of the system for the k'th decision element denoted $$H_k^{(o)}(q, \{P_a\}) \quad (3.13\text{-}1)$$

The summation of the first class constraints of the system, which is $$\sum_i \omega_i f_i(q^{(i)}, \omega_i) \quad (3.13\text{-}2)$$

The summation of the second class constraints of the system which is $$\sum_i g_i(q^{(i)}, \omega_i) \quad (3.13\text{-}3)$$

The Tellegen agent which is a function of the Hamiltonians of the absolute rules of the other N−1 decision elements in the system $$H_k^{(A)} F_k^{(A)}(H_1^{(T)}, \ldots, H_{k-1}^{(T)}, H_{k+1}^{(T)}, \ldots, H_K^{(T)}) \quad (3.13\text{-}4)$$

The total Hamiltonian of the system is denoted $H^{(T)}$.

Approximations to the various Hamiltonian's are denoted $\hat{H}_k^{(A)}, \hat{H}^{(T)}$ and $\hat{H}^{(o)}$ for the Tellegen, total, and DE-level Hamiltonians respectively.

System Initialization

Determining the relaxed Pareto optimal point of the system is a process which includes:

Initialization of N decision elements.

Synchronization through companionship of each of the N decision elements with its respective Tellegen agent.

System Operation

Illustration SS shows how decision elements interact with the network, receive queries, and return results. In this example, the distributed system effectively implements an abstract classifier that has no real implementation. The DE's receive sensor data from the network which includes new available information which may benefit classification. The user submits a query that is received by a DE which then returns a result.

Gauge Systems in a Hamiltonian Domain

The time integral of the Lagrangian $L(q,\dot{q})$ is the action $S_L$ defined as $$S_L = \int_{t_1}^{t_2} L(q,\dot{q}) dt$$

where $$\dot{q} = \frac{dq(t)}{dt}.$$

The Lagrangian conditions for stationarity are first that $$\frac{d}{dt} L_{\dot{q}^{(n)}} - L_{q^{(n)}} = 0 \quad (3.14\text{-}1)$$

where n=1, ..., N, $$L_{\dot{q}^{(n)}} = \frac{\partial L}{\partial \dot{q}^{(n)}},$$

and $$L_{q^{(n)}} = \frac{\partial L}{\partial q^{(n)}}.$$

And, secondarily $$\left[\sum_{n'=1}^{N} \ddot{q}^{(n')}\right] L_{\dot{q}^{(n)} \dot{q}^{(n)}} = L_{q^{(n)}} - \dot{q}^{(n)} L_{\dot{q}^{(n)} q^{(n)}} \quad (3.14\text{-}2)$$

where $$\ddot{q}^{(n')} = \frac{d^2 q^{(n')}}{dt^2}$$

and $$L_{\dot{q}^{(n)} \dot{q}^{(n)}} = \frac{\partial^2 L}{\partial (\dot{q}^{(n)})^2}.$$

The generalized accelerations $\dot{q}^{(n)}$ are immediately determined if $L_{\dot{q}^{(n)} \dot{q}^{(n)}}$ is invertible, or equivalently $$\det(L_{\dot{q}^{(n)} \dot{q}^{(n)}}) \neq 0 \quad (3.14\text{-}3)$$

for i=1, ..., N. If for some n, det $(L_{\dot{q}^{(n)} \dot{q}^{(n)}})=0$, the acceleration vector $\dot{q}^{(n)}$ will not be uniquely determined.

The departing point for the Hamiltonian approach is the definition of conjugate momentum $$p_n = L_{\dot{q}^{(n)}} \quad (3.14\text{-}4)$$

where n=1, ..., N. We will see that (3.14-3) is the condition of non-invertibility of $$L_{\dot{q}\dot{q}} = \begin{bmatrix} L_{\dot{q}^{(1)}\dot{q}^{(1)}} & \cdots & L_{\dot{q}^{(1)}\dot{q}^{(N)}} \\ \vdots & \ddots & \vdots \\ L_{\dot{q}^{(N)}\dot{q}^{(1)}} & \cdots & L_{\dot{q}^{(N)}\dot{q}^{(N)}} \end{bmatrix}$$

of the velocities of the functions of the coordinates q and momenta p. In other words, in this case, the momenta defined in (3.14-4) are not all independent. Define the relations that follow from (3.14-4) as $$\phi_m(q,p) \tag{3.14-5}$$

where m=1, ..., M. Write (3.14-4) in vector notation as $$p = L_{\dot{q}}(q,\dot{q}).$$

Then compatibility demands $$\phi_m(q, L_{\dot{q}}(q,\dot{q})) = 0$$

is an identity with m=1, ..., M.

Relations specified in (3.14-5) are called primary constraints. For simplicity let's assume that rank($L_{\dot{q}\dot{q}}$) is constant throughout the phase space, (q, $\dot{q}$), so that (3.14-5) defines a submanifold smoothly embedded in the phase space. This manifold is known as the primary constraint surface. Let $$\text{rank}(L_{\dot{q}\dot{q}}) = N - M' \tag{3.14-6}$$

Then there are M' independent constraints among (3.14-5) and the primary constraint surface is a phase space submanifold of dimension 2N−M'.

We do not assume that all the constraints are linearly independent so that $$M' \leq M. \tag{3.14-7}$$

It follows from (3.14-5) that the inverse transformation from the p's to the q's is multivalued. That is, given q, p that satisfies (3.14-5), the inverse image (q, that satisfies $$p = \left(\frac{\partial L}{\partial \dot{q}}\right)^T \tag{3.14-8}$$

is not unique, since (3.14-8) defines a map from a 2N-dimensional manifold (q,$\dot{q}$) to the smaller (2N−M')-dimensional manifold. Thus the inverse image of the points of (3.14-5) form a manifold of dimension M'.

Conditions on the Constraint Function

There exist many equivalent ways to represent a given surface by means of equations of the form of (3.14-5). For example the surface $p_1$=0 can be represented equivalently by $p_1^2$=0, $\sqrt{|p_1|}$=0, or redundantly by $p_1$=0 and $p_1^2$=0. To use the Hamiltonian formalism, it is necessary to impose some restrictions which the regularity conditions for the constraints.

Regularity Conditions

The (2N−M')-dimensional constraint surface $\phi_m(q,p)$ should be covered of open region: in each region the constraints can be split into independent constraints $$\{\phi_{m'} | m'=1, \ldots, M'\}.$$

Their Jacobian Matrix $$\left\{\frac{\partial \phi_{m'}}{\partial p_n, q^{(n)}}\right\} = \begin{bmatrix} \frac{\partial \phi_1}{\partial p_1, q^{(1)}} & \cdots & \frac{\partial \phi_1}{\partial p_n, q^{(n)}} \\ \vdots & \ddots & \vdots \\ \frac{\partial \phi_{m'}}{\partial p_1, q^{(1)}} & \cdots & \frac{\partial \phi_{m'}}{\partial p_n, q^{(n)}} \end{bmatrix}$$

with m'=1, ..., M' and n=1, ..., N, is of rank M'.

The dependent constraints $\phi_m$, m=M'+1, ..., M of the other $\phi_{m'}$=0 ⇒ $\phi_m$=0.

Alternatively the condition on the Jacobian.

1. The function $\phi_{m'}$ can be taken locally as the first M' coordinates of a new regular system in the vicinity of the constraint surface or the differentials d$\phi_1$, ..., d$\phi_{M'}$ are locally linearly independent:

$$d\phi_1 \wedge \ldots \wedge d\phi_{M'} \neq 0 \tag{3.14-9}$$

2. The variations $\delta\phi_{m'}$ are of order $\epsilon$ for arbitrary variations $\delta q^{(i)}$, $\delta p_i$ of order $\epsilon$ (Dirac's approach).

Theorem 3.14.1. If a smooth, phase space function G vanishes on $\{\phi_m=0\}$ then $$G = \sum_{m=1}^{M} g^{(m)} \phi_m \tag{3.14-10}$$

Proof: (Local Proof).

Set $\phi_{m'}$, m'=1, ..., M' as coordinates ($y_m$, $x_\alpha$) with $y_{m'}=\phi_{m'}$. In these coordinates G(0, x)=0 and $$G(y, x) = \int_0^1 \frac{d}{dt} G(ty, x) \, dt \tag{3.14-11}$$

$$= \sum_{m'=1}^{M'} y_{m'} \int_0^1 \frac{\partial}{\partial y_{m'}} G(ty, x) \, dt$$

$$= \sum_{m'=1}^{M'} g^{(m')}(y, x) \Phi_{m'}(y, x)$$

with $$g^{(m')}(y, x) = \int_0^1 \frac{\partial}{\partial y_{m'}} G(ty, x) \, dt.$$

Theorem 3.14.2.

If the sum $\Sigma(\lambda^{(n)} \delta q^{(n)} + \mu_n \delta p_n)$=0 for arbitrary variations $\delta q^{(i)}$, $\delta p_i$ tangent to the constraint surface $\{\phi_m(q,p)=0 | m=1, \ldots, M\}$, then $$\lambda^{(n)} = \sum_{m=1}^{M} u^{(m)} \frac{\partial \phi_m}{\partial q^{(n)}} \tag{3.14-12}$$

$$\mu_n = \sum_{m=1}^{M} u^{(m)} \frac{\partial \phi_m}{\partial p_n} \tag{3.14-13}$$

Proof.

The dimension of $\{\phi_m\}$ is 2N−M'. Thus the variations at a point (p,q) forms a 2N−M' dimensional space $$\sum_{n=1}^{N} (\lambda^{(n)} \delta q^{(n)} + \mu_n \delta p_n) = 0 \tag{3.14-14}$$

By the singularity assumption, there exists exactly M' solutions to (3.14-14). Clearly, the gradients $$\left\{\frac{\partial \phi_{m'}}{\partial q^{(n)}}\right\}$$

and $$\left\{\frac{\partial \phi_{m'}}{\partial p_n}\right\}$$

are linearly independent. They are the basis for solutions to (3.14-14).

Note that in the presence of redundant constraints, the functions $u^{(m)}$ exist but are not unique.

Canonical Hamiltonian

The Hamiltonian in canonical coordinates is $$H(q, p) = \sum_{n=1}^{N} \dot{q}^{(n)} p_n - L(q, \dot{q}) \quad (3.14\text{-}15)$$

The rate $\dot{q}$ enters through the combination through conjugate momenta defined for each coordinate $$p_n(q,\dot{q}) = L_{\dot{q}^{(n)}}(q,\dot{q}) \quad (3.14\text{-}16)$$

This remarkable property is essential for the Hamiltonian approach. It is verified by evaluating the change $\delta H$ involved by arbitrary independent variations of position and velocities.

$$\delta H = \sum_{n=1}^{N} (\dot{q}^{(n)} \delta p_n + \delta \dot{q}^{(n)} p_n) - \delta L \quad (3.14\text{-}17)$$

$$= \sum_{n=1}^{N} (\dot{q}^{(n)} \delta p_n + \delta \dot{q}^{(n)} p_n) - \sum_{n=1}^{N} \left(L_{q^{(n)}} \delta q^{(n)} + L_{\dot{q}^{(n)}} \delta \dot{q}^{(n)}\right)$$

Utilizing (3.14-16) in (3.14-17) yields $$\delta H = \sum_{n=1}^{N} \left(\dot{q}^{(n)} \delta p_n - L_{q^{(n)}} \delta q^{(n)}\right) \quad (3.14\text{-}18)$$

The Hamiltonian defined by (3.14-15) is not unique as a function of p, q. This can be inferred from (3.14-18) by noticing that $\{\delta p_n | n=1, \ldots, N\}$ are not all independent. They are restricted to preserve the primary constraints $\phi_m \approx 0$ which are identities when the p's are expressed as functions of q's via (3.14-16).

Using the definition of the differential in several variables applied to $\delta H = \delta H(\{q^{(n)}\}, \{p_n\})$, (3.14-18) can be rewritten $$\sum_{n=1}^{N} \left(\frac{\partial H}{\partial q^{(n)}} \delta q^{(n)} + \frac{\partial H}{\partial p_n} \delta p_n\right) = \sum_{n=1}^{N} \left(\dot{q}^{(n)} \delta p_n - \delta q^{(n)} \frac{\partial L}{\partial q^{(n)}}\right) \quad (3.14\text{-}19)$$

or $$\sum_{n=1}^{N} \left(\frac{\partial H}{\partial q^{(n)}} + \frac{\partial L}{\partial q^{(n)}}\right) \delta q^{(n)} + \sum_{n=1}^{N} \left(\frac{\partial H}{\partial p_n} - \dot{q}^{(n)}\right) \delta p_n = 0$$

From theorem 2 we then conclude for each n that.

$$\frac{\partial H}{\partial q^{(n)}} + \frac{\partial L}{\partial q^{(n)}} = \sum_{m=1}^{M} u^{(m)} \frac{\partial \phi_m}{\partial q^{(n)}} \quad (3.14\text{-}20)$$

and $$\frac{\partial H}{\partial p_n} - \dot{q}^{(n)} = \sum_{m=1}^{M} u^{(m)} \frac{\partial \phi_m}{\partial p_n}.$$

So for each n:

$$\dot{q}^{(n)} = \frac{\partial H}{\partial p_n} + \sum_{m=1}^{M} u^{(m)} \frac{\partial \phi_m}{\partial p_n}, n = 1, \ldots, N \quad (3.14\text{-}21)$$

and $$-\frac{\partial L}{\partial q^{(n)}} = \frac{\partial H}{\partial q^{(n)}} + \sum_{m=1}^{M} u^{(m)} \frac{\partial \phi_m}{\partial q^{(n)}}, n = 1, \ldots, N. \quad (3.14\text{-}22)$$

Note that if the constraints are independent, the vectors $$\sum_{n=1}^{N} \frac{\partial \phi_m}{\partial p_n},$$

$m=1, \ldots, M$ are also independent because of the regularity conditions (this is proved later). Hence no two sets of $\{u^{(m)} | m=1, \ldots, M\}$ can yield the same velocities via (3.14-21).

Thus, using $$\dot{q}^{(n)} = \frac{\partial H}{\partial p_n} + \sum_{m=1}^{M} u^{(m)}(q, \dot{q}) \frac{\partial \phi_m}{\partial p_n}(q, p(q, \dot{q}))$$

we can find $u^{(m)}(p, \dot{q})$. If we define the transformation from $(q,\dot{q})$ to the manifold $\{\phi_m(q,p)=0 | m=1, \ldots, M\}$, from q, $\dot{q}$, $u \rightarrow q, p, u$ by $q = q, n = 1, \ldots, N$ $p_n = L_{\dot{q}^{(n)}}(q, \dot{q}), n = 1, \ldots N - M'$ $u^{(m)} = u^{(m)}(q, \dot{q}), m = 1, \ldots, M'$ We see that this transformation is invertible since one has from q, p, $u \rightarrow q, \dot{q}, u$ $q = q$ $$\dot{q}^{(n)} = \frac{\partial H}{\partial p_n} + \sum_{m=1}^{M} u^{(m)} \frac{\partial \phi_m}{\partial p_n}$$

$\phi_m(q, p) = 0$

Thus invertibility of the Legendre transformation when $\det(L_{\dot{q}\dot{q}}) = 0$ can be regained at the prices of adding extra variables.

Action Principle of the Hamiltonian Form

With (3.14-21) and (3.14-22) we can rewrite (3.14-1) in the equivalent Hamiltonian form $$\dot{q}^{(n)} = \frac{\partial H}{\partial p_n} + \sum_{m=1}^{M} u^{(m)} \frac{\partial \phi_m}{\partial p_n} \quad (3.14\text{-}23)$$

-continued $$\dot{p}^{(n)} = -\frac{\partial H}{\partial p_n} - \sum_{m=1}^{M} u^{(m)} \frac{\partial \phi_m}{\partial p_n}$$

$$\phi_m(q, p) = 0, m = 1, \ldots, M'$$

The Hamiltonian Equations (3.14-23) can be derived from the following variational principle.

$$\delta \int_{t_1}^{t_2} \left[ \sum_{n=1}^{N} \dot{q}^{(n)} p_n - H - \sum_{m=1}^{M} u^{(m)} \phi_m \right] = 0 \quad (3.14\text{-}24)$$

for arbitrary variations of $\delta q^{(n)}$, $\delta p_n$, and $\delta u^{(m)}$ subject to $$\delta q(t_1) = \delta q(t_2) = 0$$

where the $u^{(m)}$ appear now as Lagrange multipliers enforcing the primary constraints $$\phi_m(q,p) = 0, m=1, \ldots, M.$$

Let F(p,q) be an arbitrary function of the canonical variables, then $$\frac{dF}{dt} = \sum_{n=1}^{N} \frac{\partial F}{\partial q^{(n)}} \dot{q}_n + \sum_{n=1}^{N} \frac{\partial F}{\partial p_n} \dot{p}_n$$

$$= \sum_{n=1}^{N} \frac{\partial F}{\partial q^{(n)}} \left[ \frac{\partial H}{\partial p_n} + \sum_{m=1}^{M} u^{(m)} \frac{\partial \phi_m}{\partial p_n} \right] + \sum_{n=1}^{N} \frac{\partial F}{\partial p_n} \left[ -\frac{\partial H}{\partial p_n} - \sum_{m=1}^{M} u^{(m)} \frac{\partial \phi_m}{\partial p_n} \right]$$

$$= [F, H] + \sum_{m=1}^{M} u^{(m)} [F, \phi_m]$$

(3.14-25)

The equation (3.14-25) introduces the new binary operator $[\cdot,\cdot]$ which is the Poisson bracket and has the form $$[F, G] = \sum_{n=1}^{N} \left[ \frac{\partial F}{\partial q^{(n)}} \frac{\partial G}{\partial p_n} + \frac{\partial F}{\partial p_n} \frac{\partial G}{\partial q^{(n)}} \right] \quad (3.14\text{-}26)$$

$$= \sum_{n=1}^{N} \left[ F_{q^{(n)}} G_{p_n} + F_{p_n} G_{q^{(n)}} \right]$$

Secondary Constraints

The basic consistency condition is that the primary constraints be preserved in time. So for $$F(p,q) = \phi_m(q,p)$$

we should have that $\dot{\phi}_m = 0$. $\{\phi_m(q,p) = 0\}$. So this means $$[\phi_m, H] + \sum_{m'=1}^{M'} u^{(m')} [\phi_m, \phi_{m'}] = 0 \quad (3.14\text{-}27)$$

This equation can either reduce to a relation independent of the $u^{(m')}$, or, it may impose a restriction on the u's.

$$U = -\{[\phi_m, \phi_{m'}]\}[\phi_{m'}, H](q,p) \quad (3.14\text{-}28)$$

In the case (3.14-27) is independent of the u's (3.14-27) is called a secondary constraint. The fundamental difference of secondary constraints with respect to primary constraints is that primary constraints is that primary constraints are the consequence of the definition (3.14-8) while secondary constraints depend on the dynamics.

If X(q,p)=0 is an external constraint, we most impose a compatibility condition $$[X, H] + \sum_{m=1}^{M'} u^{(m)} [X, \phi_m] = 0 \quad (3.14\text{-}29)$$

Next we need to test whether this constraint:

$$\Phi(p, q) = [X, H] + \sum_{m=1}^{M'} u^{(m)} [X, \phi_m] = 0 \quad (3.14\text{-}30)$$
$$\quad (3.14\text{-}31)$$

Implies new secondary constraints or whether it only restricts the u's. After the process is finished we are left with a number of secondary constraints which will be denoted by $$\phi_k = 0, k = M+1, \ldots, M+K$$

where K is the total number of secondary constraints. In general, it will be useful to denote all the constraints (primary and secondary) in a uniform way as $$\phi_j(q,p) = 0, j=1, \ldots, M+K=J \quad (3.14\text{-}32)$$

We make the same regularity assumptions on the full set of constraints.

Weak and Strong Equations

Equation (3.14-32) can be written as $$\phi_j(\cdot) \approx 0 \quad (3.14\text{-}33)$$

To emphasize, the quantity $\phi_j$ is numerically restricted to be zero but does not vanish throughout the space. What this is means is that $\phi_j$ has non-zero Poisson brackets with the canonical variables.

Let F, G be functions that coincide on the manifold $\{\phi_j \approx 0 | j=1, \ldots, J\}$ are said the be weakly equal and denoted by $F \approx G$. On the other hand, an equation that holds throughout the entire phase space and not just on the submanifold $\{\phi_j \approx 0\}$ is called strong. Hence, by theorem 1

$$F \approx G \Leftrightarrow F - G = \sum_{j=1}^{J} c^{(j)}(p, q) \phi_j \quad (3.14\text{-}34)$$

Restrictions on the Lagrange Multipliers

Assume that we have found a complete set of constraints $$\{\phi_j \approx 0 \mid j = 1, \ldots, J\} \quad (3.14\text{-}35)$$

$$[\phi_j, H] + \sum_{m=1}^{M} u^{(m)} [\phi_j, \phi_m] \approx 0$$

We consider (3.14-36) as a set of non-homogeneous linear equations with M<J unknowns with coefficients that are functions of the q's and p's.

The general solution of (3.14-36) for each j is of the form $$u^{(m)} = U^{(m)} + V^{(m)}, m=1, \ldots, M \quad (3.14\text{-}37)$$

with $V^{(m)}$ the solution of the homogeneous equation $$\sum_{m=1}^{M} V^{(m)}[\phi_j, \phi_m] \approx 0 \quad (3.14\text{-}38)$$

The most general solution of (3.14-38) is a linear combination of linearly independent solutions of $V_\alpha^{(m)}$ where $\alpha = 1, \ldots, A$ with $A \leq M$. Under the assumption that the matrix $$\begin{bmatrix} [\phi_1, \phi_1] & \cdots & [\phi_1, \phi_M] \\ \vdots & \ddots & \vdots \\ [\phi_J, \phi_1] & \cdots & [\phi_J, \phi_M] \end{bmatrix} \quad (3.14\text{-}39)$$

is of constant rank, the number of independent solutions A is the same for all p, q. Thus the general solution to (3.14-36) can be written as $$u^{(m)} \approx U^{(m)} + \sum_{\alpha=1}^{A} v^{(\alpha)} V_\alpha^{(m)}, \quad (3.14\text{-}40)$$

$$m = 1, \ldots, M$$

Irreducible and Reducible Cases

If the equations $\{\phi_j = 0 | j = 1, \ldots, J\}$ are not independent, one says that the constraints are reducible. The system is irreducible when the constraints are independent. However the separation of constraints into dependent and independent ones might be difficult to perform. It also may disturb invariance properties under some important symmetry. In some cases it may be impossible to separate irreducible from irreducible contexts. Reducible cases arise for example when the dynamical coordinates include p-form gauge fields.

Any irreducible set of constraints can always be replaced by a reducible set by introducing constraints of the ones already at hand. The formalism should be invariant under such replacements.

Total Hamiltonian

We now discuss details of the dynamic equation (3.14-25)

$$\dot{F} \approx \left[F, H' + \sum_{\alpha=1}^{A} v^{(\alpha)} \phi_\alpha\right] \quad (3.14\text{-}41)$$

where from (3.14-40)

$$H' = H + \sum_{m=1}^{M} U^{(m)} \phi_m \quad (3.14\text{-}42)$$

and $$\phi_\alpha = \sum_{m=1}^{M} V_\alpha^{(m)} \phi_m,$$

$$\alpha = 1, \ldots, A$$

This is the result of theorem 3 (see below).

Theorem 3.

$$\left[F, \sum_{m=1}^{M} U^{(m)} \phi_m\right] \simeq \sum_{m=1}^{M} U^{(m)}[F, \phi_m] \quad (3.14\text{-}43)$$

$$\left[F, \sum_{\alpha=1}^{A} V_\alpha^{(m)} \phi_m\right] \simeq \sum_{\alpha=1}^{A} V_\alpha^{(m)}[F, \phi_m] \quad (3.14\text{-}44)$$

Proof.

$$\left[F, \sum_{m=1}^{M} U^{(m)} \phi_m\right] = \sum_{i=1}^{N} \left\{ \frac{\partial F}{\partial q^{(i)}} \frac{\partial}{\partial p_i} \sum_{m=1}^{M} U^{(m)} \phi_m - \frac{\partial F}{\partial p_i} \frac{\partial}{\partial q^{(i)}} \sum_{m=1}^{M} U^{(m)} \phi_m \right\}$$

$$= \sum_{i=1}^{N} \left\{ \frac{\partial F}{\partial q^{(i)}} \left[ \sum_{m=1}^{M} \frac{\partial U^{(m)}}{\partial p_i} \phi_m + \sum_{m=1}^{M} U^{(m)} \frac{\partial \phi_m}{\partial p_i} \right] \right\} -$$

$$\sum_{i=1}^{N} \left\{ \frac{\partial F}{\partial p_i} \left[ \sum_{m=1}^{M} \frac{\partial U^{(m)}}{\partial q^{(i)}} \phi_m + \sum_{m=1}^{M} U^{(m)} \frac{\partial \phi_m}{\partial q^{(i)}} \right] \right\}$$

$$= \sum_{m=1}^{M} \{[F, U^{(m)}] \phi_m + U^{(m)}[F, \phi_m]\}$$

So $$\left[F, \sum_{m=1}^{M} U^{(m)} \phi_m\right] - \sum_{m=1}^{M} U^{(m)}[F, \phi_m] = \sum_{m=1}^{M} [F, U^{(m)}] \phi_m \quad (3.14\text{-}45)$$

and from (3.14-34) in (3.14-45), (3.14-43) follows. By a similar process we show (3.14-44). We now prove the validity of (3.14-41).

Theorem 4.

Let F(q,p) be a regular function, then F(p,q) propagates in time according to the approximate equation (3.14-41).

Proof.

From (3.14-25), $$\frac{dF}{dt} = [F, H] + \sum_{m=1}^{M} u^{(m)}[F, \phi_m]. \quad (3.14\text{-}46)$$

From (3.14-40) into (3.14-46) we obtain, $$\frac{dF}{dt} \approx [F, H] + \sum_{m=1}^{M} \left\{ U^{(m)} + \sum_{\alpha=1}^{A} v^{(\alpha)} V_\alpha^{(m)} \right\} [F, \phi_m] \quad (3.14\text{-}47)$$

or $$\frac{dF}{dt} \approx [F, H] + \sum_{m=1}^{M} U^{(m)}[F, \phi_m] + \sum_{m=1}^{M} \sum_{\alpha=1}^{A} v^{(\alpha)} V_\alpha^{(m)}[F, \phi_m]$$

Thus from (3.14-43) and (3.14-44) of theorem 3, we get $$\frac{dF}{dt} \approx [F, H] + \sum_{m=1}^{M} [F, U^{(m)} \phi_m] + \sum_{a=1}^{A} v^{(a)} \left[F, \sum_{m=1}^{M} V_a^{(m)} \phi_m\right] \quad (3.14\text{-}48)$$

$$\approx \left[F, H + \sum_{m=1}^{M} U^{(m)} \phi_m + \sum_{a=1}^{A} v^{(a)} \sum_{m=1}^{M} V_a^{(m)} \phi_m\right]$$

$$\approx \left[F, H' + \sum_{m=1}^{M} U^{(m)} \phi_m + \sum_{a=1}^{A} v^{(a)} \phi_a\right]$$

with $$H' = H + \sum_{m=1}^{M} U^{(m)} \phi_m \quad (3.14\text{-}49)$$

$$\phi_a = \sum_{m=1}^{M} V_a^{(m)} \phi_m \quad (3.14\text{-}50)$$

Now define $$H_T = H' + \sum_{a=1}^{A} v^{(a)} \phi_a. \quad (3.14\text{-}51)$$

So we obtain $$\frac{dF}{dt} \approx [F, H_T] \quad (3.14\text{-}52)$$

First and Second Class Functions

The distinction between primary and secondary constraints is of little importance.

We now consider a fundamental classification. It depends on the concept of first class and second class functions.

Definition 1.

A function F(q,p) is said to be first class if its Poisson bracket with every constraint vanishes weakly, $[F, \phi_j] \approx 0$, j=1, ..., J. A function of the canonical variables that is not first class is called second class. Thus F is second class if $[F, \phi_k] \neq 0$ for at least one k, k=1, ..., M.

Theorem 5.

If F and G are first class functions, then their Poisson bracket is also a first class function.

Proof:

By Hypothesis, $$[F, \phi_j] = \sum_{k=1}^{M} f_j^{(k)} \phi_k \quad (3.14\text{-}53)$$

$$[G, \phi_j] = \sum_{l=1}^{M} g_j^{(l)} \phi_l \quad (3.14\text{-}54)$$

Applying the Jacobi identity, we get $$[[F, G], \phi_j] = [F, [G, \phi_j]] - [G, [F, \phi_j]]$$

$$= \left[F, \sum_{l=1}^{M} g_j^{(l)} \phi_l\right] - \left[G, \sum_{k=1}^{M} f_j^{(k)} \phi_k\right]$$

$$= \sum_{i} \left\{\frac{\partial F}{\partial q^{(i)}} \frac{\partial}{\partial p_i} \sum_{l=1}^{M} g_j^{(l)} \phi_l - \frac{\partial F}{\partial p_i} \frac{\partial}{\partial q^{(i)}} \sum_{l=1}^{M} g_j^{(l)} \phi_l\right\} -$$

-continued $$\sum_{n} \left\{\frac{\partial G}{\partial q^{(n)}} \frac{\partial}{\partial p_n} \sum_{k=1}^{M} f_j^{(k)} \phi_k - \frac{\partial G}{\partial p_n} \frac{\partial}{\partial q^{(n)}} \sum_{k=1}^{M} f_j^{(k)} \phi_k\right\}$$

$$= \sum_{i} \left\{\frac{\partial F}{\partial q^{(i)}} \sum_{l=1}^{M} \left\{\frac{\partial g_j^{(l)}}{\partial p_i} \phi_l + g_j^{(l)} \frac{\partial \phi_l}{\partial p_i}\right\}\right\} -$$

$$\frac{\partial F}{\partial p_i} \sum_{l=1}^{M} \left\{\frac{\partial g_j^{(l)}}{\partial q^{(i)}} \phi_l + g_j^{(l)} \frac{\partial \phi_l}{\partial q^{(i)}}\right\} -$$

$$\sum_{n} \left\{\frac{\partial G}{\partial q^{(n)}} \sum_{k=1}^{M} \left\{\frac{\partial f_j^{(k)}}{\partial p_n} \phi_k + f_j^{(k)} \frac{\partial \phi_k}{\partial p_n}\right\}\right\} -$$

$$\frac{\partial G}{\partial p_n} \sum_{k=1}^{M} \left\{\frac{\partial f_j^{(k)}}{\partial q^{(n)}} \phi_k + f_j^{(k)} \frac{\partial \phi_k}{\partial q^{(n)}}\right\}$$

$$= \sum_{l=1}^{M} \left\{\phi_l \sum_{i} \left\{\frac{\partial F}{\partial q^{(i)}} \frac{\partial g_j^{(l)}}{\partial p_i} - \frac{\partial F}{\partial p_i} \frac{\partial g_j^{(l)}}{\partial q^{(i)}}\right\} + \right.$$

$$g_j^{(l)} \sum_{i} \left\{\frac{\partial F}{\partial q^{(i)}} \frac{\partial \phi_l}{\partial q^{(i)}} - \frac{\partial F}{\partial p_i} \frac{\partial \phi_l}{\partial p_i}\right\}\right\} -$$

$$\sum_{k=1}^{M} \left\{\phi_k \sum_{n} \left\{\frac{\partial G}{\partial q^{(n)}} \frac{\partial f_j^{(k)}}{\partial p_n} - \frac{\partial G}{\partial p_n} \frac{\partial f_j^{(k)}}{\partial q^{(n)}}\right\} + \right.$$

$$f_j^{(k)} \sum_{n} \left\{\frac{\partial G}{\partial q^{(n)}} \frac{\partial \phi_k}{\partial p_n} - \frac{\partial G}{\partial p_n} \frac{\partial \phi_k}{\partial q^{(n)}}\right\}\right\}$$

$$= \sum_{l=1}^{M} \{\phi_l [F, g_j^{(l)}] + g_j^{(l)} [F, \phi_l]\} -$$

$$\sum_{k=1}^{M} \{\phi_k [G, f_j^{(k)}] + f_j^{(k)} [G, \phi_k]\}$$

$$= \sum_{l=1}^{M} [F, g_j^{(l)}] \phi_l - \sum_{k=1}^{M} [G, f_j^{(k)}] \phi_k +$$

$$\sum_{l'=1}^{M} \left\{\sum_{l=1}^{M} g_j^{(l)} f_l^{(l')}\right\} \phi_{l'} - \sum_{k'=1}^{M} \left\{\sum_{k=1}^{M} f_j^{(k)} g_k^{k'}\right\} \phi_{k'}$$

$$\approx 0$$

We now use theorem 5 to show the following.

Theorem 6.

H' defined by (3.14-49) and $\phi_a$ defined by (3.14-50) are first class functions.

Proof:

This follows directly from (3.14-36) and (3.14-38).

We learn from theorem 6 that the total Hamiltonian defined by (3.14-51) is the sum of the first class Hamiltonian H' and the first class primary constraints $\phi_a$ multiplied by arbitrary coefficients.

First Class Constraints as Generators of Gauge Transformations

Gauge transformations are transformations that do not change the physical state.

The presence of arbitrary functions of time $v^{(a)}$, $a=1, \ldots, A$ in the total Hamiltonian, $H_T$ (see (3.14-51)) imply that not all the q's and p's are observable given a set of q's and p's where the state of the physical system is uniquely determined. However the converse is not true: there is more than one set of values of the canonical variables that defines a state. To illustrate this, we see that if we give an initial set of values of physical state at time t, we expect the equations of motion to fully determine the state at other times. Thus any ambiguity in the value of the canonical variables at $t_2 \neq t_1$ should be irrelevant from the physical point of view.

A Derivation Example

We propose here an alternate formulation of Dirac's formalism.

Primary Constraints

Recall that the momenta, canonically conjugate to the generalized "coordinates" $q^{(j)}$, $j=1, \ldots, N$ is given by $$p_j = \frac{\partial L(q, \dot{q})}{\partial \dot{q}^{(j)}}, \quad (E\text{-}1)$$
$$j = 1, \ldots, N.$$

For non-singular systems the equations allows us to express $\dot{q}^{(j)}$, $j=1, \ldots, N$ in terms of the canonical variables, $$\dot{q}^{(i)} = f_i(q,p), i=1, \ldots, N \quad (E\text{-}2)$$

By performing a Legendre transformation $$H_c(p, q) = \sum_{i=1}^{N} p_i f(q, p) + L(q, f(p, q)) \quad$$

We obtain the Hamiltonian of the system H. And from this function we obtain the standard equations of motion of the system.

$$\dot{q} = \frac{\partial H_c}{\partial p} \quad (E\text{-}3)$$
$$\dot{p} = -\frac{\partial H_c}{\partial q}$$

For (E-2) to be well-defined we need to have the Hessian W of satisfy $$\det W \neq 0 \quad (E\text{-}4)$$

In this case the accelerations $\ddot{q}^{(i)}$ are uniquely determined by the $q^{(j)}$ and $\dot{q}^{(i)}$.

When $\det W \neq 0$, the Hamiltonian equations of motion do not take the standard form, and we speak of a singular Lagrangian. For illustration purposes, consider a Lagrangian of the form $$L(q, \dot{q}) = \frac{1}{2} \sum_{i=1}^{N} \sum_{j=1}^{N} W_{ij}(q) \dot{q}^{(i)} \dot{q}^{(j)} + \sum_{n=1}^{N} \eta_i(q) \dot{q}^{(i)} - V(q) \quad (E\text{-}5)$$

with W a symmetric matrix. From (E-1), the canonical momentum for (E-5) is given by $$p_i = \frac{1}{2} \sum_{j=1}^{N} W_{ij}(q) \dot{q}^{(j)} + \eta_i(q), \quad (E\text{-}6)$$
$$i = 1, \ldots, n.$$

If W is singular of rank $R_w$, then it possesses $N-R_W$ eigenvectors with corresponding zero eigenvalues. Then for eigenvectors $v_j^{(\alpha)}$ $$\sum_{j=1}^{N} W_{ij}(q) v_j^{(\alpha)}(q) = 0,$$
$$\alpha = 1, \ldots, N - R_W$$

So pre-multiplying (E-6) by $v_j^{(\alpha)}$ and summing over i we get $$\sum_{i=1}^{N} v_i^{(\alpha)}(q) p_i = \sum_{i=1}^{N} \left[ \sum_{j=1}^{N} (v_i^{(\alpha)}(q) W_{ij}(q) \dot{q}^{(j)}) + v_i^{(\alpha)}(q) \eta_i(q) \right]$$
$$= \sum_{i=1}^{N} v_i^{(\alpha)}(q) \eta_i(q), \quad \alpha = 1, \ldots, N - R_W$$

So $$\sum_{i=1}^{N} v_i^{(\alpha)}(q)(p_i - \eta_i(q)) = 0, \quad (E\text{-}7)$$
$$\alpha = 1, \ldots, N - R_W.$$

Let $\{p_\alpha\}$, $\alpha=1, \ldots, N-R_W$, denote the linearly dependent elements of p. Let $\{p_a\}$, $a=1, \ldots, R_a$ be the momenta satisfying (E-1). Then the constraint equations are of the form $$\sum_{\beta=1}^{N-R_W} M_{\alpha\beta}(q) p_\beta - F_\alpha(q, \{p_a\}) = 0, \quad (E\text{-}8)$$
$$\alpha = 1, \ldots, N - R_W$$
$$M_{\alpha\beta}(q) = v_\beta^{(\alpha)}$$

and $$F_\alpha(q, \{p_\beta\}) = \sum_{i=1}^{N} v_i^{(\alpha)}(q) \eta_i(q) + \sum_{b=1}^{R_W} v_b^{(\alpha)}(q) p_b \quad (E\text{-}9)$$

The matrix $\{M_{\alpha\beta}\}$ is necessarily invertible because otherwise M would possess eigenvectors with zero eigenvalues, implying existence of additional constraints.

Note that (E-8) can be written as $$p_\alpha - g_\alpha(q, \{p_a\}) = 0, \quad (E\text{-}10)$$
$$\alpha = 1, \ldots, N - R_W$$

with $$g_\alpha(q, \{p_a\}) = \sum_{\beta=1}^{N-R_W} M_{\alpha\beta}^{-1} F_\beta(q, \{p_a\})$$

with $\dim\{p_\alpha\} = R_W$. So we can define, $$\phi_\alpha(q,p) = p_\alpha - g_\alpha(q, \{p_a\}) = 0, \alpha = 1, \ldots, N-R_W (E\text{-}11)$$

In Dirac's terminology, constraints of the form of (E-11) are referred to as primary constraints. Although the derivation above is based on a Lagrangian, quadratic in the velocity terms, it is generally valid for Lagrangians which depend on q and $\dot{q}$ but not on higher derivatives.

Note: Primary constraints follow exclusively from the definition of canonical momenta.

The derivation above is valid for general Lagrangians and their Hessian. Let's assume $\{W_{ij}(q,\dot{q})\}$ is the Hessian of a given Lagrangian L. Let $\{W_{ab}|a, b=1, \ldots, R_W\}$ be the largest sub-matrix of $\{W_{ij}\}$ with suitable rearrangement if necessary. We then solve (E-1) for $R_W$ velocities $\dot{q}^{(a)}$ in terms of $\{q^{(i)}|i=1, \ldots, n\}$, $\{p_a|a=1, \ldots, R_W\}$ and $\{q^{(\alpha)}|\alpha=1, \ldots, N-R_W\}$. That is $$\dot{q}^{(a)} = f_a(q, \{p_b\}, \{\dot{q}^{(\beta)}\}) \quad \text{(E-12)}$$

with a, b=1, ..., $R_W$ and $\beta = R_W+1$, ..., N.

Inserting these relations into (E-1), we get relations of the form $$p_j = h_j(q, \{p_a\}, \{\dot{q}^{(\alpha)}\}) \quad \text{(E-13)}$$

with a, j=1, ..., $R_W$ and $\alpha = R_W+1$, ..., N. This relation reduces to an identity by construction. The remaining equations are of the form $$p_\alpha = h_\alpha(q, \{p_a\}, \{\dot{q}^{(\beta)}\}) \quad \text{(E-14)}$$

with $\alpha=1, \ldots, N-R_W$. However, the right hand side cannot depend on $\{\dot{q}^{(\beta)}\}$ since otherwise we could express more velocities in terms of the momenta of the coordinates of the momenta and the remaining velocities.

Hamiltonian Equations of Motion for Constrained Systems

Theorem 3.16.1.

In the space $\Gamma_p$ define by $\Gamma_p = \{\phi_\alpha(p,q) | \alpha=1, \ldots, N-R_w\}$ where $\phi_\alpha$ is defined as (E-11). The Hamiltonian is only a function of $\{Q^{(I)} | I=1, \ldots, N\}$ and momenta $\{P_a | a=1, \ldots, R_w\}$ and does not depend on $\{\dot{q}^{(\alpha)} | \alpha=1, \ldots, N-R_W\}$ Proof.

On $\Gamma_p$ the Hamiltonian is given by $$H_o = H_c|_{\Gamma_p} = \sum_{a=1}^{R_W} p_a f_a - \sum_{a=1}^{N-R_W} g_a \dot{q}^{(a)} - L(q, \{f_b\}, \{\dot{q}^{(\beta)}\}) \quad \text{(E--15)}$$

where $f_a$, $a=1, \ldots, N-R_W$ is given by (E-12) and $g_\alpha$, $\alpha=1, \ldots, R_W$ is given by (E-10). We want to show that $H_o$ does not depend on $\dot{q}^{(\beta)}$, $\beta=1, \ldots, N-R_W$. We compute $$\frac{\partial H_o}{\partial \dot{q}^{(\beta)}} = \sum_{a=1}^{R_W} p_a \frac{\partial f_a}{\partial \dot{q}^{(\beta)}} - g_\beta - \quad \text{(E--16)}$$

$$\sum_{a=1}^{R_W} \frac{\partial L}{\partial \dot{q}^{(a)}}\bigg|_{\dot{q}^{(a)}=f_a} \frac{\partial f_a}{\partial \dot{q}^{(\beta)}} - \frac{\partial L}{\partial \dot{q}^{(\beta)}}\bigg|_{\dot{q}^{(a)}=f_a}$$

$$= \sum_{a=1}^{R_W} \left(p_a - \frac{\partial L}{\partial \dot{q}^{(a)}}\bigg|_{\dot{q}^{(a)}=f_a}\right) \frac{\partial f_a}{\partial \dot{q}^{(\beta)}} - g_\beta - \frac{\partial L}{\partial \dot{q}^{(\beta)}}\bigg|_{\dot{q}^{(a)}=f_a}$$

Since by definition $$p_a = \frac{\partial L}{\partial \dot{q}^{(a)}},$$

$$a = 1, \ldots, R_W$$

And from (E-11)

$$g_\beta = p_\beta = \frac{\partial L}{\partial \dot{q}^{(\beta)}}\bigg|_{\dot{q}_a = f_a}.$$

So $$\frac{\partial H_o}{\partial \dot{q}^{(\beta)}} = 0, \quad \text{(E--17)}$$

$$\beta = 1, \ldots, N - R_W.$$

and therefore $$H_o(q, \{p_a\}, \{\dot{q}^{(\alpha)}\}) = H_o(q, \{p_a\}).$$

Theorem 3.16.2.

In the presence of primary constraints (E-11), the Hamilton equations of motion are given by $$\dot{q}^{(i)} = \frac{\partial H_o}{\partial p_i} + \sum_{\beta=1}^{N} \dot{q}^{(\beta)} \frac{\partial \phi_\beta}{\partial p_i}, \quad \text{(E--18)}$$

$$i = 1, \ldots, N$$

$$\dot{p}_i = -\frac{\partial H_o}{\partial q^{(i)}} + \sum_{\beta=1}^{n} \dot{q}^{(\beta)} \frac{\partial \phi_\beta}{\partial q^{(i)}},$$

$$i = 1, \ldots, N$$

$$\phi_\alpha(p, q) = 0,$$

$$\alpha = 1, \ldots, N - R_W$$

where $\dot{q}^{(\beta)}$ are a priori underdetermined velocities.

Proof: From (E-15) we obtain and the application of Theorem 3.16.1

$$\frac{\partial H_o}{\partial p_a} = f_a + \sum_{b=1}^{R_W} p_b \frac{\partial f_b}{\partial p_a} + \sum_{\beta=1}^{N-R_W} \frac{\partial g_\beta}{\partial p_a} \dot{q}^{(\beta)} - \sum_{b=1}^{R_W} \frac{\partial L}{\partial \dot{q}^{(b)}} \frac{\partial f_b}{\partial p_a} \quad \text{(E--19)}$$

$$= \dot{q}^{(a)} + \sum_{b=1}^{R_W} \left(p_b - \frac{\partial L}{\partial \dot{q}^{(b)}}\right) \frac{\partial f_b}{\partial p_a} + \sum_{\beta=1}^{N-R_W} \frac{\partial g_\beta}{\partial p_a} \dot{q}^{(\beta)}$$

$$= \dot{q}^{(a)} + \sum_{\beta=1}^{N-R_W} \frac{\partial g_\beta}{\partial p_a} \dot{q}^{(\beta)}$$

with a=1, ..., $n-R_W$. Further $$\frac{\partial H_o}{\partial q^{(i)}} = \sum_{b=1}^{R_W} p_b \frac{\partial f_b}{\partial q^{(i)}} + \sum_{\beta=1}^{N-R_W} \dot{q}^{(\beta)} \frac{\partial g_\beta}{\partial q^{(i)}} - \quad \text{(E--20)}$$

$$\frac{\partial L}{\partial q^{(i)}}\bigg|_{\dot{q}_a=f_a} - \sum_{b=1}^{R_W} \frac{\partial L}{\partial \dot{q}_b}\bigg|_{\dot{q}_b=f_b} \frac{\partial f_b}{\partial q^{(i)}}$$

$$= \sum_{b=1}^{R_W} \left(p_b - \frac{\partial L}{\partial \dot{q}^{(b)}}\bigg|_{\dot{q}^{(b)}=f_b}\right) \frac{\partial f_b}{\partial q^{(i)}} +$$

$$\sum_{\beta=1}^{N-R_W} \dot{q}^{(\beta)} \frac{\partial g_\beta}{\partial q^{(i)}} - \frac{\partial L}{\partial q^{(i)}}\bigg|_{\dot{q}^{(a)}=f_a}$$

$$= \sum_{\beta=1}^{N-R_W} \dot{q}^{(\beta)} \frac{\partial g_\beta}{\partial q^{(i)}} - \frac{\partial L}{\partial q^{(i)}}\bigg|_{\dot{q}^{(a)}=f_a}$$

-continued $$= \sum_{\beta=1}^{N-R_W} \dot{q}^{(\beta)} \frac{\partial g_\beta}{\partial q^{(i)}} - \frac{d}{dt}\left(\frac{\partial L}{\partial \dot{q}^{(i)}}\right)\Bigg|_{\dot{q}^{(a)}=f_a}$$

from (add reference).

$$\frac{\partial H_o}{\partial q^{(i)}} = -\dot{p}_i + \sum_{\beta=1}^{N-R_W} \dot{q}^{(\beta)} \frac{\partial g_\beta}{\partial q^{(i)}} \quad \text{(E-21)}$$

From (E-19) and (E-20) we get:

$$\dot{q}^{(a)} = \frac{\partial H_o}{\partial p_a} - \sum_{\beta=1}^{N-R_W} \frac{\partial g_\beta}{\partial p_a} \dot{q}^{(\beta)}, \quad \text{(E-22)}$$

$$a = 1, \ldots, R_W$$

$$\dot{p}_i = -\frac{\partial H_o}{\partial q^{(i)}} + \sum_{\beta=1}^{n-R_W} \dot{q}^{(\beta)} \frac{\partial g_\beta}{\partial q^{(i)}},$$

$$i = 1, \ldots, N$$

Since $$\frac{\partial H_o}{\partial p_\alpha} = 0$$

and $$\frac{\partial \phi_\beta}{\partial p_\alpha} = \delta\beta_\alpha$$

we can supplement these equations with $$\dot{q}^{(\alpha)} = \frac{\partial H_o}{\partial p_\alpha} - \sum_{\beta=1}^{N-R_W} \frac{\partial g_\beta}{\partial p_\alpha} \dot{q}^{(\beta)}, \quad \text{(E-23)}$$

$$\alpha = 1, \ldots, N - R_W$$

So we can write $$\dot{q}^{(i)} = \frac{\partial H_o}{\partial p_i} + \sum_{\beta=1}^{N-R_W} \frac{\partial g_\beta}{\partial p_i} \dot{q}^{(\beta)}, \quad \text{(E-24)}$$

$$i = 1, \ldots, N$$

$$\dot{p}_i = -\frac{\partial H_o}{\partial q^{(i)}} - \sum_{\beta=1}^{N-R_W} \dot{q}^{(\beta)} \frac{\partial g_\beta}{\partial q^{(i)}},$$

$$i = 1, \ldots, N$$

For consistency with (E-11) we should write $$\dot{q}^{(\alpha)} = \frac{d}{dt} - g_\alpha(q, \{p_a\}), \quad \text{(E-25)}$$

$$\alpha = 1, \ldots, N - R_W$$

where $\dot{p}_\alpha$ is given by the right hand side of (E-22).

Streamlining the Hamiltonian Equation of Motion (EOM)

Definition 3.16-1.

A function f is weakly equal to g denoted by f≈g, if f and g are equal on the subspace defined by the primary constraints, $$\phi_\beta = 0 \text{ when } f|_{r_p} = g|_{r_p}$$

and $$f(q,p) \approx g(q,p) \Leftrightarrow f(q,p) = g(q,p) \text{ when}\{\phi_\alpha(q,p)=0\}$$

Theorem 3.16.3.

Assume f,g are defined over the entire space spanned by $\{q^{(i)}\}$, $\{p_i\}$. Then if $$f(q,p)|_{r_p} = g(q,p)|_{r_p} \quad \text{(E-26)}$$

Then $$\frac{\partial}{\partial q^{(i)}}\left(f - \sum_\beta \phi_\beta \frac{\partial f}{\partial p_\beta}\right) \simeq \frac{\partial}{\partial q^{(i)}}\left(h - \sum_\beta \phi_\beta \frac{\partial h}{\partial p_\beta}\right) \quad \text{(E-27)}$$

and $$\frac{\partial}{\partial p_i}\left(f - \sum_\beta \phi_\beta \frac{\partial f}{\partial p_\beta}\right) \simeq \frac{\partial}{\partial p}\left(h - \sum_\beta \phi_\beta \frac{\partial h}{\partial p_\beta}\right)$$

for i=1, ..., N.

Proof: Consider the two functions f(q, $\{p_a\}$, $\{p_\beta\}$) and h(q, $\{p_a\}$, $\{p_\beta\}$). Using (E-11) and from the hypothesis of the theorem, $$f(q,\{p_a\},\{g_\alpha\}) = h(q,\{p_a\},\{g_\alpha\}) \quad \text{(E-28)}$$

Thus is follows $$\left(\frac{\partial f}{\partial q^{(i)}} + \sum_a \frac{\partial f}{\partial p_a}\frac{\partial p_a}{\partial q^{(i)}} + \sum_\beta \frac{\partial f}{\partial p_\beta}\frac{\partial g_\beta}{\partial q^{(i)}}\right)_{\Gamma_p} = \quad \text{(E-29)}$$

$$\left(\frac{\partial h}{\partial q^{(i)}} + \sum_a \frac{\partial h}{\partial p_a}\frac{\partial p_a}{\partial q^{(i)}} + \sum_\beta \frac{\partial h}{\partial p_\beta}\frac{\partial g_\beta}{\partial q^{(i)}}\right)_{\Gamma_p}$$

and $$\left(\frac{\partial f}{\partial p_i} + \sum_{a \neq i} \frac{\partial f}{\partial p_a}\frac{\partial p_a}{\partial p_i} + \sum_\beta \frac{\partial f}{\partial p_\beta}\frac{\partial g_\beta}{\partial p_i}\right)_{\Gamma_\beta} = \quad \text{(E-30)}$$

$$\left(\frac{\partial h}{\partial p_i} + \sum_{a \neq i} \frac{\partial h}{\partial p_a}\frac{\partial p_a}{\partial p_i} + \sum_\beta \frac{\partial h}{\partial p_\beta}\frac{\partial g_\beta}{\partial p_i}\right)_{\Gamma_\beta}$$

Note since $\phi_\alpha(q,p) = p_\alpha - g_\alpha(q, \{p_a\})$, we have $$\frac{\partial g_\beta}{\partial q^{(i)}} = -\frac{\partial \phi_\beta(q, p)}{\partial q^{(i)}}$$

and $$\frac{\partial g_\beta}{\partial p_i} = -\frac{\partial \phi_\beta(q, p)}{\partial p_i}$$

and $$\partial \phi_\alpha(q, p) = 0$$

for $\alpha=1, \ldots, N-R_W$. We have $$\left(\frac{\partial f}{\partial q^{(i)}} - \sum_\beta \frac{\partial f}{\partial p_\beta}\frac{\partial \phi_\beta}{\partial q^{(i)}}\right)_{\Gamma_P} = \left(\frac{\partial h}{\partial q^{(i)}} - \sum_\beta \frac{\partial h}{\partial p_\beta}\frac{\partial \phi_\beta}{\partial q^{(i)}}\right)_{\Gamma_\beta}$$

which can be written as $$\frac{\partial}{\partial q^{(i)}}\left(f - \sum_\beta \phi_\beta \frac{\partial f}{\partial p_\beta}\right) \simeq \frac{\partial}{\partial q^{(i)}}\left(h - \sum_\beta \phi_\beta \frac{\partial h}{\partial p_\beta}\right)$$

since $\phi_\beta \partial^2 f/\partial p_\beta^2 = 0$ because $\phi_\beta = 0$. Similarly, $$\frac{\partial}{\partial p_i}\left(f - \sum_\beta \phi_\beta \frac{\partial f}{\partial p_\beta}\right) \simeq \frac{\partial}{\partial p_i}\left(h - \sum_\beta \phi_\beta \frac{\partial h}{\partial p_\beta}\right)$$

Corrolary 3.16-1.

$$\dot{q}^{(i)} = \frac{\partial H}{\partial p_i} + \sum_\beta v^{(\beta)} \frac{\partial \phi_\beta}{\partial p_i}$$

$$\dot{p}_i = -\frac{\partial H}{\partial q^{(i)}} - \sum_\beta v^{(\beta)} \frac{\partial \phi_\beta}{\partial q^{(i)}}$$

for $i=1, \ldots, N$.

Proof.

We consider two Hamiltonians $H(\{q^{(i)}\},\{p_i\})$ and $H_o(\{q^{(i)}\},\{p_a\})$. Define $H(\{q^{(i)}\},\{p_i\})$ as follows $$H(\{q^{(i)}\},\{p_i\}) \approx H_o(\{q^{(i)}\},\{p_a\}).$$

Then using the result of Theorem 3.16.1, from (E-29) with $f=H$ and $h=H_o$ $$\frac{\partial H_o}{\partial q^{(i)}} \approx \frac{\partial}{\partial q^{(i)}}\left(H - \sum_{\beta=1}^{N-R_W} \phi_\beta \frac{\partial H}{\partial p_\beta}\right) \quad \text{(E--31)}$$

$$\frac{\partial H_o}{\partial p_i} \approx \frac{\partial}{\partial p_i}\left(H - \sum_{\beta=1}^{N-R_W} \phi_\beta \frac{\partial H}{\partial p_\beta}\right) \quad \text{(E--32)}$$

Using (E-31) and (E-32) in (E-24), we get $$\dot{q}^{(i)} \approx \frac{\partial}{\partial p_i}\left(H - \sum_\beta \phi_\beta \frac{\partial H}{\partial p_\beta}\right) + \sum_\beta \dot{q}^{(\beta)}\frac{\partial \phi_\beta}{\partial p_i} \text{ and} \quad \text{(E--33)}$$

$$\dot{p}_i \approx -\frac{\partial}{\partial q^{(i)}}\left(H - \sum_\beta \phi_\beta \frac{\partial H}{\partial p_\beta}\right) - \sum_\beta \dot{q}^{(\beta)}\frac{\partial \phi_\beta}{\partial q^{(i)}} \text{ or}$$

$$\dot{q}^{(i)} \approx \frac{\partial}{\partial p_i}\left(H - \sum_\beta \phi_\beta \left(\frac{\partial H}{\partial p_\beta} - \dot{q}^{(\beta)}\right)\right) \text{ and}$$

$$\dot{p}_i \approx -\frac{\partial}{\partial q^{(i)}}\left(H - \sum_\beta \phi_\beta \left(\frac{\partial H}{\partial p_\beta} - \dot{q}^{(\beta)}\right)\right)$$

Define $$v_\beta \equiv \dot{q}^{(\beta)} - \frac{\partial H}{\partial p_\beta}$$

$$H_T \equiv H + \sum_\beta v^{(\beta)} \phi_\beta$$

So (E-33) becomes $$\dot{q}^{(i)} \approx \frac{\partial H_T}{\partial p_i} \quad \text{(E--34)}$$

$$\dot{p}_i \approx -\frac{\partial H_T}{\partial q^{(i)}}$$

Constrained Hamiltonian Systems

Local symmetries on a Lagrangian based model. Consider $$q^{(i)} \to q^{(i)}(t) + \delta q^{(i)}(t)$$

$$\dot{q}^{(i)} \to \dot{q}^{(i)}(t) + \delta \dot{q}^{(i)}(t)$$

with $i=1, \ldots, N$. The action of the system is given by $$S(q,\dot{q}) = \int L(q,\dot{q})dt$$

where $q$ and $\dot{q}$ are n-dimensional column vectors. The action differential $$\delta S = \int L(q+\delta q, \dot{q}+\delta \dot{q})dt - \int L(q,\dot{q})dt$$

$$= \int L(q+\delta q, \dot{q}+\delta \dot{q})dt - \int L(q,\dot{q})dt$$

$$= \int \left[\sum_i \frac{\partial L}{\partial q^{(i)}}\delta q^{(i)} + \sum_i \frac{\partial L}{\partial \dot{q}^{(i)}}\delta \dot{q}^{(i)}\right]dt$$

$$= -\int \sum_i \left[\frac{d}{dt}\frac{\partial L}{\partial \dot{q}^{(i)}} - \frac{\partial L}{\partial q^{(i)}}\right]\delta q^{(i)} dt$$

$$= -\sum \int dt \sum_i E_i^{(o)}(q,\dot{q},\ddot{q})\delta q^{(i)}$$

where we define the Euler-Lagrange differential operator $$E_i^{(o)}(q,\dot{q},\ddot{q}) = \frac{d}{dt}\frac{\partial L}{\partial \dot{q}^{(i)}} - \frac{\partial L}{\partial q^{(i)}}.$$

Note that $$\int \sum_{i=1}^N E_i^{(o)}(q,\dot{q},\ddot{q})\delta q^{(i)} dt \equiv 0 \quad (3.17\text{-}1)$$

on shell. Expanding $E_i^{(o)}$ $$E_i^{(o)}(q,\dot{q},\ddot{q}) = \sum_j \left[\frac{\partial^2 L(q,\dot{q})}{\partial \dot{q}^{(i)}\partial \dot{q}^{(j)}}\ddot{q}^{(j)} + \frac{\partial^2 L(q,\dot{q})}{\partial \dot{q}^{(i)}\partial q^{(j)}}\dot{q}^{(j)}\right] - \frac{\partial L(q,\dot{q})}{\partial q^{(i)}}$$

-continued $$= \sum_j W_{ij}(q,\dot{q})\ddot{q}^{(j)} + \sum_j \frac{\partial^2 L(q,\dot{q})}{\partial \dot{q}^{(i)} \partial q^{(j)}} \dot{q}^{(i)} - \frac{\partial L(q,\dot{q})}{\partial q^{(i)}}$$

$$= \sum_j W_{ij}(q,\dot{q})\ddot{q}^{(j)} + k_i(q,\dot{q})$$

If L is singular, W(N×N) is not invertible so (3.17-1) cannot be solved for $\dot{q}_i$, =1, . . . , N. If Rank(W(q,$\dot{q}$))=$R_W$ on shell, then there exist N–$R_W$ in the theory. There exist N–$R_W$ independent left (or right) zero mode eigenvectors $w_i^{(o,k)}$, i=1, . . . , N–$R_W$ such that $$\sum_i w_i^{(o,k)}(q,\dot{q})W_{ij}(q,\dot{q}) = 0, k = 1, \dots, N - R_W$$

Thus $$\phi^{(o,k)} = \sum_{i=1}^N w_i^{(o,k)}(q,\dot{q})E_i^{(o)}(q,\dot{q},\ddot{q})$$

depend on q and $\dot{q}$ only. The $\phi^{(o,k)}$ also vanish on shell:

$$\phi^{(o,k)}(q,\dot{q})=0, k=1, \dots, N-R_W$$

The set $\{\phi^{(o,k)}|k=1, \dots , N–R_W\}$ are the zero generation constraints. It is possible that not all the $\{\phi^{(o,k)}\}$ are linearly independent. So we may find linear combinations of the zero mode eigenvectors $$v_i^{(o,n_o)} = \sum_k c_k^{(n_o)} w_i^{(o,k)}$$

such that we have $$G^{(o,n_o)} \equiv v^{(o,n_o)} E^{(o)} \equiv 0, n_o, \dots, N_o \quad (3.17\text{-}3)$$

These are called gauge identities.
Any variation $\delta q^i$, i=1, . . . , N, of the form $$\delta q_i = \sum_{n_o} \varepsilon_{n_o} v_i^{(o,n_o)}$$

Is action invariant by (3.17-1).
Given this definition of $\delta q_i$ and (3.17-3), we conclude $$\delta S = \int dt \sum_{i=1}^N E_i^{(o)}(q,\dot{q},\ddot{q}) \sum_{n_o} \varepsilon_{n_o}(t) v_i^{(o,n_o)}$$

$$= \int dt \sum_{i=1}^N \varepsilon_{n_o} \sum_{n_o} E_i^{(o)}(q,\dot{q},\ddot{q}) v_i^{(o,n_o)}(q,\dot{q})$$

$$= \int dt \sum_{i=1}^N \varepsilon_{n_o} G^{(o,n_o)}$$

$$\equiv 0$$

everywhere. The remaining zero generating modes which we denote by $u^{(o,n_o)}$ lead to genuine constraints. They are of the form $\phi^{(o,n_o)}(q,\dot{q})$=0 on shell, where $$\phi^{(o,n_o)} = u^{(o,n_o)} E^{(o)}. \quad (3.17\text{-}4)$$

The algorithm now proceeds as follows. We separate the gauge identities (3.17-3) from the nontrivial constraints (3.17-4) and will list them separately. They will be used for determining local symmetry transformations.

Next we want to search for additional constraints. We do this by searching for further functions of the coordinates and velocities which vanish in the space of physical trajectories. To this effect consider the following N+$N_o$ vector constructed from $E^{(o)}$ and the time derivative of the constraints (3.17-4)

$$[E^{(1)}] = \begin{bmatrix} E^{(o)} \\ \frac{d}{dt}(u^{(o,1)}E^{(o)}) \\ \vdots \\ \frac{d}{dt}(u^{(o,N_o)}E^{(o)}) \end{bmatrix} = \begin{bmatrix} E^{(o)} \\ \frac{d}{dt}\phi^{(o)} \end{bmatrix} \quad (3.17\text{-}5)$$

by construction. The constraint $\phi^{(o)}$ is valid for all time and therefore $$\frac{d}{dt}\phi^{(o)} = 0$$

on shell, but $$\frac{d\phi^{(o,i)}}{dt} = \nabla\dot{q}(u^{(o,i)}E^{(o)})\ddot{q} + \nabla q(u^{(o,i)}E^{(o)})\dot{q} \quad (3.17\text{-}6)$$

So $$[E_{i_1}^{(1)}] = \sum_{j=1}^n W_{i_1 j}^{(1)}(q,\dot{q})\ddot{q}^{(j)} + k_{i_1}^{(1)}(q,\dot{q})$$

where $i_1$=1, . . . , N+$N_o$, and $$[W_{i_1 i}^{(1)}] = \begin{bmatrix} W^{(o)} \\ \nabla\dot{q}(u^{(o,i)}E^{(o)}) \\ \vdots \\ \nabla\dot{q}(u^{(o,N_o)}E^{(o)}) \end{bmatrix} \quad (3.17\text{-}7)$$

$$[k_{i_1}^{(1)}] = \begin{bmatrix} k^{(o)} \\ \sum_j \frac{\partial}{\partial q^{(j)}}(u^{(o,i)}E^{(o)})\dot{q}^{(j)} \\ \vdots \\ \sum_j \frac{\partial}{\partial q^{(j)}}(u^{(o,N_o)}E^{(o)})\dot{q}^{(j)} \end{bmatrix}$$

We next look for the zero modes of $W^{(1)}$. By construction, these zero modes include the o modes of the previous level. The gauge identities at level 1 are.

$$G^{(1,n_1)} = v^{(1,n_1)}E^1 - \sum_{n_o=1}^{N_o} M_{n_1 n_o}^{(1,0)}(u^{(o,n_o)}E^{(o)}) \equiv 0 \quad (3.17\text{-}8)$$

where $n_1$=1, . . . , $N_1$ and the genuine constraints are of the form $$\phi^{(1,n_1)} = \phi^{(1,n_1)}E^1 = 0 \quad (3.17\text{-}9)$$

with $n_1$=1, . . . , $N_1$ on shell.

We next adjoin the new identities (3.17-8) to the ones determined earlier (3.17-3) with the remaining constraints (3.17-9) we proceed as before, adjoining their time derivatives to (3.17-5) and construct $W_{i_1 i}^{(1)}$ and $k_{i_1}^{(1)}$.

The iterative process will terminate at some level M if either i) there is not further zero modes, or ii) the new constraints can be expressed as linear combinations of previous constraints.

The Maximal Set of Linearly Independent Gauge Identities Generated by the Algorithm Note that the algorithm steps are of the form $$G^{(o,n_o)} = u^{(o,n_o)} E^{(o)} \equiv 0 \quad (3.17\text{-}10)$$

$$G^{(l,n_l)} = u^{(l,n_l)} E^{(l)} - \sum_{l'=0}^{l-1} \sum_{n_{l'}=0}^{N_{l'}} M_{n_l n_{l'}}^{(l,l')} \phi^{(l',n_{l'})} \quad (3.17\text{-}11)$$

with $L=1, \ldots, N_l$. The $M_{n_l n_l}^{(l,l')}$, are only functions of q and $\dot{q}$. And $$\phi^{(l,n_l)} = u^{(l,n_l)} E^{(l)}, n_l = 1, \ldots, N_l, \quad (3.17\text{-}12)$$

$$E^{(l)} = \begin{bmatrix} E^{(o)} \\ \frac{d\phi^{(o)}}{dt} \\ \vdots \\ \frac{d\phi^{(l-1)}}{dt} \end{bmatrix} \quad (3.17\text{-}13)$$

where $\phi^{(l)}$ is a column vector with $N_1$ components $\phi^{(l,n_l)}$. Thus we conclude from (3.17-13) and (3.17-11) that the general form of the gauge identity given by (3.17-11) is of the form $$G^{(l,n_l)} = \sum_{i=1}^{N_l} \sum_{l=1}^{M} \sum_{m=1}^{l} \zeta_{mi}^{(l,m_l)} \frac{d^m}{dt^m} E_i^{(o)} \equiv 0 \quad (3.17\text{-}14)$$

where $\zeta_{mi}^{(l,m_l)}$ (q,$\dot{q}$) and $N_l < M$. From (3.17-14) it also follows that $$\sum_{l=1}^{M} \sum_{n_l=1}^{l} \varepsilon^{(l,n_l)} G^{(l,n_l)} \equiv 0 \quad (3.17\text{-}15)$$

This identity can also be written as $$\sum \delta q^{(i)} E_i^{(o)} - \frac{d}{dt} F \quad (3.17\text{-}16)$$

where $$\delta q^{(i)} = \sum_{l=1}^{M} \sum_{n_l=1}^{N_l} \sum_{m=q}^{l} (-1)^m \frac{d^m}{dt^m} \zeta_m^{(l,n_l)} \varepsilon^{(l,m_l)}(t)$$

and F is a complicated function of q and $\dot{q}$. By collecting indices l, $n_l$ together $$\delta q_i = \sum_{l=1}^{M} \sum_{n_l=1}^{N_l} \sum_{m=q}^{l} (-1)^m \zeta_{mi}^{(a)} \varepsilon^{(a)}(t)$$

Example of Constrained Hamiltonian System in Lagrangian Form

Let $$L(q, \dot{q}) = \frac{1}{2} \dot{q}^{2(1)} + \dot{q}^{(1)} q^{(2)} + \frac{1}{2} (q^{(1)} - q^{(2)})^2 \quad (3.17\text{-}17)$$

$$E^{(o)} = \begin{bmatrix} \frac{d}{dt} \frac{\partial}{\partial \dot{q}^{(1)}} - \frac{\partial L}{\partial q^{(1)}} \\ \frac{d}{dt} \frac{\partial}{\partial \dot{q}^{(2)}} - \frac{\partial L}{\partial q^{(2)}} \end{bmatrix} = \begin{bmatrix} \ddot{q}^{(1)} + 2q^{(2)} - q^{(1)} \\ q^{(1)} - q^{(2)} \end{bmatrix} \quad (3.17\text{-}18)$$

$$W = \begin{bmatrix} 1 & 0 \\ 0 & 0 \end{bmatrix} \quad (3.17\text{-}19)$$

$$k = \begin{bmatrix} \dot{q}^{(2)} - q^{(1)} + q^{(2)} \\ -\dot{q}^{(1)} - q^{(2)} + q^{(1)} \end{bmatrix} \quad (3.17\text{-}20)$$

The only o mode is $$u^{(o)} = [0, 1]$$

Then $$E^{(o)} = W^{(o)} \ddot{q} + k^{(o)}$$

$$= \begin{bmatrix} 1 & 0 \\ 0 & 0 \end{bmatrix} \begin{bmatrix} \ddot{q}^{(1)} \\ \ddot{q}^{(2)} \end{bmatrix} + \begin{bmatrix} \dot{q}^{(2)} - q^{(1)} + q^{(2)} \\ -\dot{q}^{(1)} - q^{(2)} + q^{(1)} \end{bmatrix}$$

Then $$u^{(o)} E^{(o)} = [0 \quad 1] \begin{bmatrix} \begin{bmatrix} 1 & 0 \\ 0 & 0 \end{bmatrix} \begin{bmatrix} \ddot{q}^{(1)} \\ \ddot{q}^{(2)} \end{bmatrix} + \begin{bmatrix} \dot{q}^{(2)} - q^{(1)} + q^{(2)} \\ -\dot{q}^{(1)} - q^{(2)} + q^{(1)} \end{bmatrix} \end{bmatrix} \quad (3.17\text{-}21)$$

$$= -\dot{q}^{(1)} - q^{(2)} + q^{(1)}$$

$$= 0$$

on shell. Then there are no gauge identities for $E^{(o)}$. Now construct $E^{(1)}$.

$$E^{(1)} = \begin{bmatrix} E^{(o)} \\ \frac{t}{dt} u^{(o)} E^{(o)} \end{bmatrix} = \begin{bmatrix} \dot{q}^{(2)} - q^{(1)} + q^{(2)} \\ -\dot{q}^{(1)} - q^{(2)} + q^{(1)} \\ -\ddot{q}^{(1)} - \dot{q}^{(2)} + \dot{q}^{(1)} \end{bmatrix}$$

which can be written $$E^{(1)} = W^{(1)} \ddot{q} + k^{(1)}$$

$$= \begin{bmatrix} 0 & 0 \\ 0 & 0 \\ -1 & 0 \end{bmatrix} \begin{bmatrix} \ddot{q}^{(1)} \\ \ddot{q}^{(2)} \end{bmatrix} + \begin{bmatrix} \dot{q}^{(2)} - q^{(1)} + q^{(2)} \\ -\dot{q}^{(1)} - q^{(2)} + q^{(1)} \\ -\dot{q}^{(2)} + \dot{q}^{(1)} \end{bmatrix}$$

There zero modes of $w^{(1)}$ are $$W^{(1)} \begin{cases} [0 \quad 1 \quad 0] \\ [1 \quad 0 \quad 1] \end{cases}$$

The first zero mode is the previous one augmented by one dimension and reproduces the previous constraint. The second mode reproduces the negative of the constraint (3.17-21). That is, $$v^{(1)}E^{(1)} = -u^{(o)}E^{(o)}$$

with $v^{(1)} = [1\ 0\ 1]$. This leads to the gauge identity $$G^{(1)} = v^{(1)}E^{(1)} + u^{(o)}E^{(o)} \equiv 0$$

Companionship: Reconciling Agents in the Network.

The outline of the companionship process is as follows for a system of N agents.

Determine the state action space of the system for N−1 agents to create a Tellegen decision element.

Update the remaining agent with the Tellegen DE.

Repeat process so that all N agents are updated with respect to their Tellegen DEs.

User submits query.

System used KB to establish equations of motion for system in Lagrangian or Hamiltonian form.

System determines optimal trajectory via optimization algorithm of the equations of motion that conform to the principle of least action.

System returns solution which is a point in the phase space and also serves as an answer to the query.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:

generating, by one or more computing systems of a collaborative distributed decision system, an executable decision module for use with a physical system having a plurality of inter-related elements and having one or more outputs whose values vary based at least in part on one or more manipulatable control elements of the plurality, wherein the physical system includes an energy generating facility and the outputs include the energy being provided and the plurality of inter-related elements include at least one energy source within the energy generating facility and at least one energy storage mechanism within the energy generating facility, wherein the manipulatable control elements include one or more controls to determine whether to accept a request to supply a specified amount of energy at a current time and to determine to provide energy to the at least one energy storage mechanism at the current time if not accepted and to provide energy from the at least one energy source at the current time if accepted, the generating including:

receiving, by the one or more computing systems and from one or more users, system information describing at least a portion of the physical system using multiple rules that each has one or more conditions to evaluate and that specify restrictions involving the plurality of elements;

converting, by the one or more computing systems and to multiple constraints, the system information and information about a goal to be achieved during controlling of the physical system and information about sensor variables whose values are available during the controlling of the physical system;

validating, by the one or more computing systems and based on multiple validation rules, the multiple constraints by testing at least one of controllability, observability, stability or goal completeness, wherein testing controllability ensures that each of the manipulatable control elements is specified in the multiple rules to affect one or more other elements of the plurality, wherein testing observability ensures that each of the sensor variables is specified in the multiple rules to relate to at least one element of the plurality, wherein testing stability ensures that solutions determined by the generated decision module during controlling of the at least portion of the physical system will converge with any other solutions determined by any other generated decision modules during controlling of other portions of the physical system, wherein testing goal completeness ensures that each of the manipulatable control elements is reflected in the goal;

converting, by the one or more computing systems, the validated constraints to coupled differential equations that represent a model for use in describing a state of the target system;

training, by the one or more computing systems, the model using state information for the plurality of elements for multiple times, to enable the model to determine values of one or more elements that are not directly observable; and testing, by the one or more computing systems, performance of the trained model in controlling the at least portion of the physical system by simulating manipulations of the manipulatable control elements to affect the outputs in expected manners;

determining, by the one or more computing systems, that the testing is successful, and providing the generated decision module with the trained model; and executing, by the one or more computing systems, the generated decision module to perform actual controlling of the at least portion of the energy generating facility of the physical system to modify the energy being provided by the energy generating facility.

2. The computer-implemented method of claim 1 wherein the executing of the generated decision module with the trained model is performed in an environment that provides the executing generated decision module with access to perform the actual controlling of the at least portion of the physical system.

3. The computer-implemented method of claim 1 wherein the generating of the executable decision module includes providing, by the one or more computing systems, an online interface to a rule builder component of the collaborative distributed decision system, and wherein the receiving of the system information from the one or more users includes receiving electronic communications at the online interface that are sent over one or more computer networks from one or more client devices of the one or more users.

4. The computer-implemented method of claim 1 wherein the plurality of inter-related elements further include multiple alternative electricity sources within the electricity generating facility, and wherein the manipulatable control elements further include one or more controls to select which alternative electricity source to provide the specified amount of electricity at the current time.

5. The computer-implemented method of claim 1 further comprising generating, by the one or more computing systems, a second decision module for use in controlling operations of a vehicle having a motor and a battery, and executing, by the one or more computing systems, the generated second decision module to perform the controlling of the operations, and wherein outputs of the controlling of the operations include effects of the motor to move the vehicle at a current time in response to manipulations of at least one control to select whether at the current time to remove energy from the battery to power the motor or to add excess energy to the battery.

6. The computer-implemented method of claim 5 wherein the vehicle further includes an engine that is manipulatable to modify energy generated from the engine, and wherein the controlling of the operations further includes manipulating one or more additional controls to determine how much energy to generate from the engine for use at least in part in adding the excess energy to the battery.

7. The computer-implemented method of claim 1 further comprising generating, by the one or more computing systems, a second decision module for use in controlling product inventory at one or more locations via one or more product sources that provide products and increase the product inventory at the one or more locations and further via one or more product recipients that receive products and decrease the product inventory at the one or more locations, and wherein outputs of the controlling of the operations include products being provided from the one or more locations to the one or more product recipients while maintaining the product inventory at one or more specified levels.

8. The computer-implemented method of claim 1 wherein the training of the model includes generating values for one or more model error measurements for one or more of the multiple times, and further includes determining that at least one of the generated values exceeds an error threshold, and wherein the method further comprises:
evaluating, by the one or more computing systems, the generated values for the one or more model error measurements to determine at least one of the multiple rules that is incorrect;
providing, by the one or more computing systems, feedback to the one or more users regarding the determined at least one rules that is incorrect;
receiving, by the one or more computing systems and in response to the provided feedback, one or more revised versions of the determined at least one rules; and
updating, by the one or more computing systems, the model to reflect the one or more revised versions of the determined at least one rules.

9. The computer-implemented method of claim 8 wherein the training of the model for each of the multiple times includes identifying a solution for the goal for the time that has an associated error measurement within a defined threshold relative to an optimal solution for the goal for that time, and further includes updating a copy of the model for that time to reflect the identified solution, and wherein the one or more model error measurements are based on a rate of change of one or more of:
Hamiltonian functions expressed by two or more copies of the model for two or more times;
amounts of entropy included in two or more copies of the model for two or more times;
values of variables associated with the plurality of inter-related elements in state information for the physical system for two or more times; or
a reduction in the associated error measurements for the identified solutions for two or more times.

10. The computer-implemented method of claim 8 wherein the multiple rules include one or more absolute rules that specify non-modifiable restrictions that are requirements regarding operation of the physical system, and further include one or more hard rules that specify restrictions regarding operation of the physical system that can be modified in specified situations, and wherein each determined at least one rule is one of the hard rules.

11. The computer-implemented method of claim 8 wherein the multiple rules include one or more soft rules whose conditions evaluate to one of three or more possible values under differing situations to represent varying degrees of uncertainty and further include additional rules whose conditions evaluate to either true or false under differing situations, and wherein one or more of the determined at least one rules are from the soft rules.

12. The computer-implemented method of claim 1 wherein the training of the model for one of the multiple times includes failing to identify a solution for the goal for the one time that satisfies one or more specified criteria, and wherein the method further comprises:
providing, by the one or more computing systems, feedback to the one or more users regarding the failing to identify the solution;
receiving, by the one or more computing systems and in response to the provided feedback, one or more revised versions of at least one of the goal or of one or more rules of the multiple rules; and
updating, by the one or more computing systems, the model to reflect the one or more revised versions of the at least one of the goal or of the one or more rules.

13. The computer-implemented method of claim 1 wherein the testing of the performance of the trained model includes identifying one or more problems in the performance, and wherein the method further comprises:
providing, by the one or more computing systems, feedback to the one or more users regarding the one or more problems in the performance;
receiving, by the one or more computing systems and in response to the provided feedback, one or more revised versions of at least one of the goal or of one or more rules of the multiple rules; and updating, by the one or more computing systems, the model to reflect the one or more revised versions of the at least one of the goal or of the one or more rules.

14. The computer-implemented method of claim 13 wherein the identifying of the one or more problems in the performance of the trained model includes:

generating, by the one or more computing systems, values for one or more model error measurements for the trained model that accumulate over multiple times of using the trained model to identify a solution to the goal for that time; and determining, by the one or more computing systems, that at least one of the generated values exceeds an error threshold.

15. The computer-implemented method of claim 1 wherein the generated executable decision module is a first decision module for a first portion of the physical system that is described by the received system information, and wherein the method further comprises generating one or more additional second decision modules that each has distinct system information describing distinct second portions of the physical system.

16. The computer-implemented method of claim 15 wherein the receiving of the system information from the one or more users includes:

receiving a plurality of rules from the one or more users that collectively describe all of the physical system and that include the multiple rules and that further include multiple additional rules;

receiving an identification from the one or more users of a first subset of the plurality of rules that includes the multiple rules for use with the first decision module; and receiving additional identifications from the one or more users of one or more distinct second subsets of the plurality of rules for use with the one or more additional second decision modules, wherein each of the distinct second subsets includes at least one of the multiple additional rules, and wherein the generating of the one or more additional second decision modules is based at least in part on the received additional identifications of the one or more distinct second subsets of the plurality of rules for use with the one or more additional second decision modules.

17. The computer-implemented method of claim 15 wherein the receiving of the system information from the one or more users includes receiving a plurality of rules from the one or more users that collectively describe all of the physical system and that include the multiple rules and that further include multiple additional rules, wherein the method further comprises analyzing, by the one or more computing systems, the plurality of rules to decompose the plurality of rules into multiple distinct subsets, wherein a first of the multiple distinct subsets includes the multiple rules, and wherein one or more distinct second subsets of the multiple subsets each includes at least one of the multiple additional rules, wherein the generating of the executable decision module includes using the first subset for the generated executed decision module; and wherein the generating of the one or more additional second decision modules is initiated by the one or more computing systems based at least in part on the analyzing to create a distinct decision module for each of the one or more distinct second subsets.

18. The computer-implemented method of claim 1 wherein the receiving of the system information from the one or more users further includes:

validating syntax of the multiple rules as part of the receiving of the system information; and if one or more errors are identified from the validating of the syntax, and before the converting of the system information and the information about the goal and the information about the sensor variables, providing feedback to the one or more users regarding the one or more errors to enable the one or more users to correct the one or more errors.

19. The computer-implemented method of claim 1 wherein the converting of the system information and the information about the goal and the information about the sensor variables further includes:

validating syntax of the multiple rules; and if one or more errors are identified from the validating of the syntax, and before the validating of the constraints, providing feedback to the one or more users regarding the one or more errors to enable the one or more users to correct the one or more errors.

20. The computer-implemented method of claim 1 wherein the multiple validation rules are provided by the collaborative distributed decision system and are each associated with one of controllability, observability, stability or goal completeness, and wherein the validating of the multiple constraints includes testing all of controllability, observability, stability or goal completeness.

21. The computer-implemented method of claim 1 wherein the multiple validation rules include one or more validation rules associated with controllability, and wherein the validating of the multiple constraints includes testing the controllability.

22. The computer-implemented method of claim 1 wherein the multiple validation rules include one or more validation rules associated with observability, and wherein the validating of the multiple constraints includes testing the observability.

23. The computer-implemented method of claim 1 wherein the multiple validation rules include one or more validation rules associated with stability, and wherein the validating of the multiple constraints includes testing the stability.

24. The computer-implemented method of claim 1 wherein the multiple validation rules include one or more validation rules associated with goal completeness, and wherein the validating of the multiple constraints includes testing the goal completeness.

25. The computer-implemented method of claim 1 wherein the multiple validation rules further include one or more user-specified validation rules that are specified by the one or more users, and wherein the validating of the multiple constraints includes executing the one or more user-specified validation rules.

26. The computer-implemented method of claim 1 wherein the validating of the multiple constraints includes identifying one or more problems from the testing, and wherein the method further comprises performing further interactions with the one or more users to correct the one or more problems before proceeding with the training and the testing.

27. A non-transitory computer-readable medium having stored contents that cause one or more computing systems to perform a method, the method comprising:
   generating, by the one or more computing systems, an executable decision module for use with a target system having a plurality of elements that are inter-related and that include one or more control elements with modifiable values, the generating including:
      receiving, by the one or more computing systems and from one or more users, system information describing at least a portion of the target system using multiple rules that each has one or more conditions to evaluate and that specify restrictions involving the plurality of elements;
      converting, by the one or more computing systems and to multiple constraints, the system information and information about a goal to be achieved during modifying the values of the control elements and information about sensor variables whose values are available during operation of the target system;
      validating, by the one or more computing systems and based on multiple validation rules, the multiple constraints by testing at least one of controllability, observability, stability or goal completeness; and
      converting, by the one or more computing systems, the validated constraints to coupled differential equations that represent a model for use in describing a state of the target system;
   providing the generated decision module with the coupled differential equations representing the model; and
   executing, by the one or more computing systems, the generated decision module to perform modifying of the values of the control elements of the target system to alter physical operations of the target system.

28. The non-transitory computer-readable medium of claim 27 wherein the target system is a physical system having one or more outputs whose values vary based at least in part on the values of the control elements, wherein the one or more computing systems are part of a collaborative distributed decision system, and wherein the stored contents include software instructions that, when executed, further cause the one or more computing systems to:
   train, by the one or more computing systems, the model using state information for the plurality of elements for multiple times, to identify values for the trained model of one or more elements of the plurality that are not directly observable; and
   test, by the one or more computing systems, performance of the model in controlling the at least portion of the physical system by simulating modifications of the values of the control elements to affect the outputs in expected manners.

29. The non-transitory computer-readable medium of claim 27 wherein the target system includes one or more computing resources being protected from unauthorized operations, wherein the plurality of inter-related elements include one or more sources of attempts to perform operations, wherein the control elements include one or more controls to determine whether a change in authorization to a specified type of operation is needed and to select one or more actions to take to implement the change in authorization if so determined, and wherein the goal includes to minimize unauthorized operations that are performed.

30. The non-transitory computer-readable medium of claim 27 wherein the target system includes one or more information sources to be analyzed to determine a risk level from information of the one or more information sources, wherein the control elements include one or more controls to determine whether the risk level exceeds a specified threshold and to select one or more actions to take to mitigate the risk level, and wherein the goal includes to minimize the risk level.

31. The non-transitory computer-readable medium of claim 27 wherein the target system includes one or more financial markets, wherein the plurality of inter-related elements include items that can be purchased and/or sold in the one or more financial markets, wherein the control elements include one or more controls to determine whether to purchase or sell particular items at particular times and to select one or more actions to initiate transactions to purchase or sell the particular items at the particular times, and wherein the goal includes to maximize profit while maintaining risk below a specified threshold.

32. The non-transitory computer-readable medium of claim 27 wherein the target system includes functionality to perform coding for medical procedures performed on humans, wherein the plurality of inter-related elements include a plurality of medical codes corresponding to a plurality of medical procedures, wherein the control elements include one or more controls to select particular medical codes to associate with particular medical procedures in specified circumstances, and wherein the goal includes to minimize errors in selected medical codes that cause revenue leakage.

33. A system comprising:
   one or more processors of one or more computing systems; and
   one or more memories with stored instructions that, when executed by at least one of the one or more processors, cause the one or more processors to perform automated operations that include at least:
   generating an executable decision module to use as part of controlling a physical system, wherein the physical system has a plurality of inter-related elements and has one or more outputs whose values vary based at least in part on one or more manipulatable control elements of the plurality, and wherein the generating of the executable decision module includes:
      receiving, from one or more users, system information describing at least a portion of the physical system using multiple rules that each has one or more conditions to evaluate and that specify restrictions involving the plurality of elements;
      converting, to multiple constraints, the system information and information about a goal to be achieved during controlling of the physical system and information about sensor variables whose values are available during operation of the physical system;
      converting, by the one or more computing systems, the constraints to coupled differential equations that represent a model for use in describing a state of the target system; and
   training, by the one or more computing systems, the model using state information for the plurality of elements for multiple times, and testing performance of the trained model in controlling operations of the at least portion of the physical system by simulating manipulations of the manipulatable control elements to affect the outputs in expected manners;
   providing the generated decision module with the trained model; and executing of the generated decision module to perform further controlling of the operations of the at least portion of the physical system to modify at least one of the one or more outputs.

34. The system of claim 33 wherein the software instructions are part of a collaborative distributed decision system, wherein the training of the model includes identifying values of one or more of the plurality of elements that are not directly observable during operation of the physical system, and wherein the generating of the executable decision module further includes validating, based on multiple validation rules and before the providing of the generated decision module, the multiple constraints by testing at least one of controllability, observability, stability or goal completeness.

* * * * *

UNITED STATES PATENT AND TRADEMARK OFFICE
CERTIFICATE OF CORRECTION

PATENT NO. : 10,133,250 B2
APPLICATION NO. : 14/746777
DATED : November 20, 2018
INVENTOR(S) : Wolf Kohn et al.

It is certified that error appears in the above-identified patent and that said Letters Patent is hereby corrected as shown below:

In the Claims

<u>Column 97, Line 1, Claim 33:</u>
"executing of the generated decision module to perform" should read --executing the generated decision module to perform--.

Signed and Sealed this
Twenty-fifth Day of December, 2018

Andrei Iancu
*Director of the United States Patent and Trademark Office*